US010725309B2

(12) United States Patent
Sakamoto et al.

(10) Patent No.: US 10,725,309 B2
(45) Date of Patent: Jul. 28, 2020

(54) MICROSCOPE SYSTEM

(71) Applicant: CANON KABUSHIKI KAISHA, Tokyo (JP)

(72) Inventors: Michiie Sakamoto, Tokyo (JP); Akinori Hashiguchi, Tokyo (JP); Shinobu Masuda, Tokyo (JP); Tsuguhide Sakata, Machida (JP); Masahide Hasegawa, Yokohama (JP); Masahiro Ando, Yokohama (JP); Osamu Nagatsuka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 282 days.

(21) Appl. No.: 15/528,717

(22) PCT Filed: Dec. 8, 2015

(86) PCT No.: PCT/JP2015/006097
§ 371 (c)(1),
(2) Date: May 22, 2017

(87) PCT Pub. No.: WO2016/092820
PCT Pub. Date: Jun. 16, 2016

(65) Prior Publication Data
US 2017/0269346 A1    Sep. 21, 2017

(30) Foreign Application Priority Data

Dec. 10, 2014 (JP) .................................. 2014-250312

(51) Int. Cl.
*G02B 27/32*    (2006.01)
*G02B 27/60*    (2006.01)
(Continued)

(52) U.S. Cl.
CPC ............. *G02B 27/32* (2013.01); *G01B 5/004* (2013.01); *G02B 21/245* (2013.01); *G02B 21/362* (2013.01); *G02B 27/60* (2013.01)

(58) Field of Classification Search
CPC .. G02B 21/245; G02B 21/247; G02B 21/362; G02B 27/32
See application file for complete search history.

(56) References Cited

U.S. PATENT DOCUMENTS 588,689 A    8/1897  Bausch
1,876,176 A  9/1932  Sulzner
(Continued)

FOREIGN PATENT DOCUMENTS

JP    8-194162    7/1996
JP    4600395     12/2010
(Continued)

OTHER PUBLICATIONS

Japanese Office Action dated Dec. 25, 2018 during prosecution of related Japanese application No. 2014-250312. (English-language machine translation included.).
(Continued)

*Primary Examiner* — Darryl J Collins
*Assistant Examiner* — Journey F Sumlar
(74) *Attorney, Agent, or Firm* — Venable LLP

(57) ABSTRACT

A microscope system includes a microscope body, an XY stage mounted on the microscope body and including a stage configured to place a slide as an observation target and move in an X-axis direction and a Y-axis direction perpendicular to each other, and an XY two-dimensional scale plate fixed to the stage. The XY two-dimensional scale plate is provided with a first mark that provides axis information in the X-axis direction throughout a movable range of the stage in the Y-axis direction and a second mark that provides axis
(Continued)

information in the Y-axis direction throughout a movable range of the stage in the X-axis direction, which are used to recognize X- and Y-coordinates of the stage.

20 Claims, 34 Drawing Sheets

(51) Int. Cl.
*G01B 5/004* (2006.01)
*G02B 21/24* (2006.01)
*G02B 21/36* (2006.01)

(56) References Cited

U.S. PATENT DOCUMENTS

| | | |
|---|---|---|
| 4,074,131 A | 2/1978 | Schwebel |
| 4,914,526 A | 4/1990 | Sakata et al. |
| 5,023,730 A | 6/1991 | Sakata et al. |
| 7,034,809 B2 | 4/2006 | Hasegawa |
| 8,094,914 B2 | 1/2012 | Iki et al. |
| 8,107,641 B2 | 1/2012 | Sakata et al. |
| 2003/0064307 A1 | 4/2003 | Nakamura et al. |
| 2009/0213357 A1* | 8/2009 | Arai .................. G03F 7/70666 355/72 |
| 2011/0192302 A1* | 8/2011 | Selinidis .............. B82Y 10/00 101/463.1 |
| 2013/0050464 A1* | 2/2013 | Kang .................. G02B 21/26 348/79 |
| 2014/0074297 A1* | 3/2014 | Sumioka .............. H02N 2/0075 700/275 |
| 2014/0152796 A1* | 6/2014 | Mitsuhiro .......... G02B 21/0016 348/79 |
| 2015/0285662 A1 | 10/2015 | Nagura |

FOREIGN PATENT DOCUMENTS

| | | |
|---|---|---|
| JP | 2011-145470 | 7/2011 |
| JP | 2013-44935 | 3/2013 |
| JP | 2015-200568 A | 11/2015 |

OTHER PUBLICATIONS

PCT International Search Report and Written Opinion of the International Searching Authority in PCT/JP2015/006097.
U.S. Appl. No. 15/528,724, filed May 22, 2017. Applicant: Michiie Sakamoto, et al.
U.S. Appl. No. 15/533,180, filed Jun. 5, 2017. Applicant: Michiie Sakamoto, et al.
U.S. Appl. No. 15/531,240, filed May 26, 2017. Applicant: Michiie Sakamoto, et al.
U.S. Appl. No. 15/532,240, filed Jun. 1, 2017. Applicant: Michiie Sakamoto, et al.
European Office Action dated Feb. 27, 2019 during prosecution of related European application No. 15817583.6-1020.

* cited by examiner

[Fig. 1]
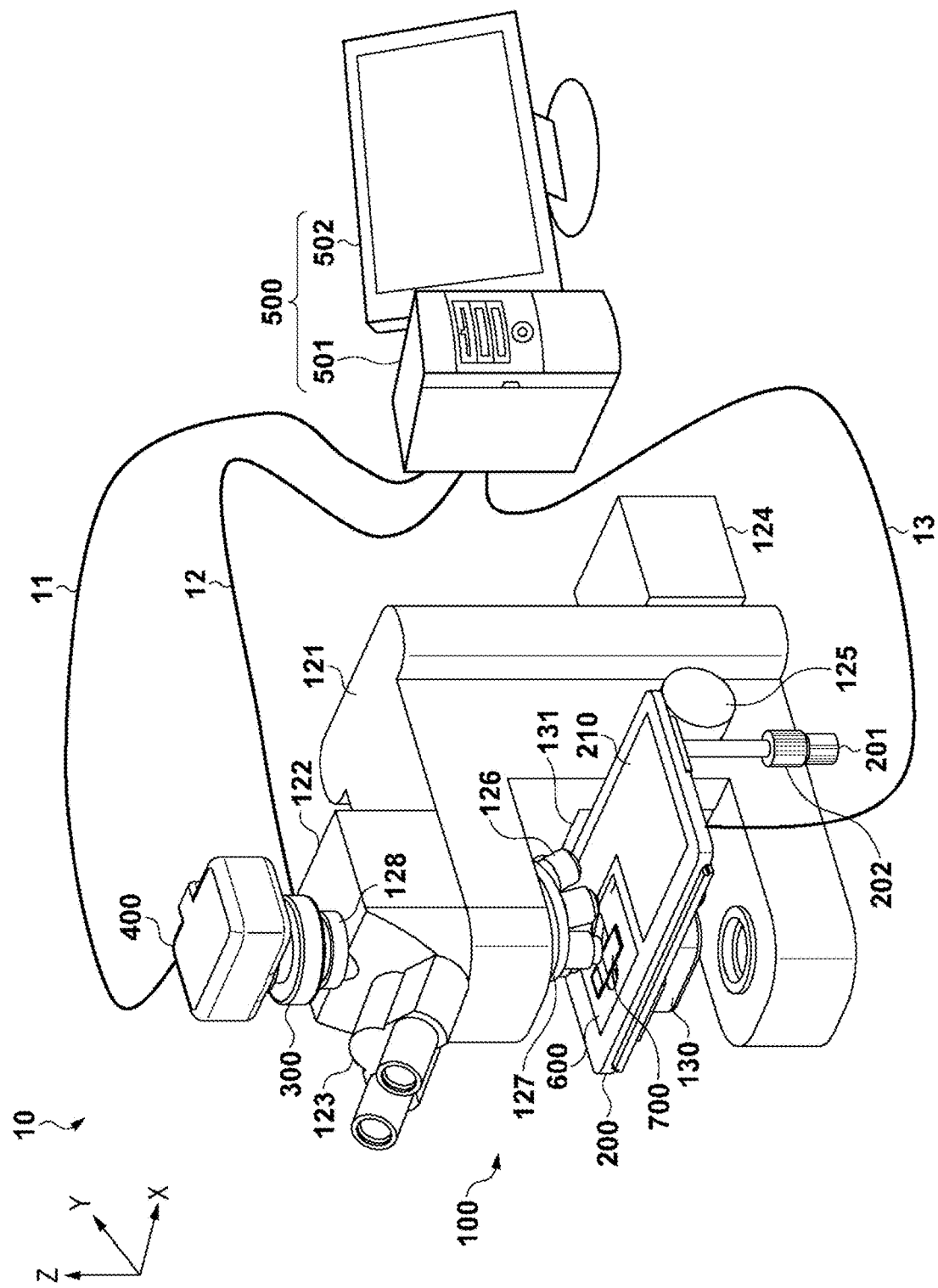

[Fig. 2]
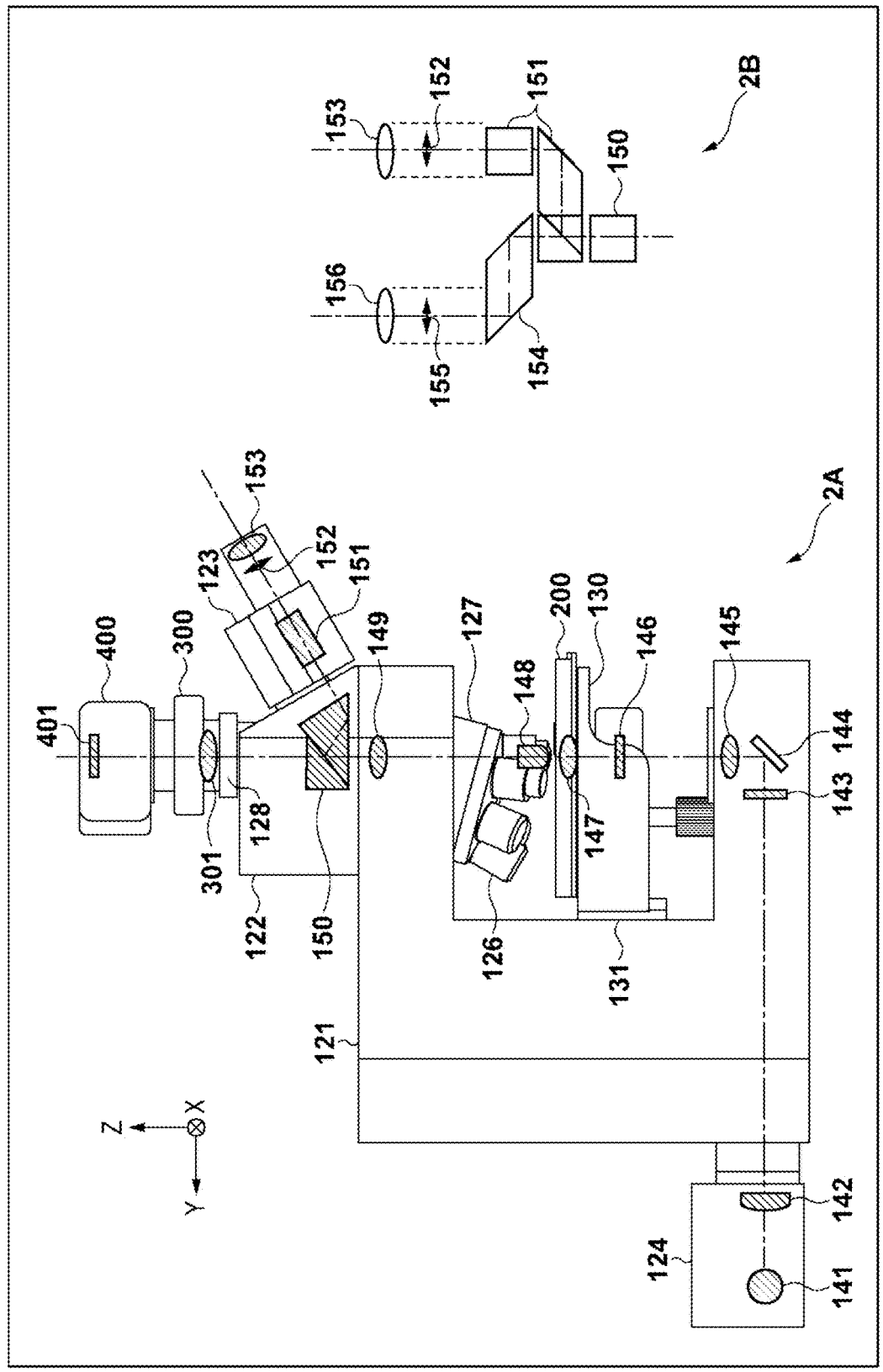

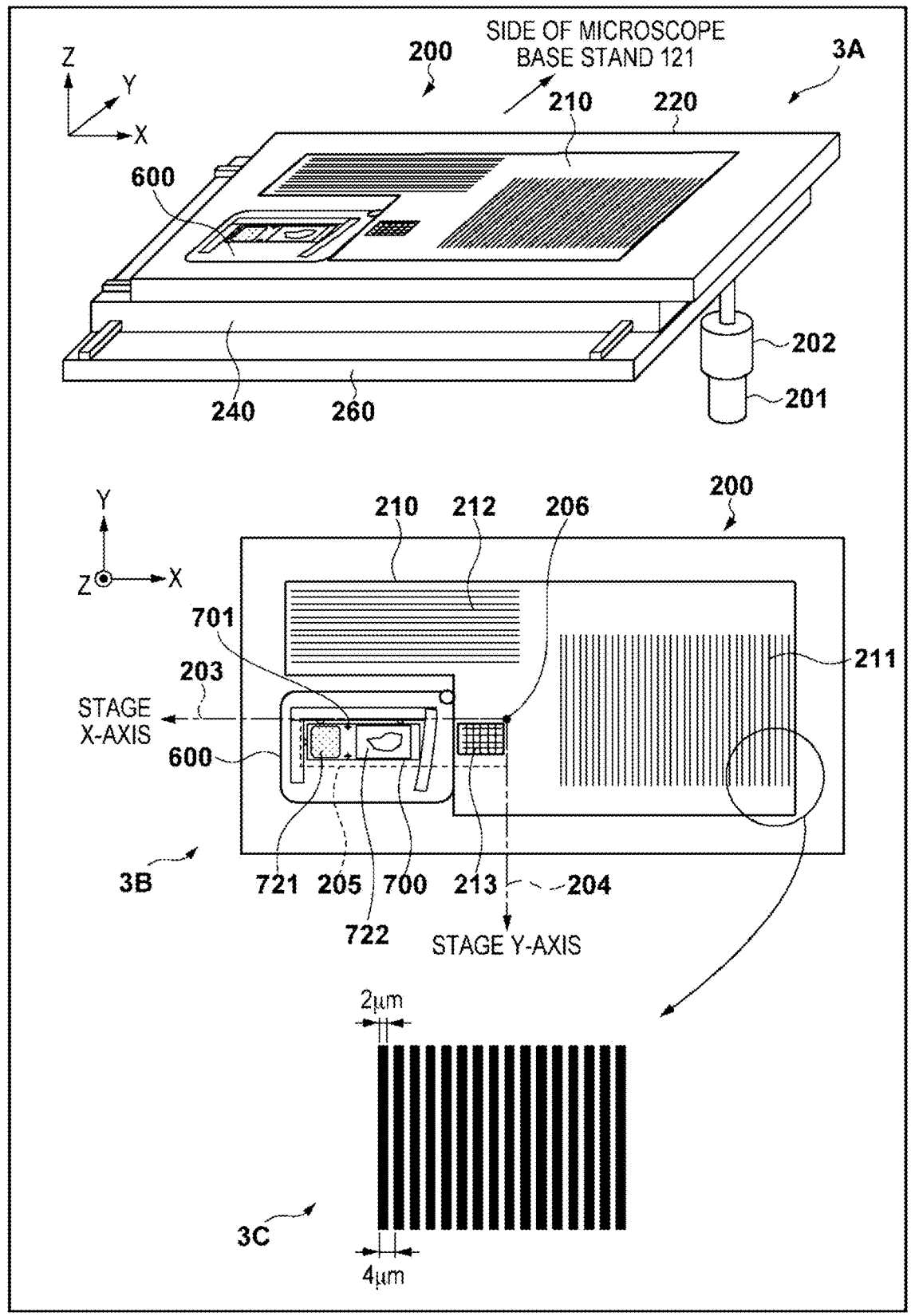
[Fig. 3]

[Fig. 4]
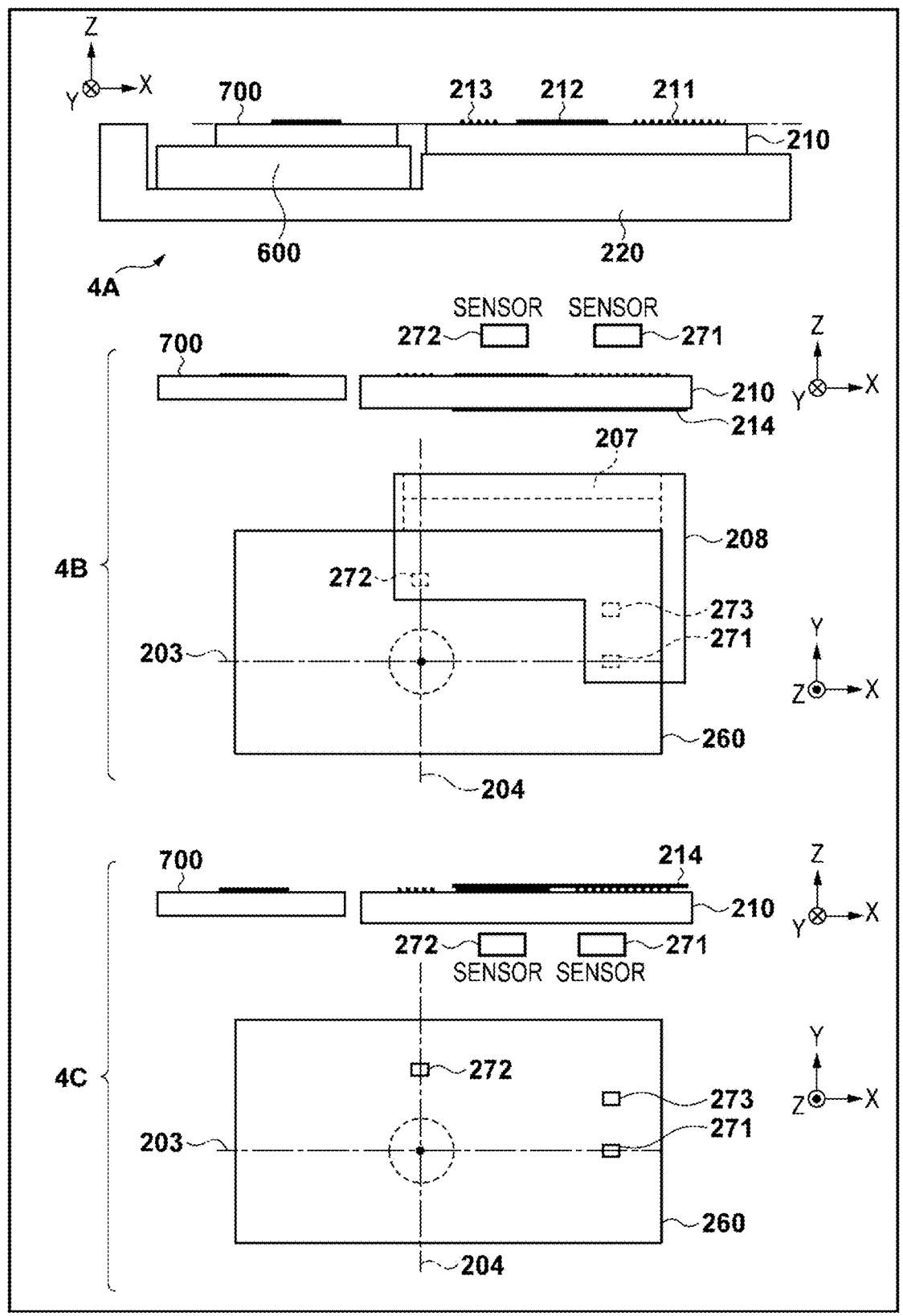

[Fig. 5]
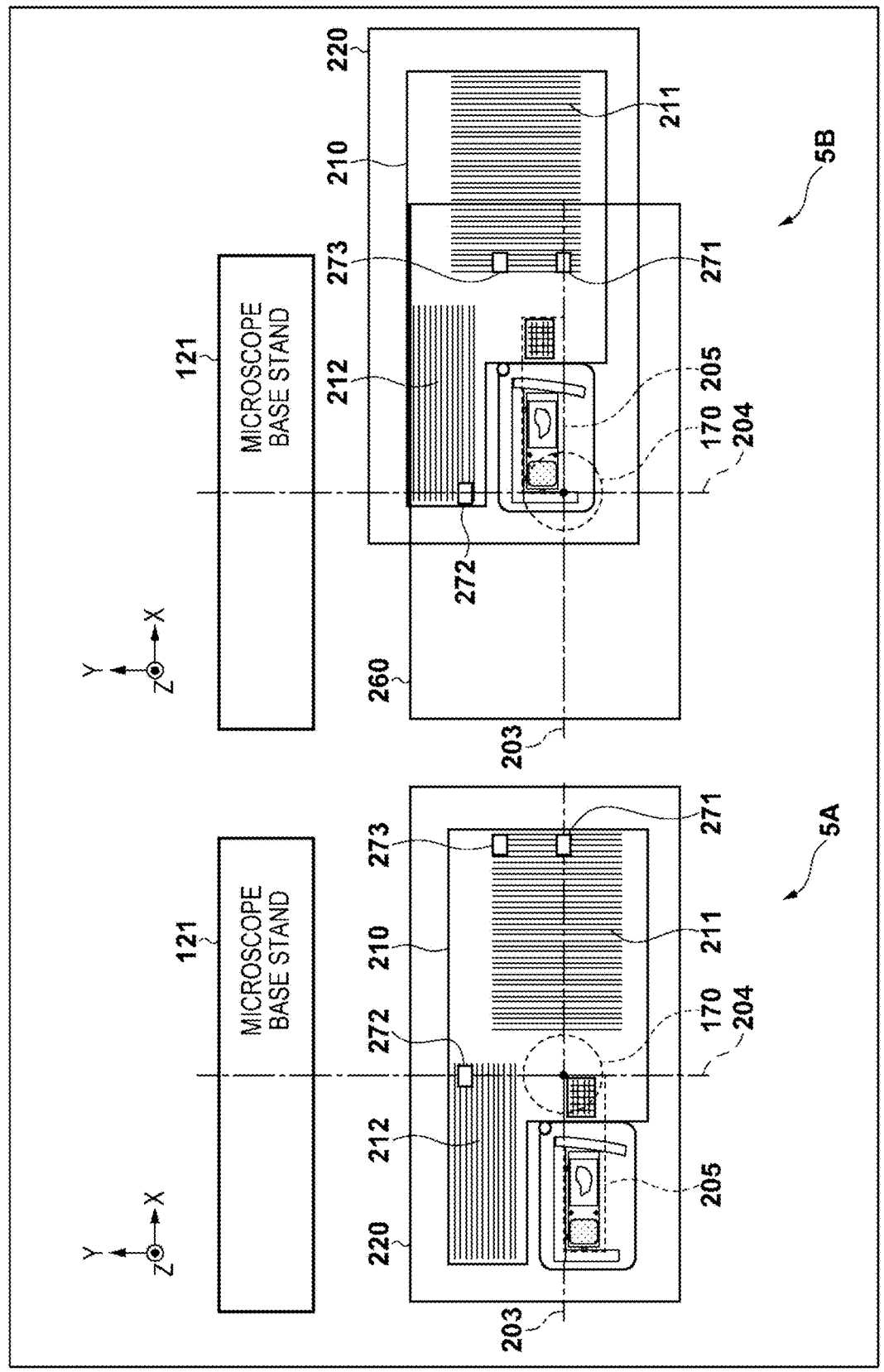

[Fig. 6]
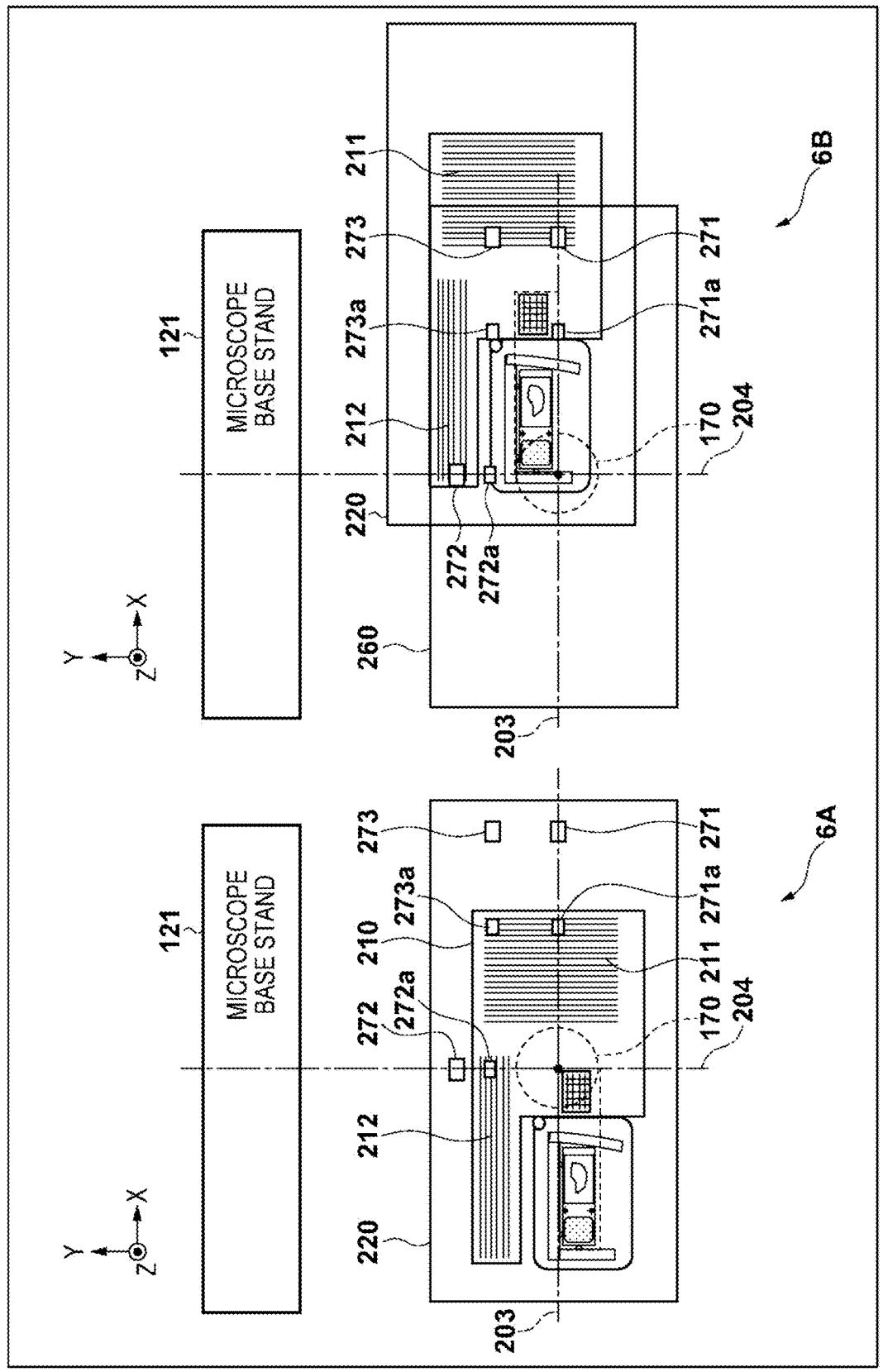

[Fig. 7A]
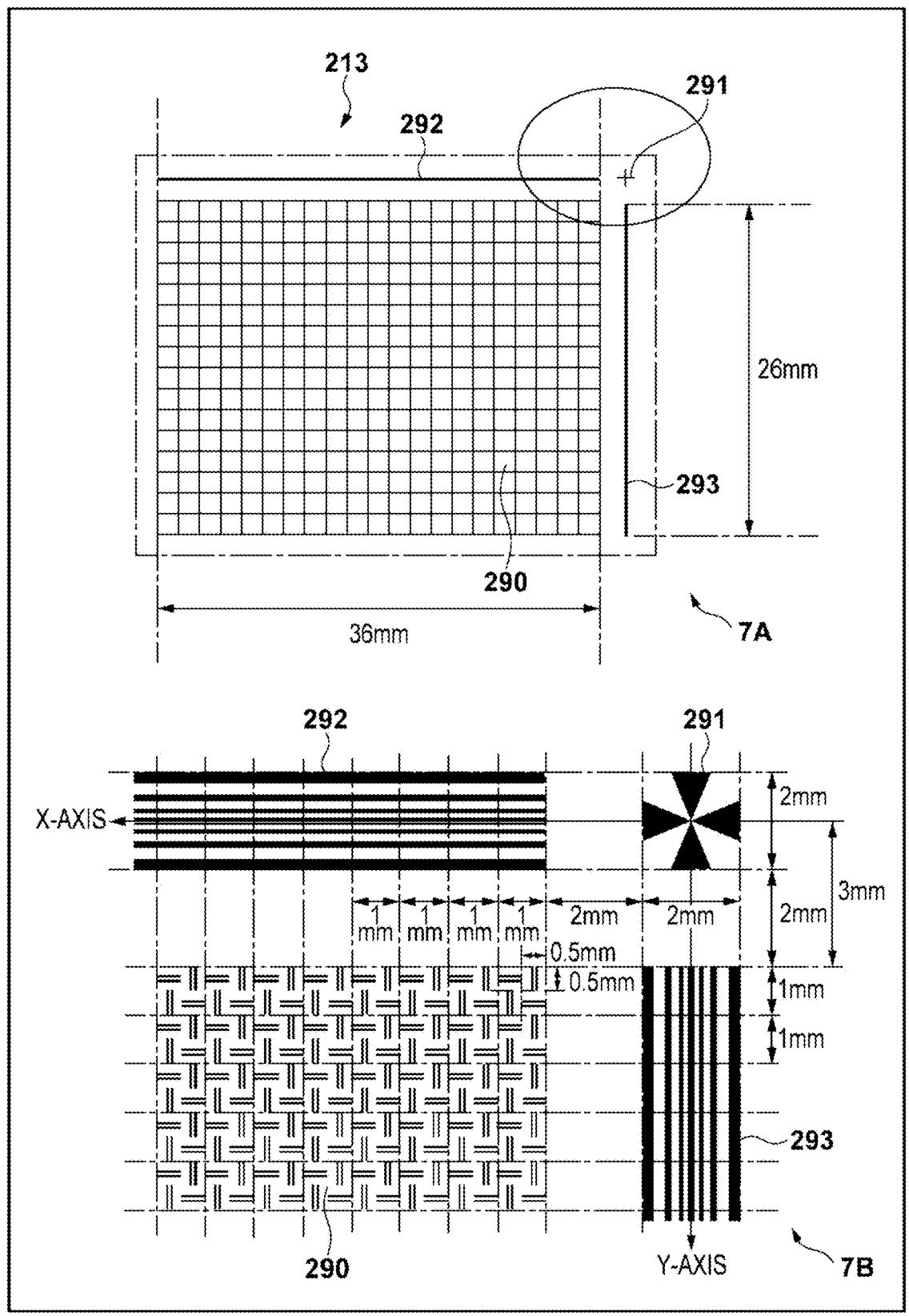

[Fig. 7B]
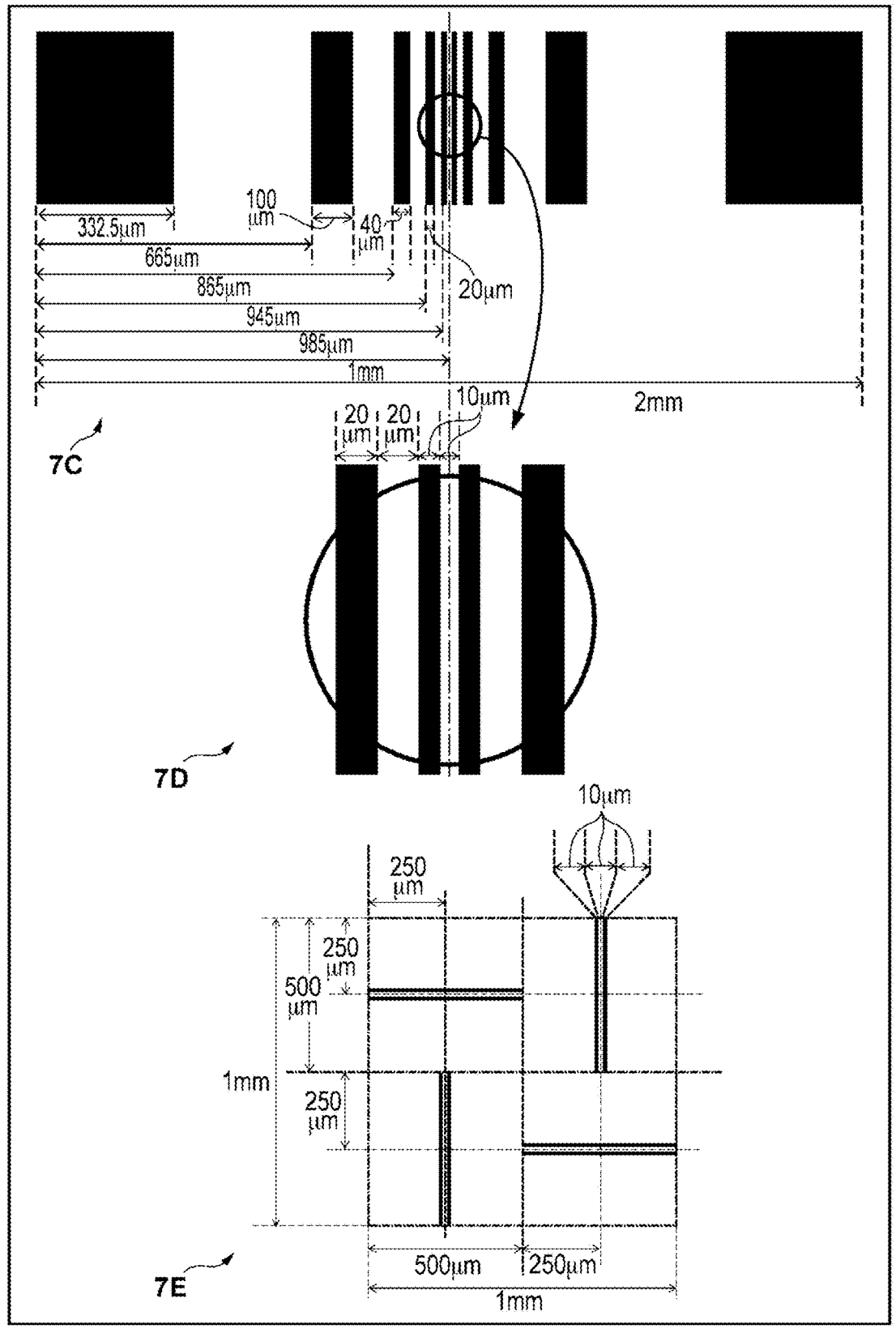

[Fig. 8]
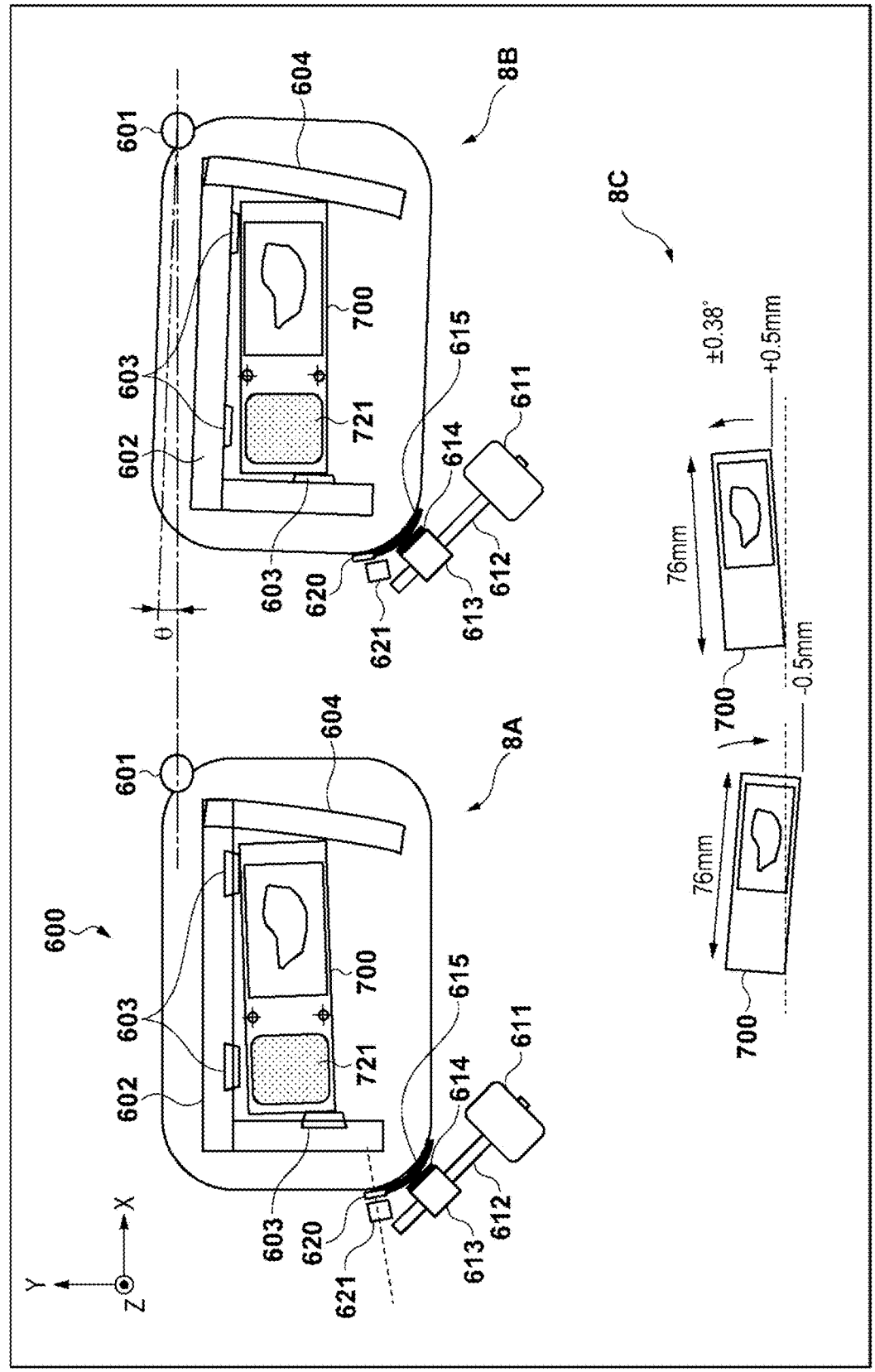

[Fig. 9]
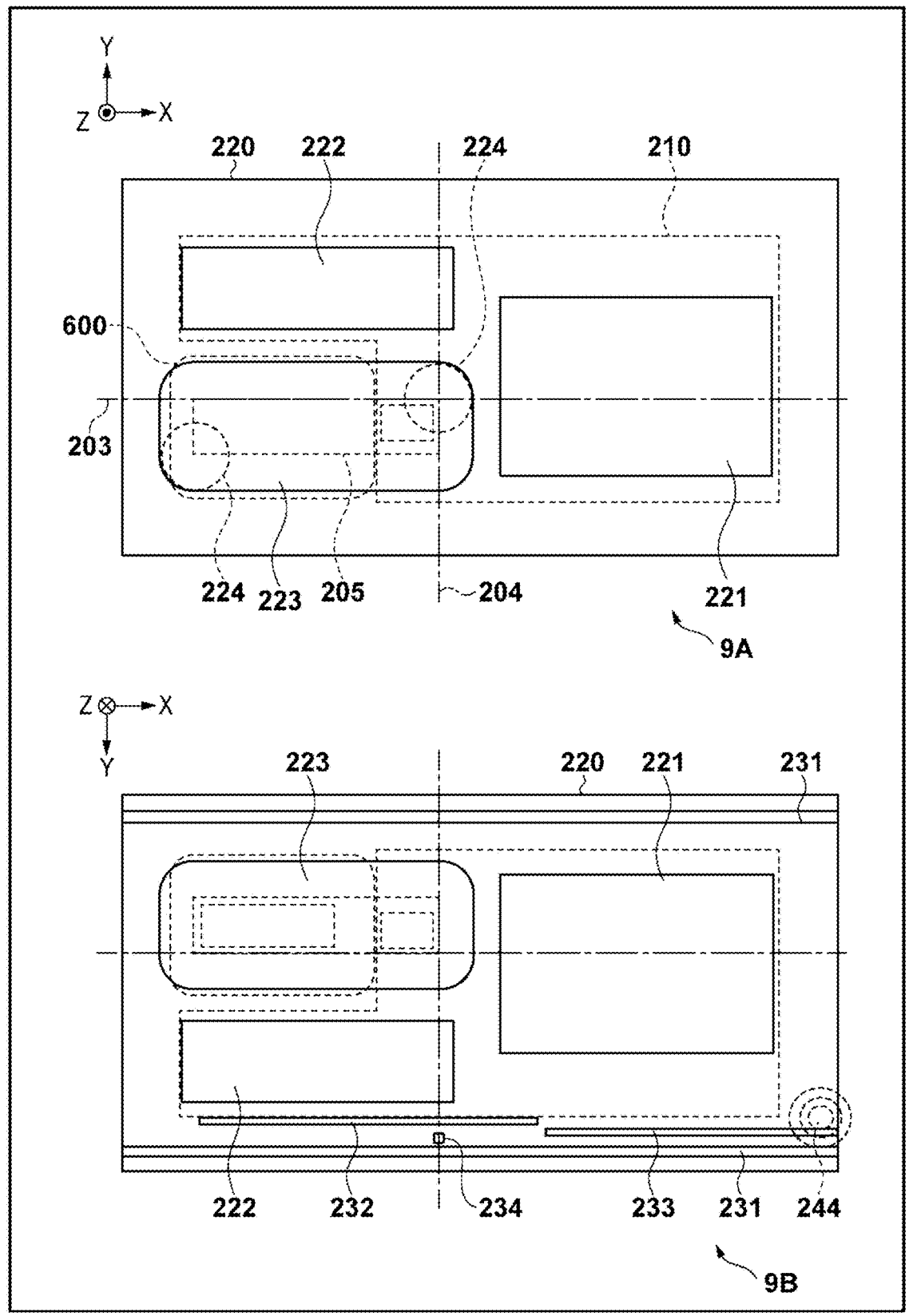

[Fig. 10]
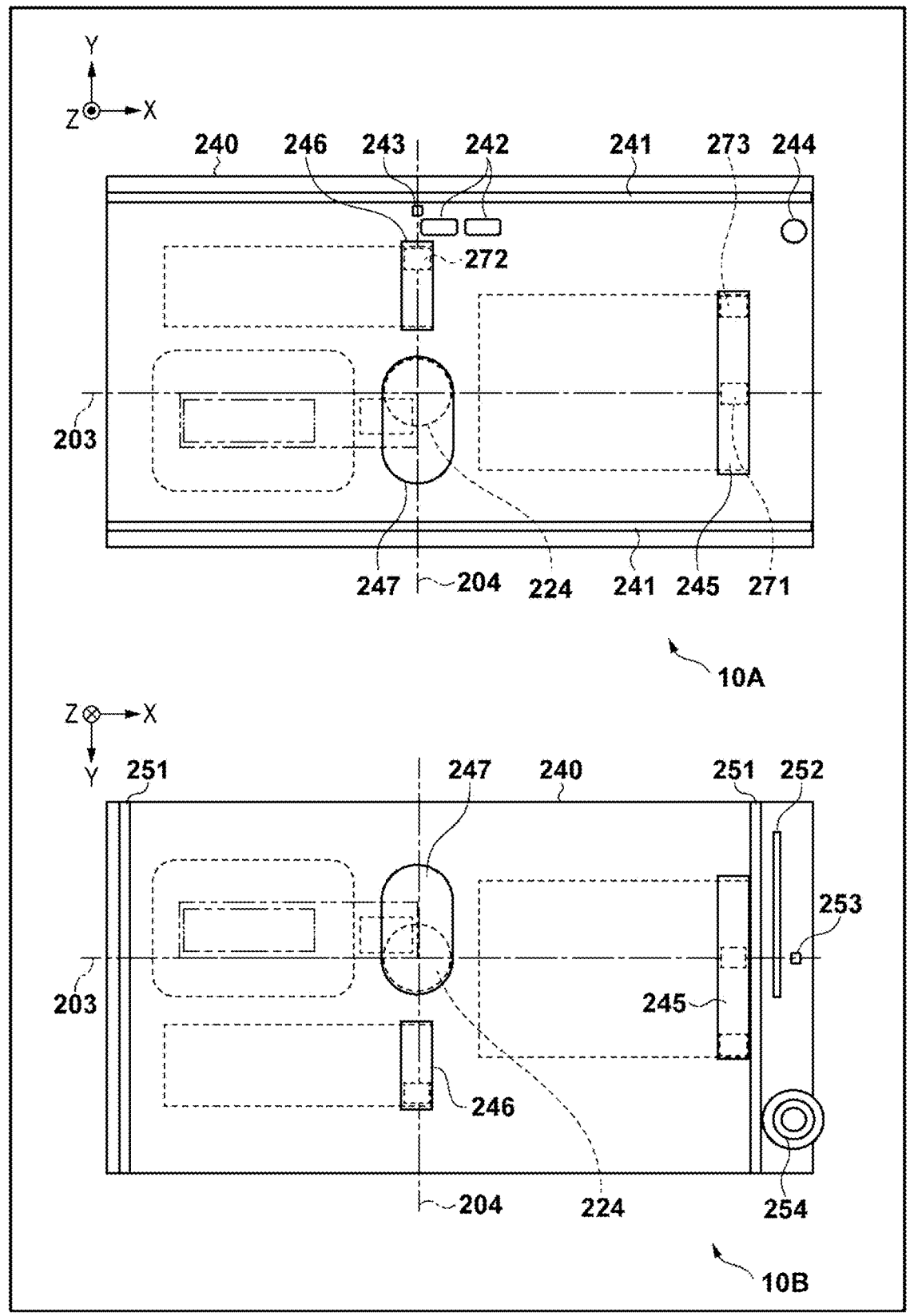

[Fig. 11]
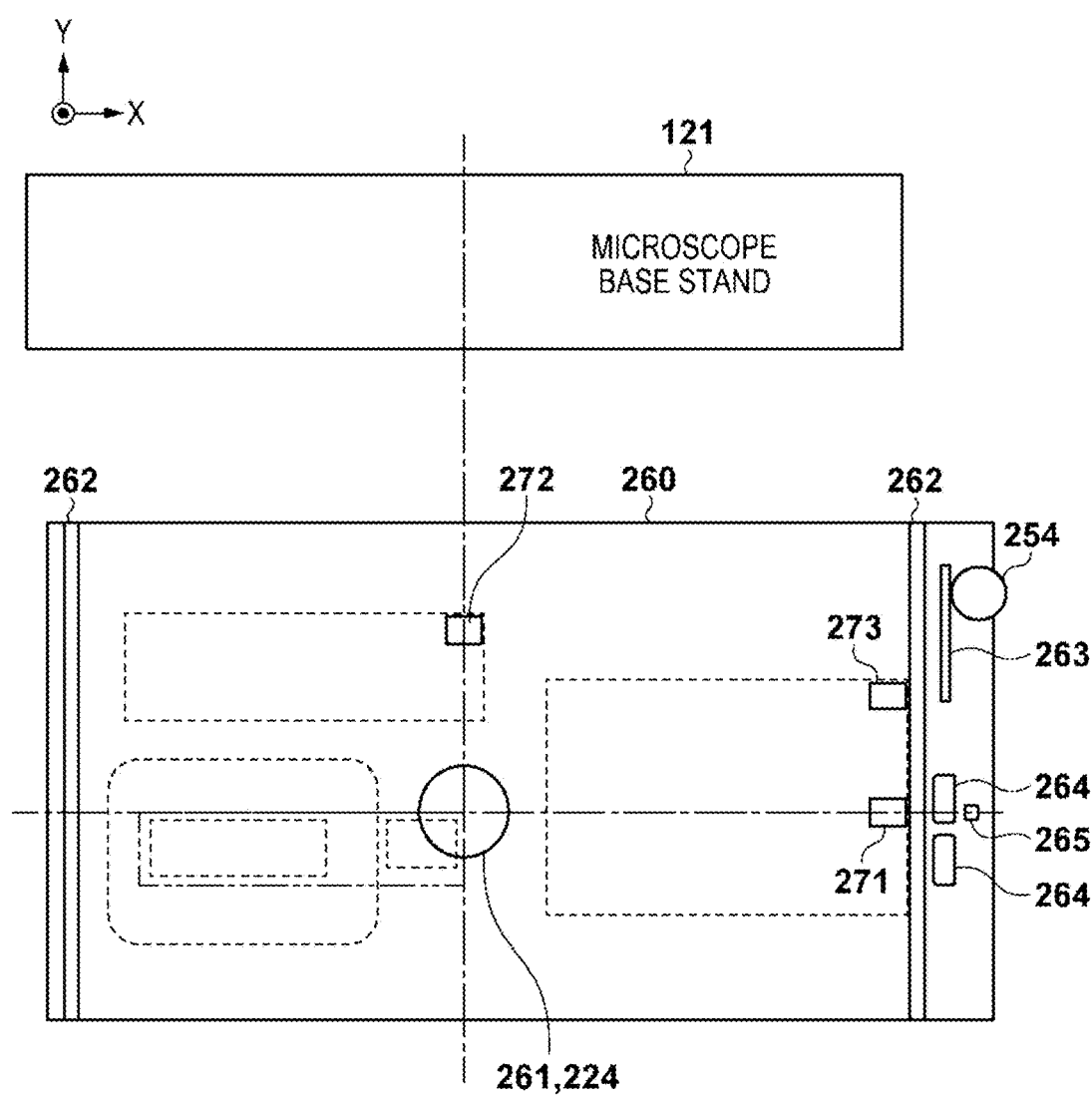

[Fig. 12]
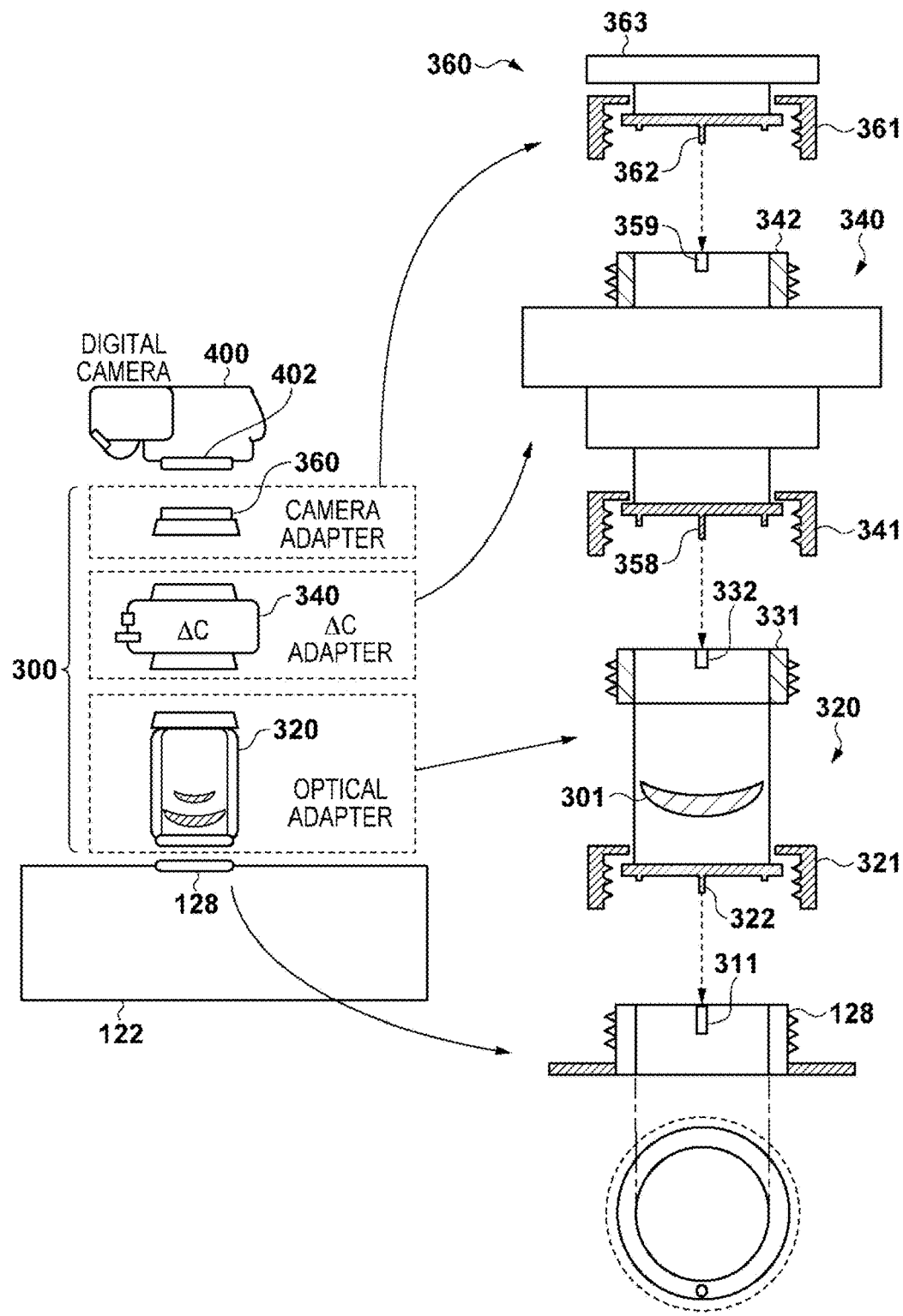

[Fig. 13]
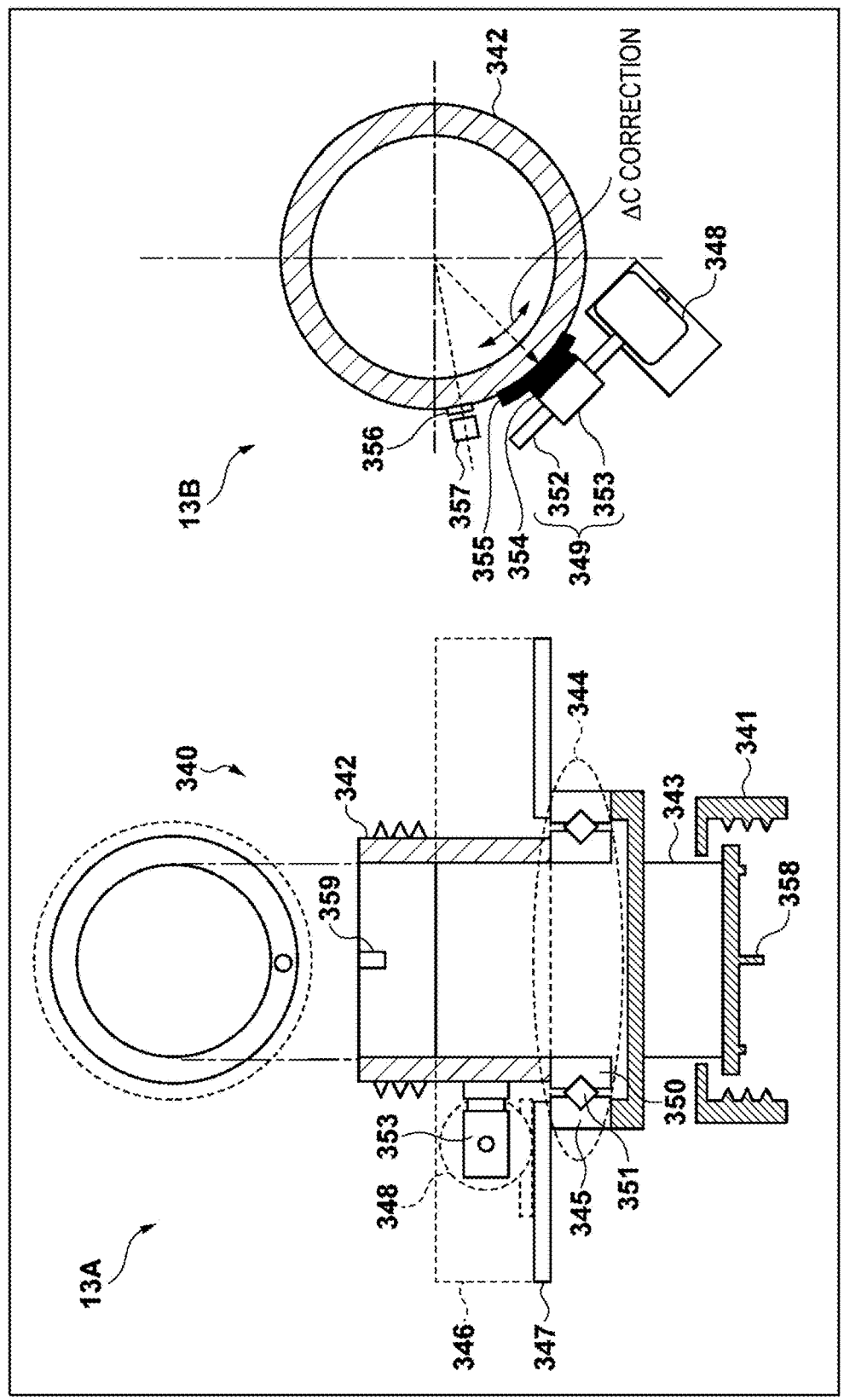

[Fig. 14]
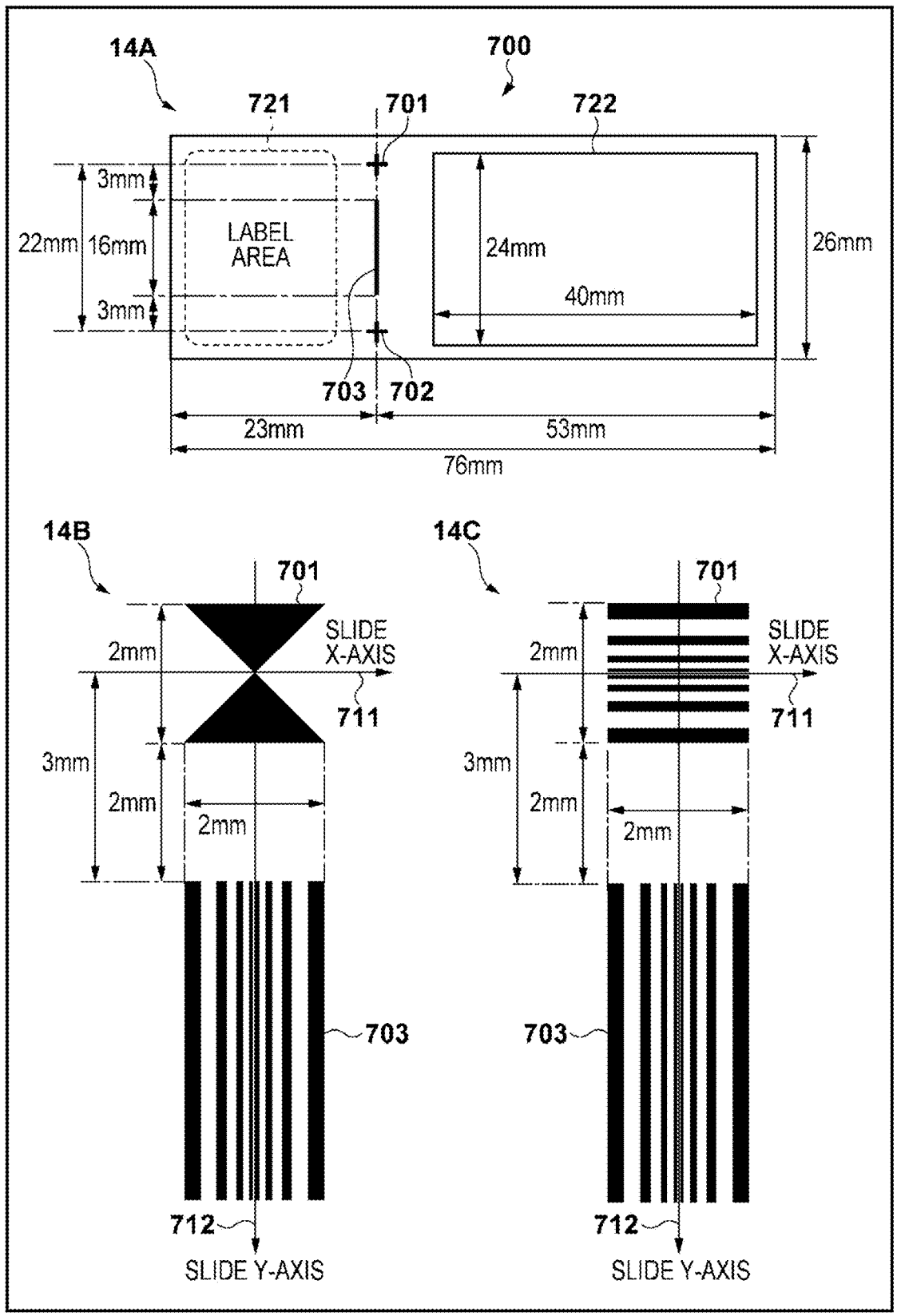

[Fig. 15]
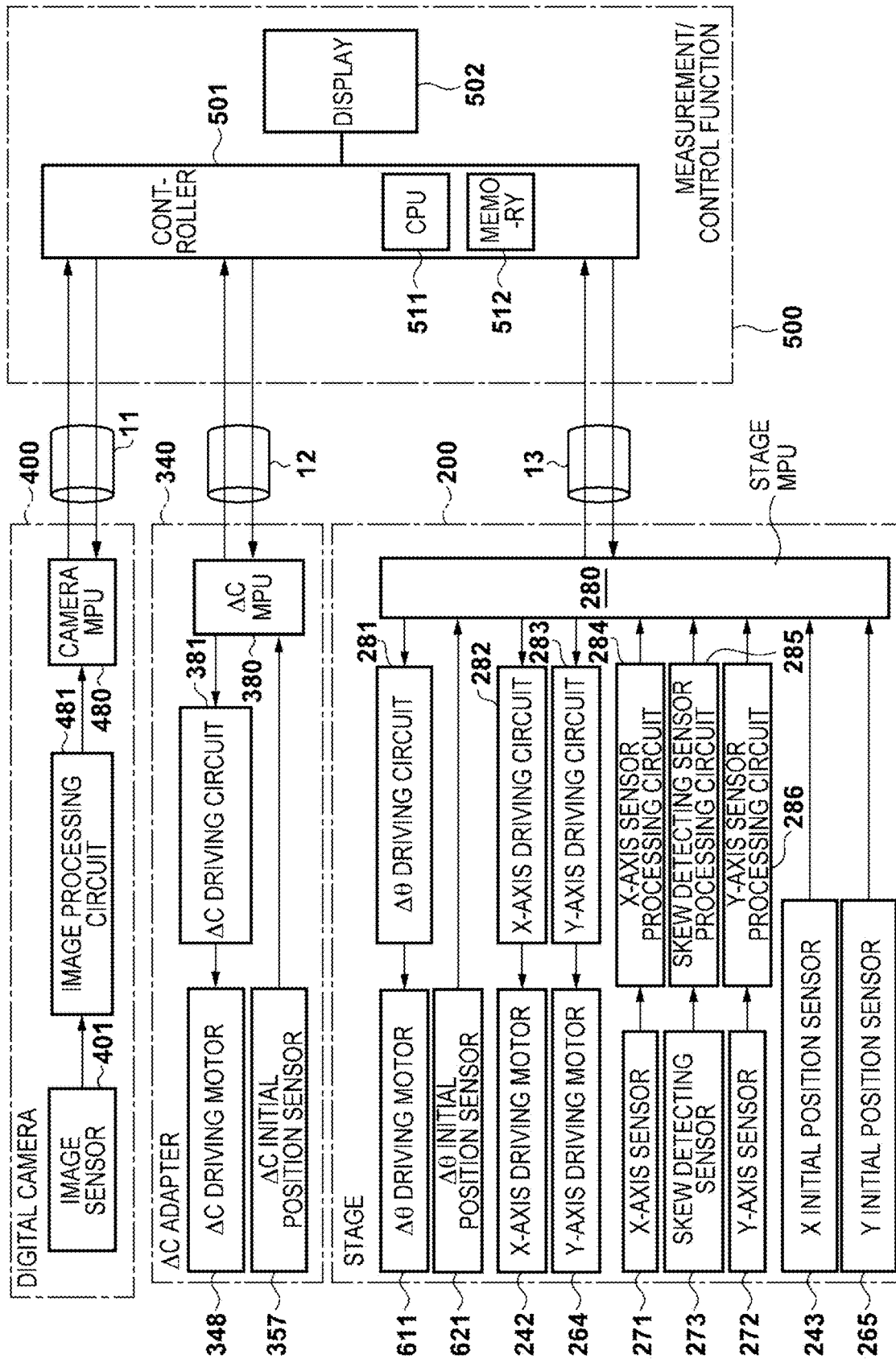

[Fig. 16]
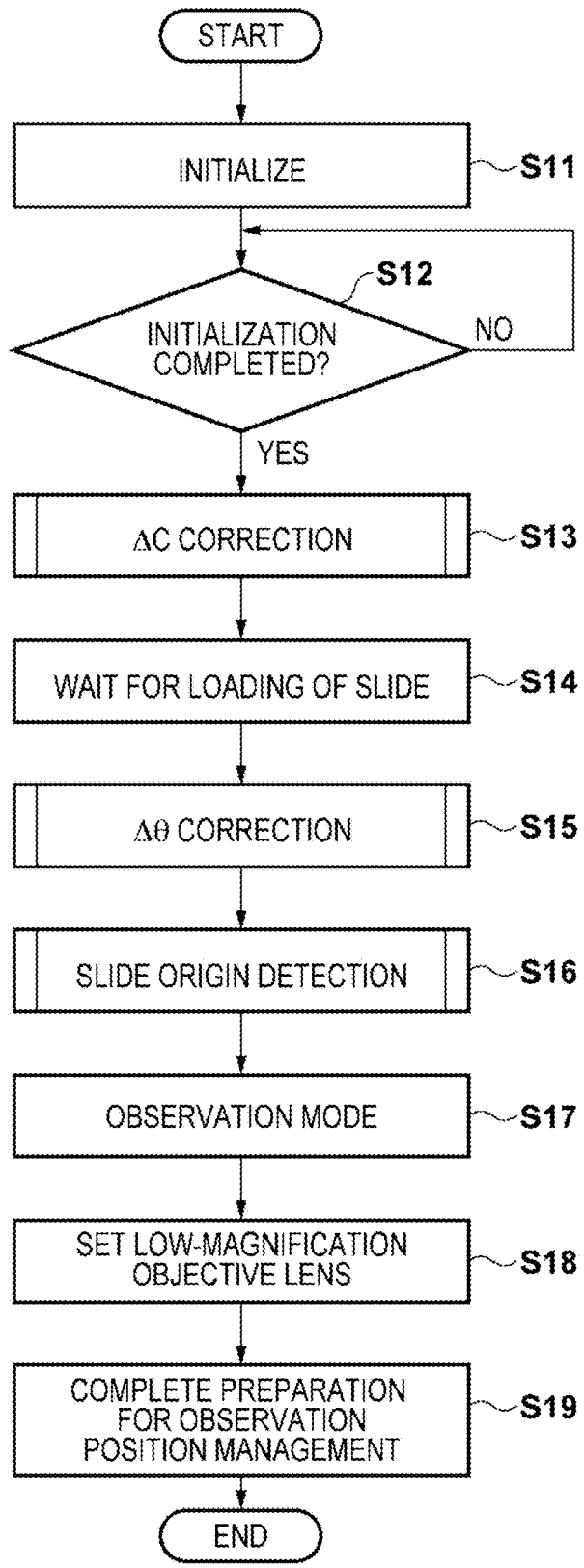

[Fig. 17]
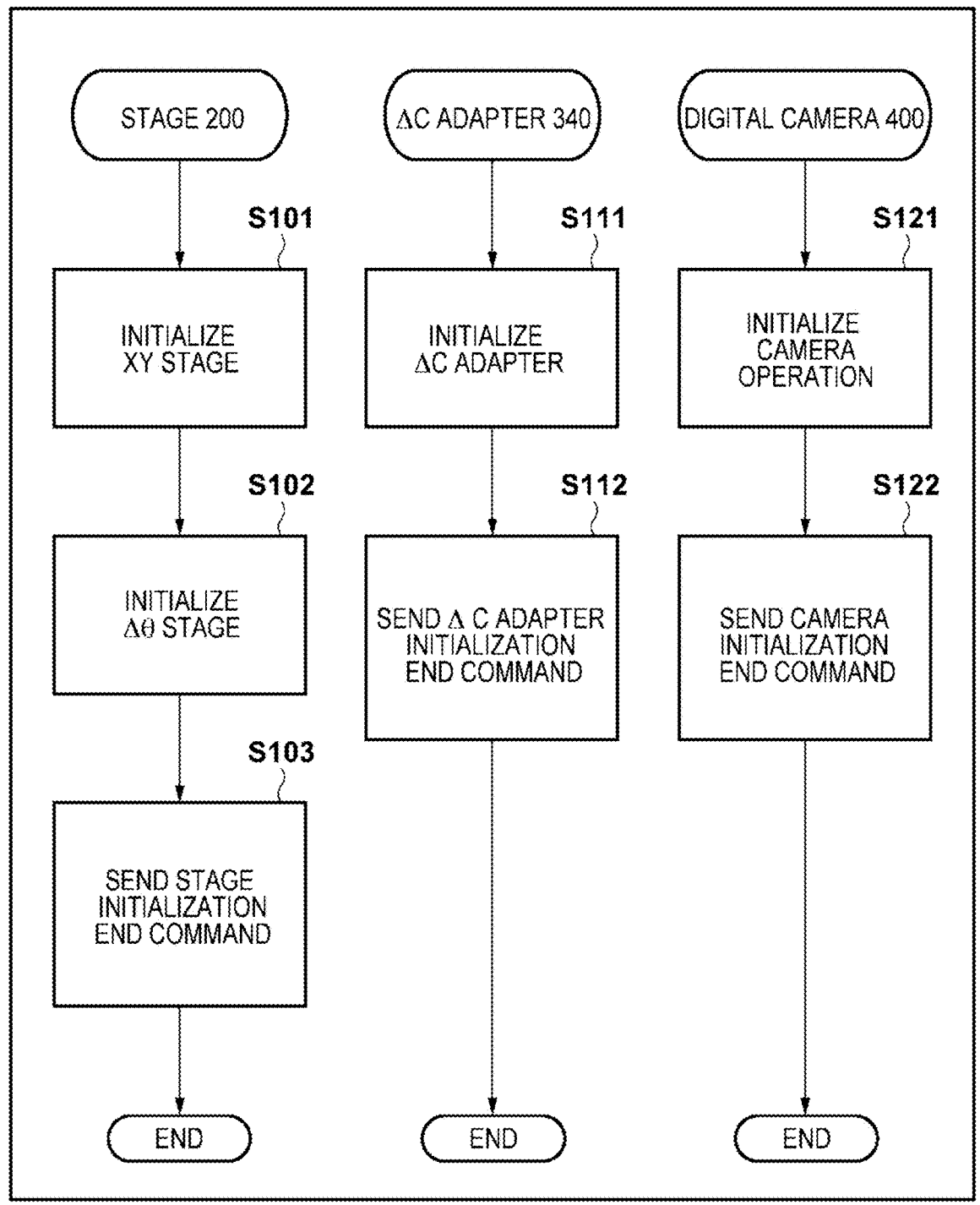

[Fig. 18]
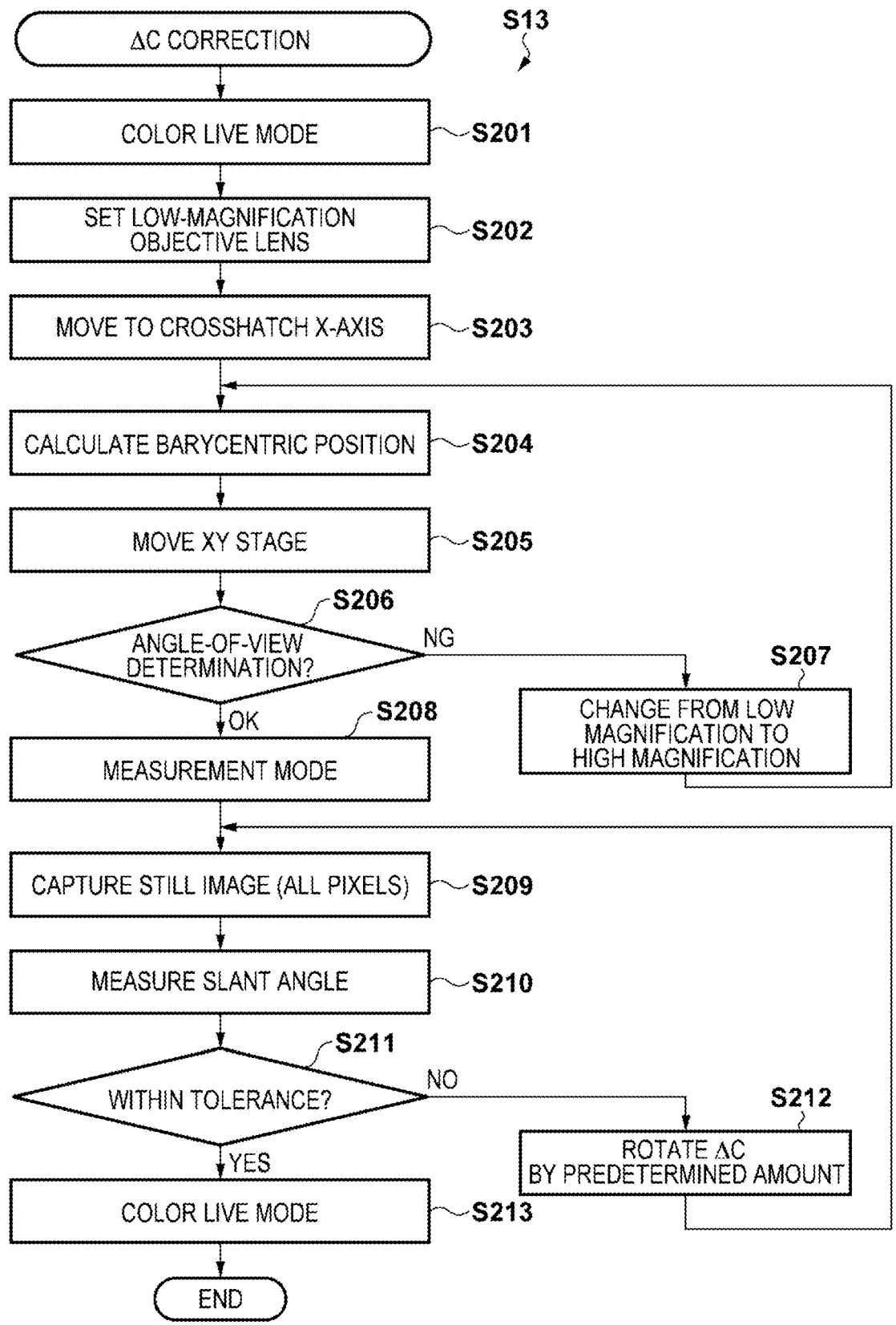

[Fig. 19]
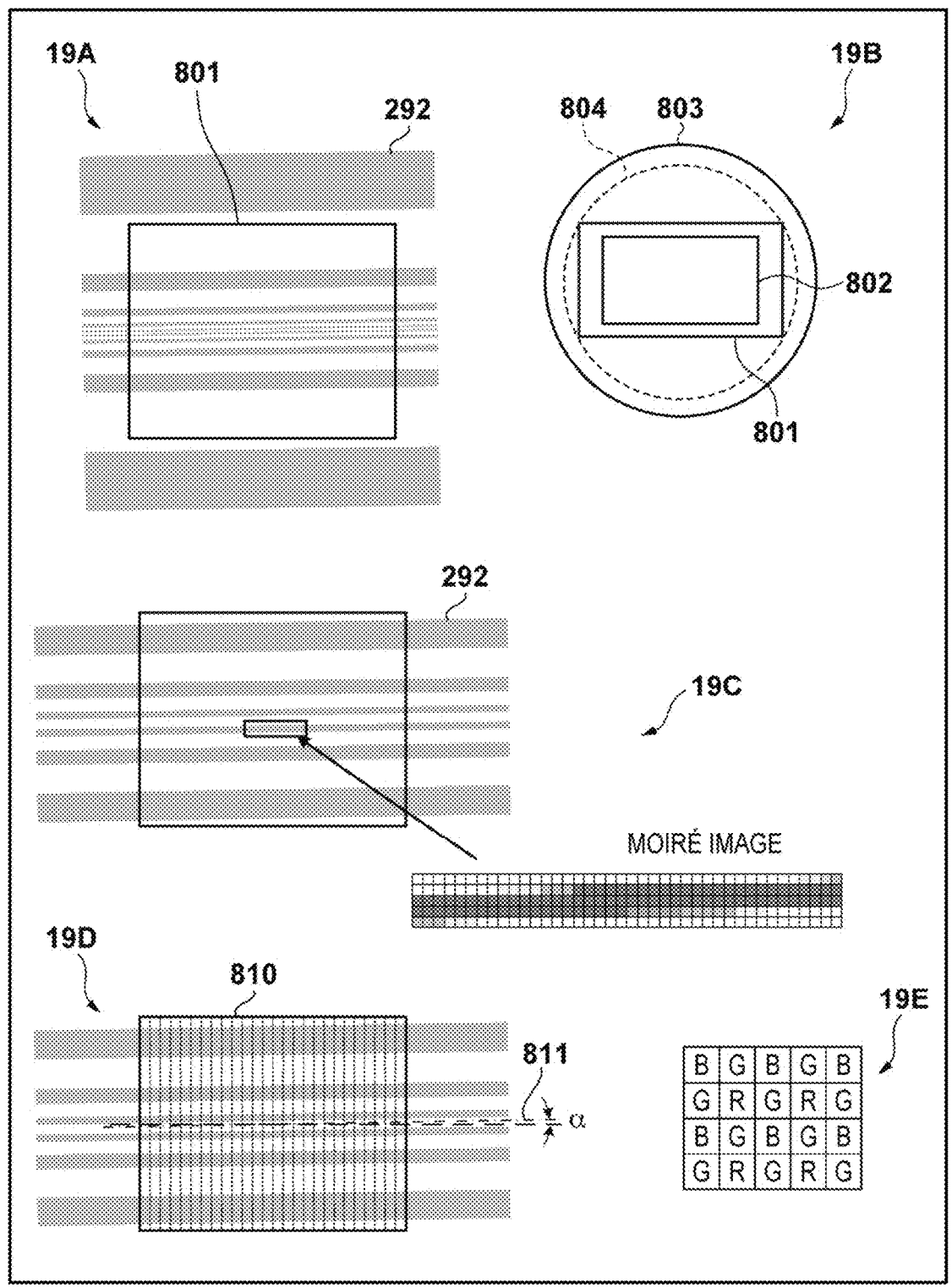

[Fig. 20]
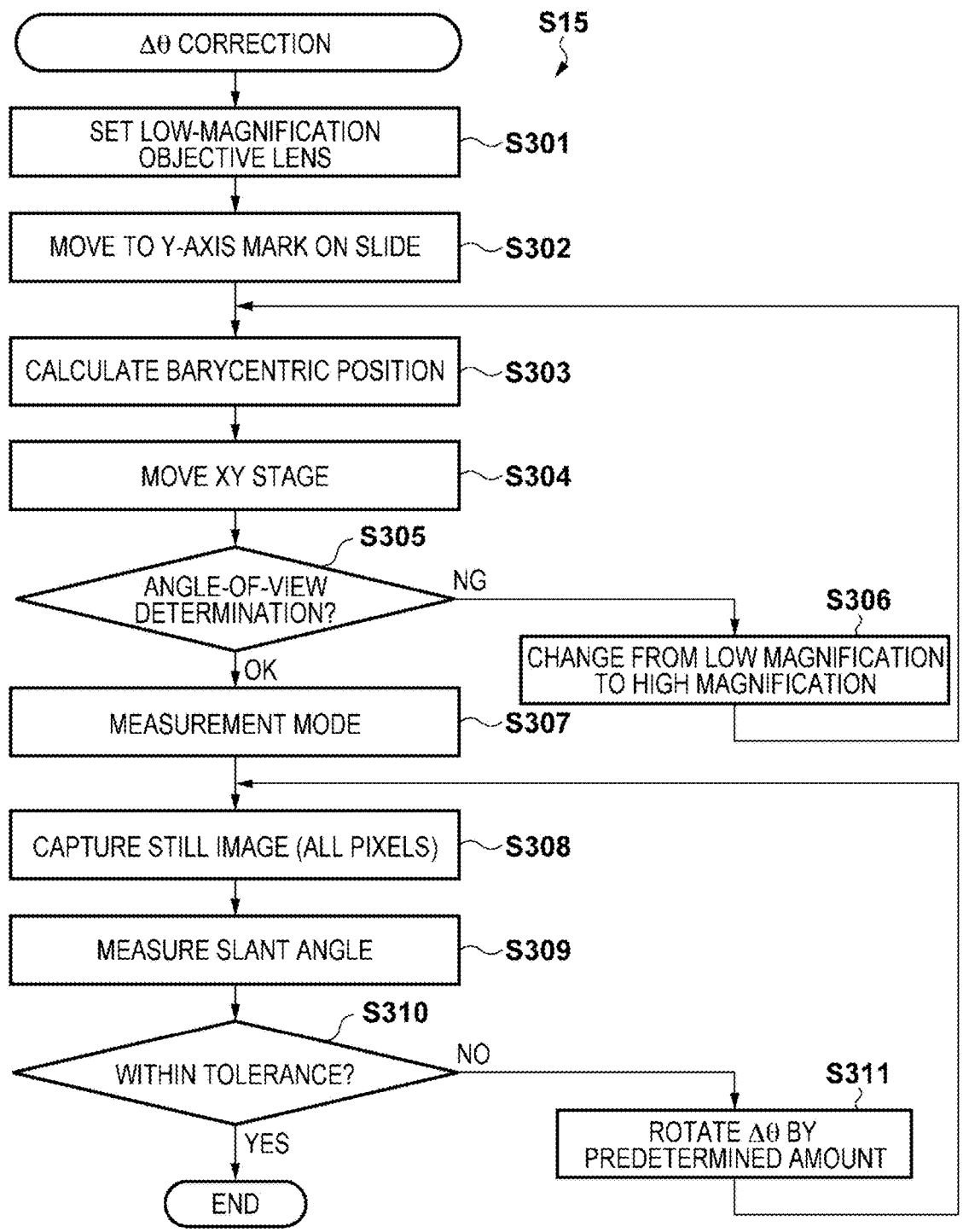

[Fig. 21]
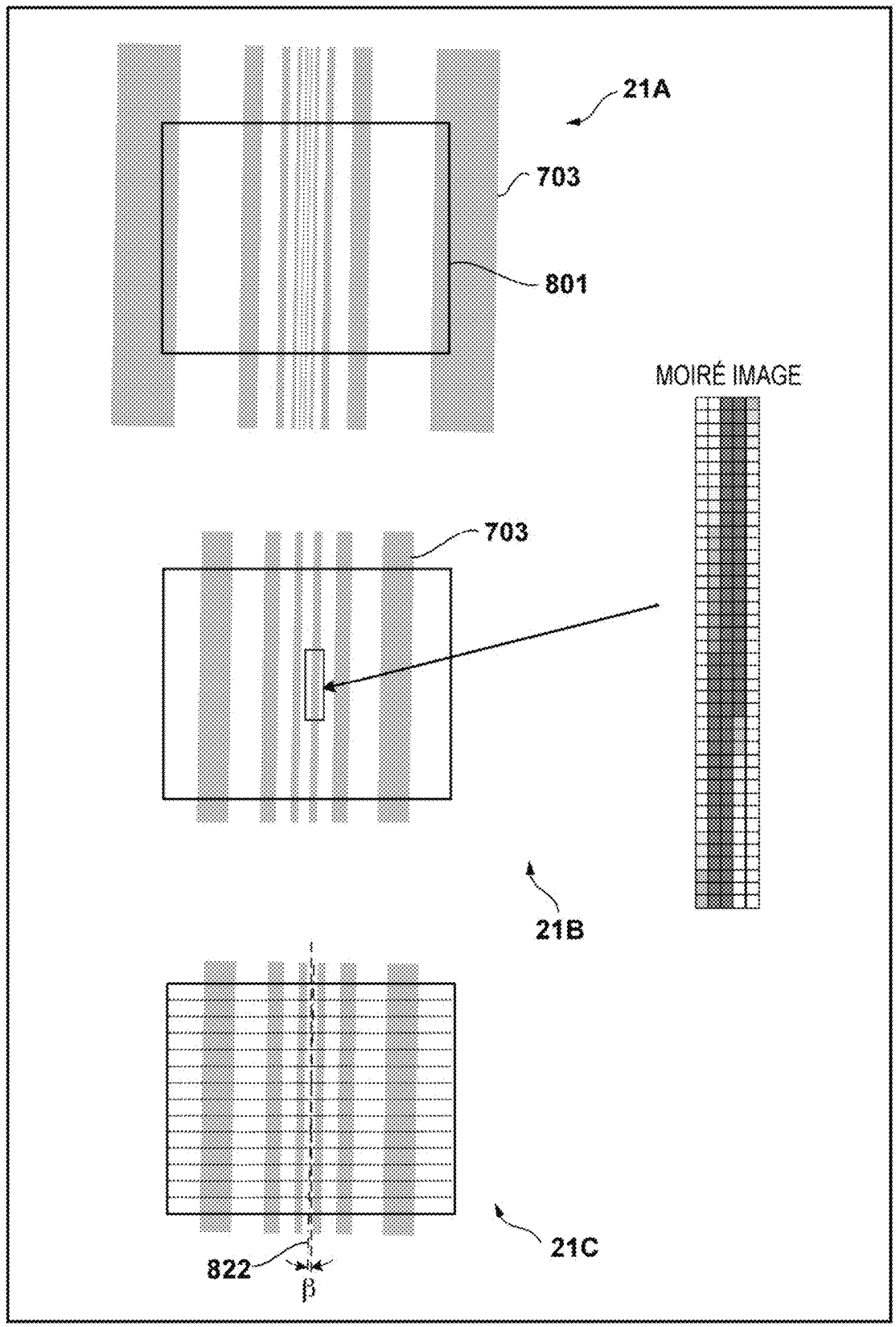

[Fig. 22]
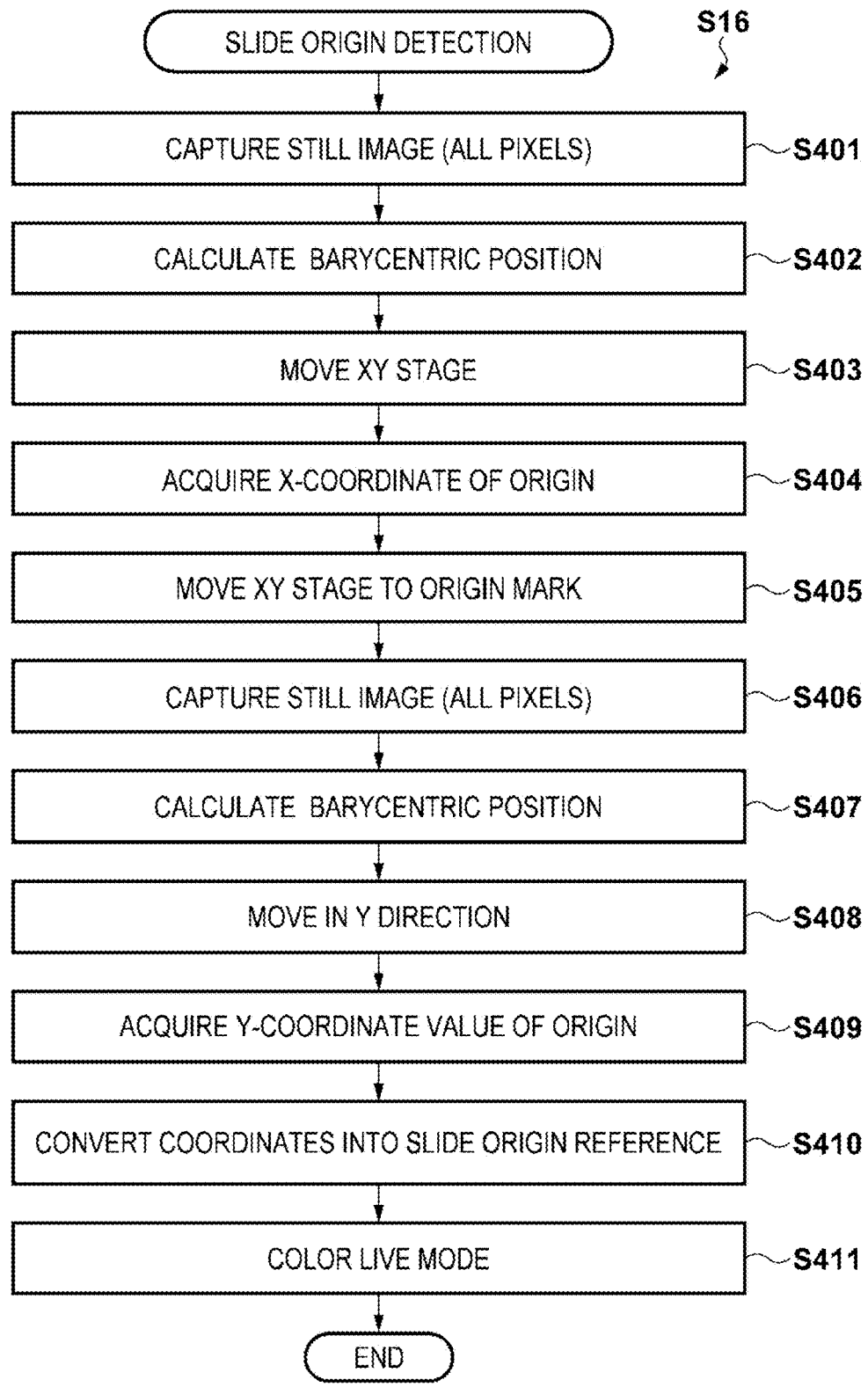

[Fig. 23]
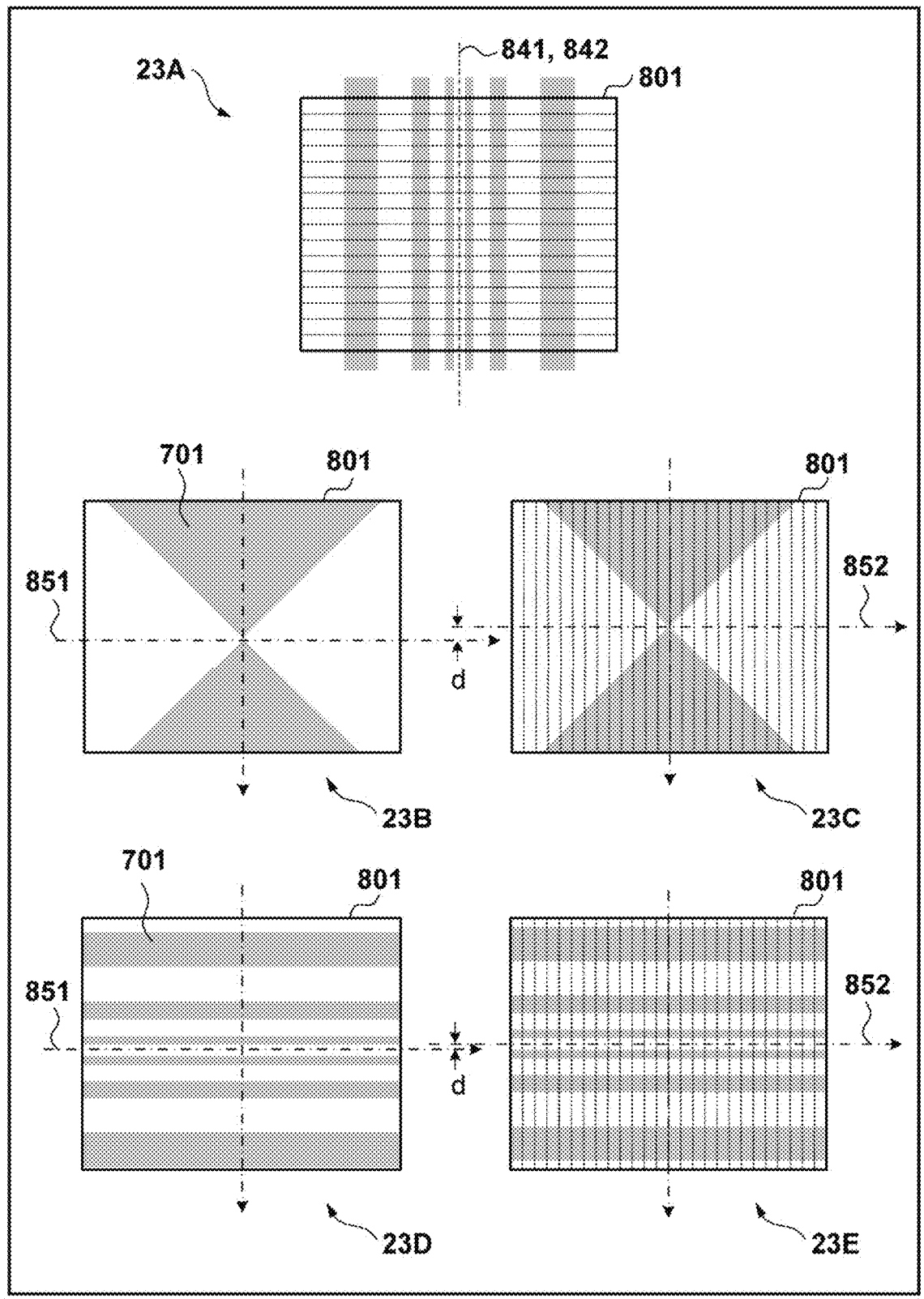

[Fig. 24]
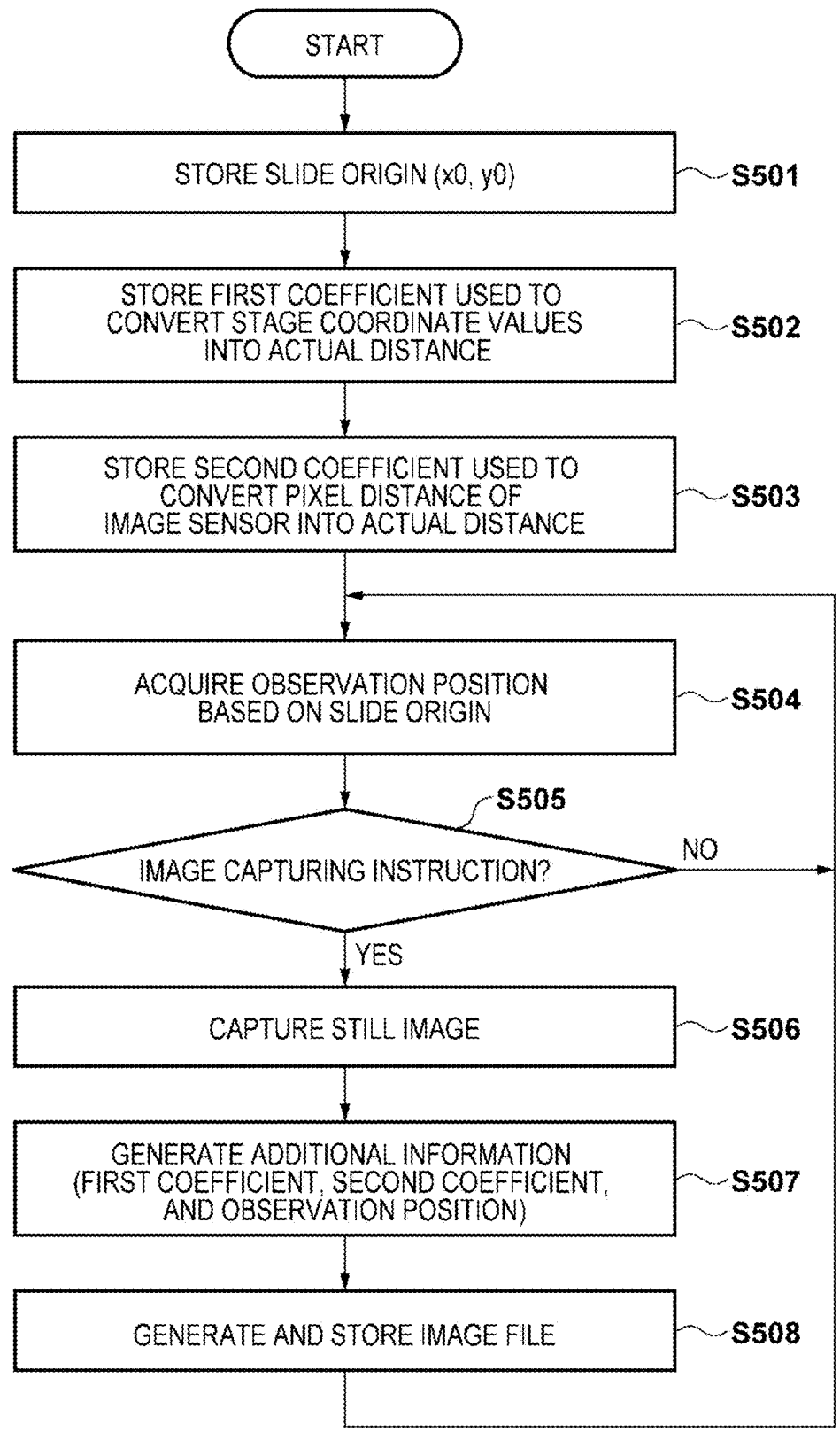

[Fig. 25]
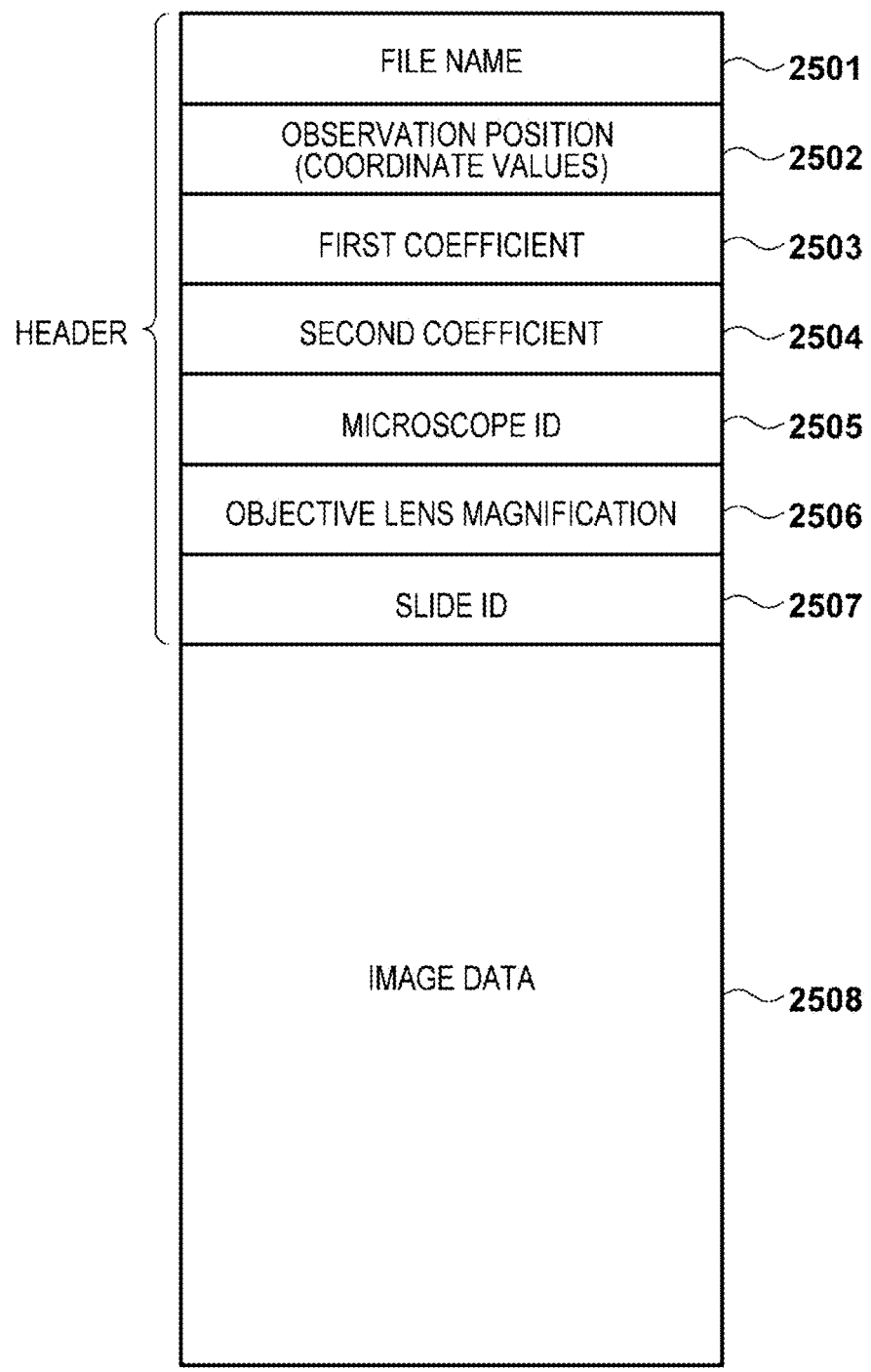

[Fig. 26]
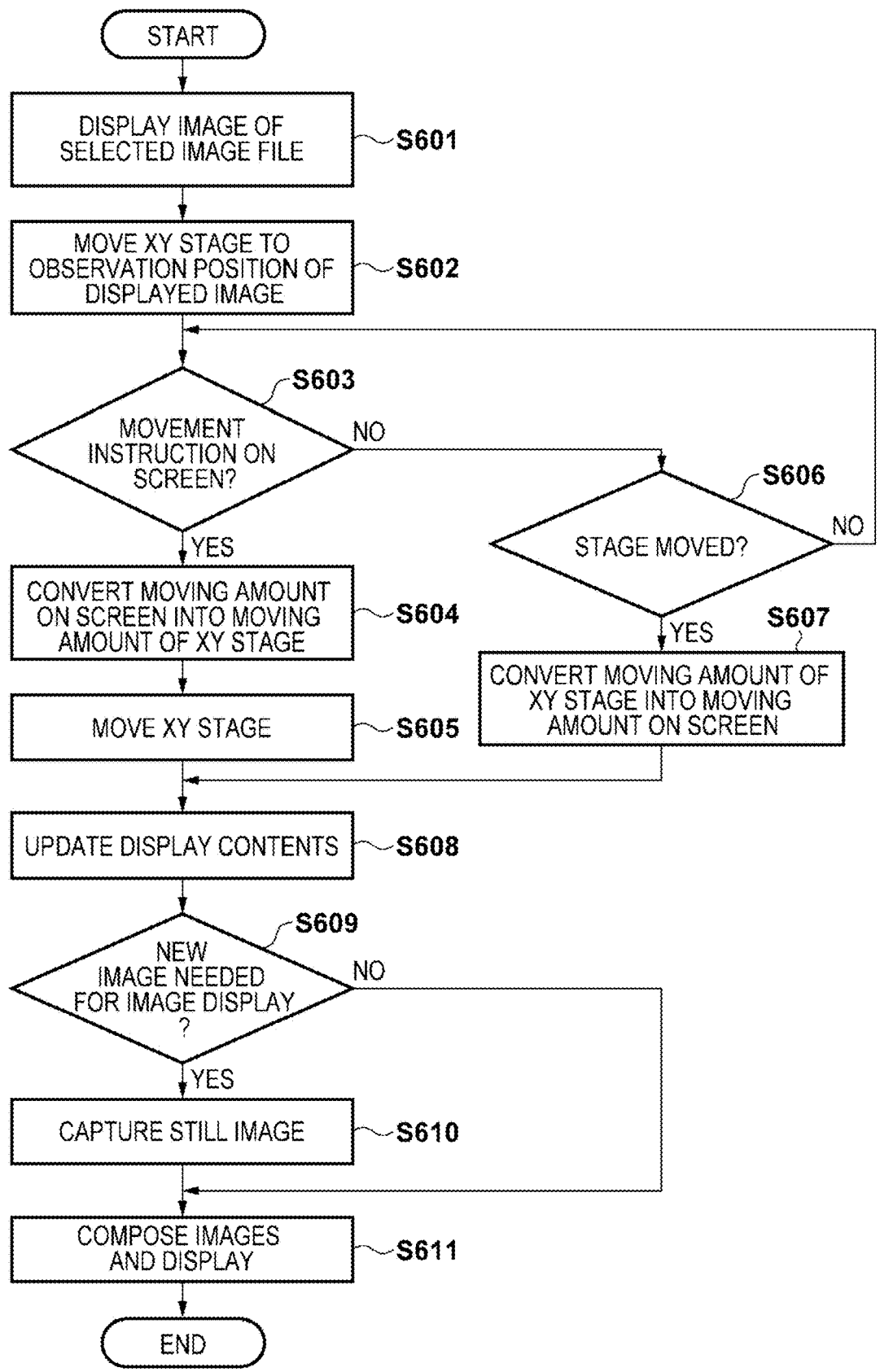

[Fig. 27]
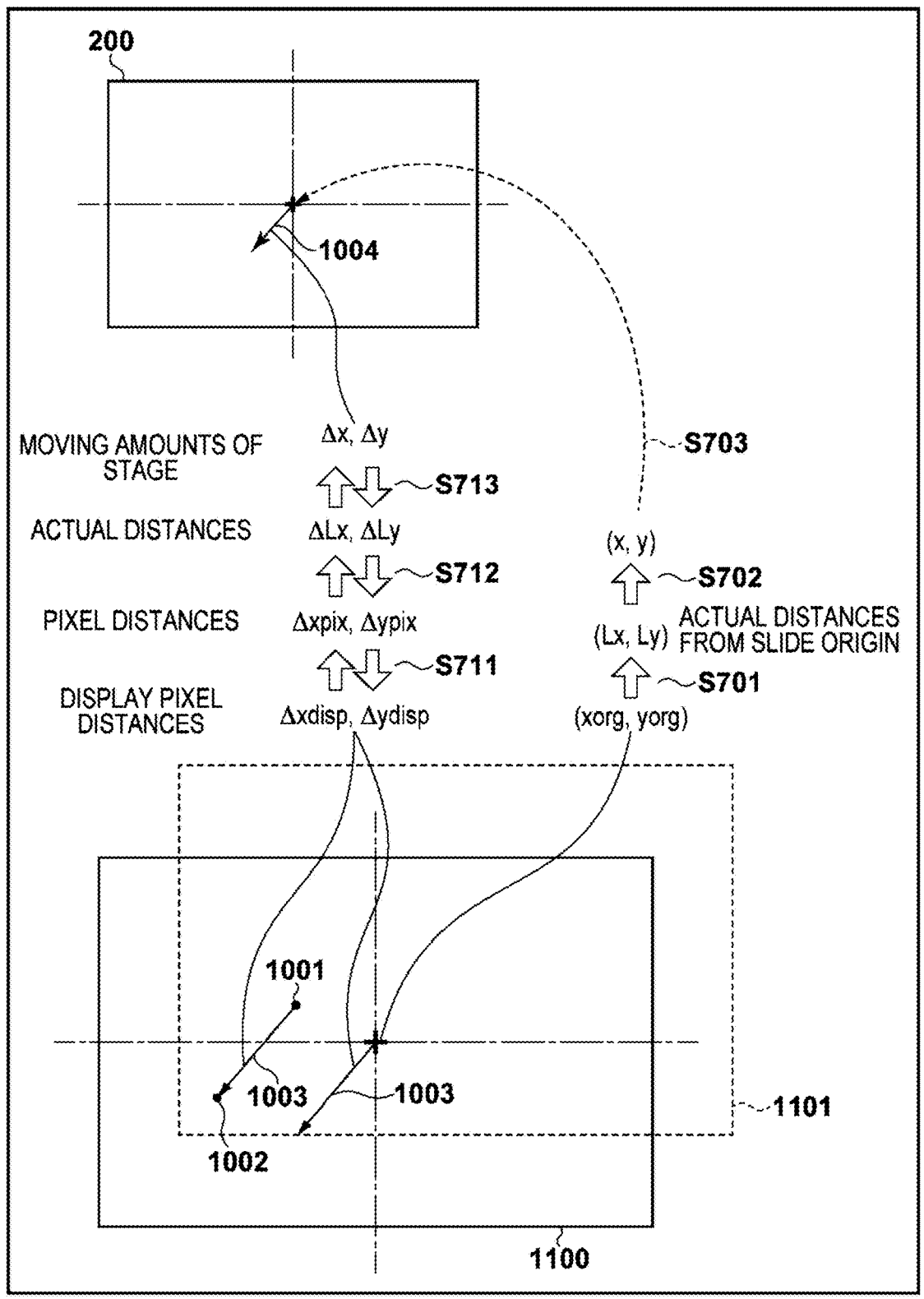

[Fig. 28]
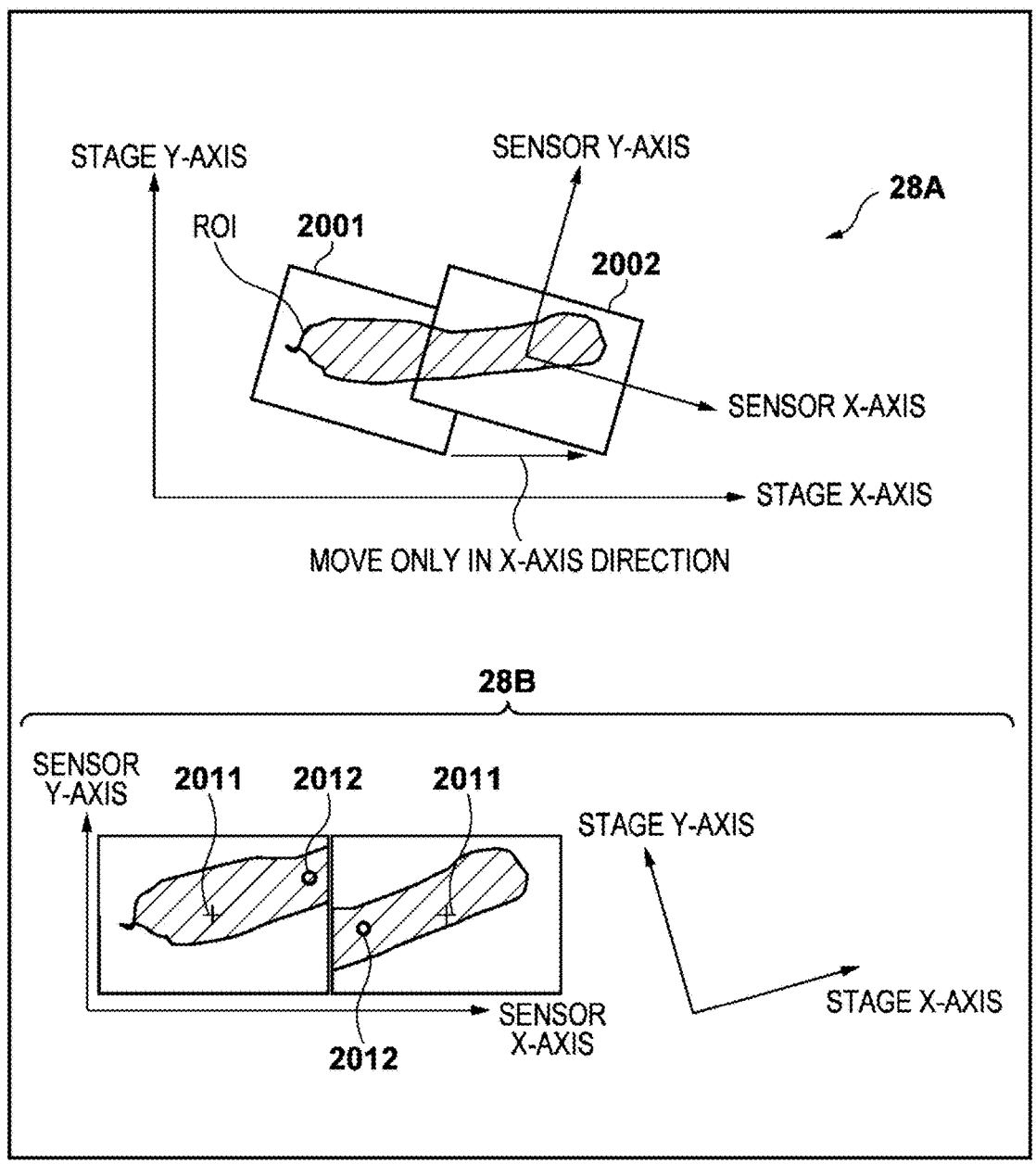

[Fig. 29]
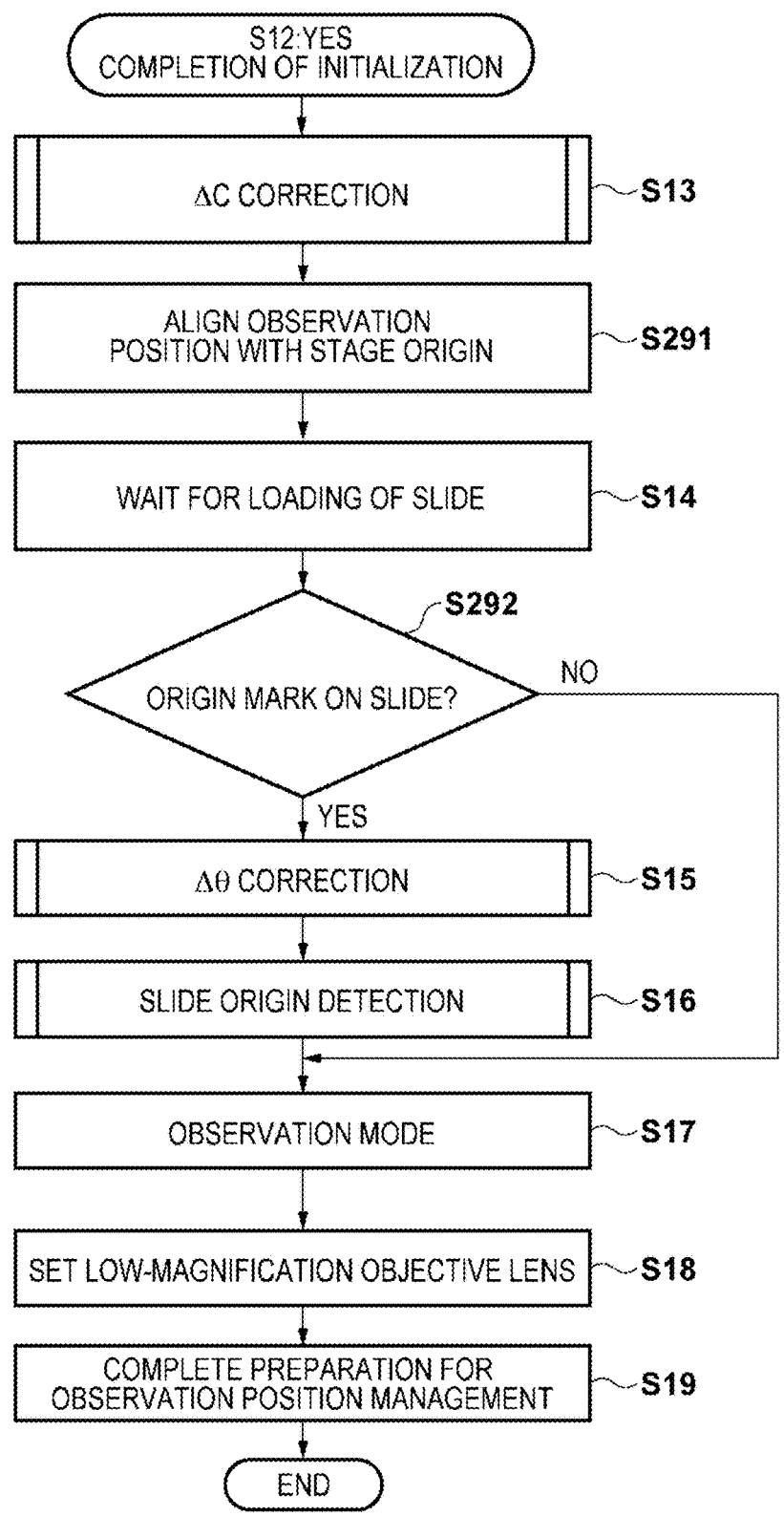

[Fig. 30A]
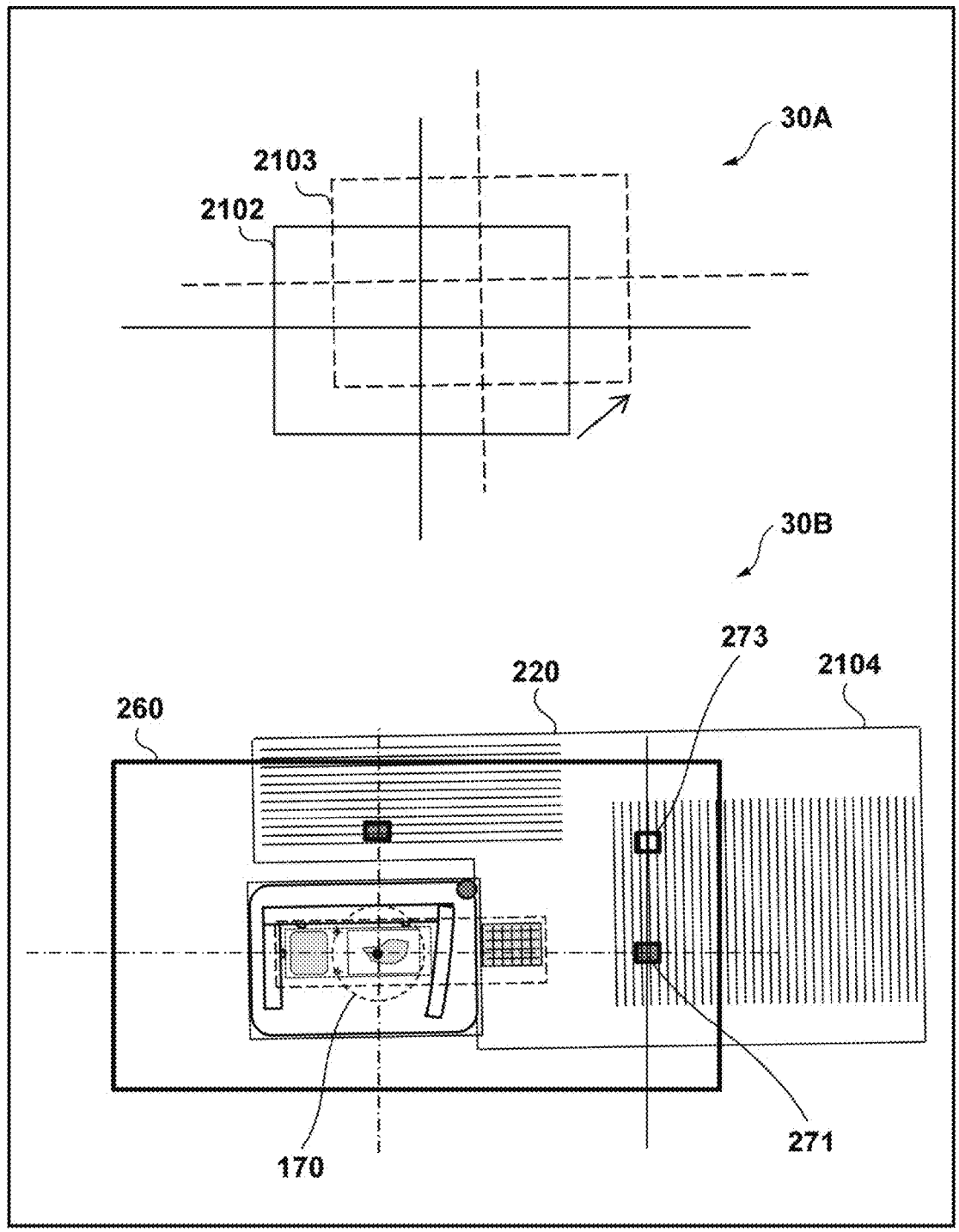

[Fig. 30B]
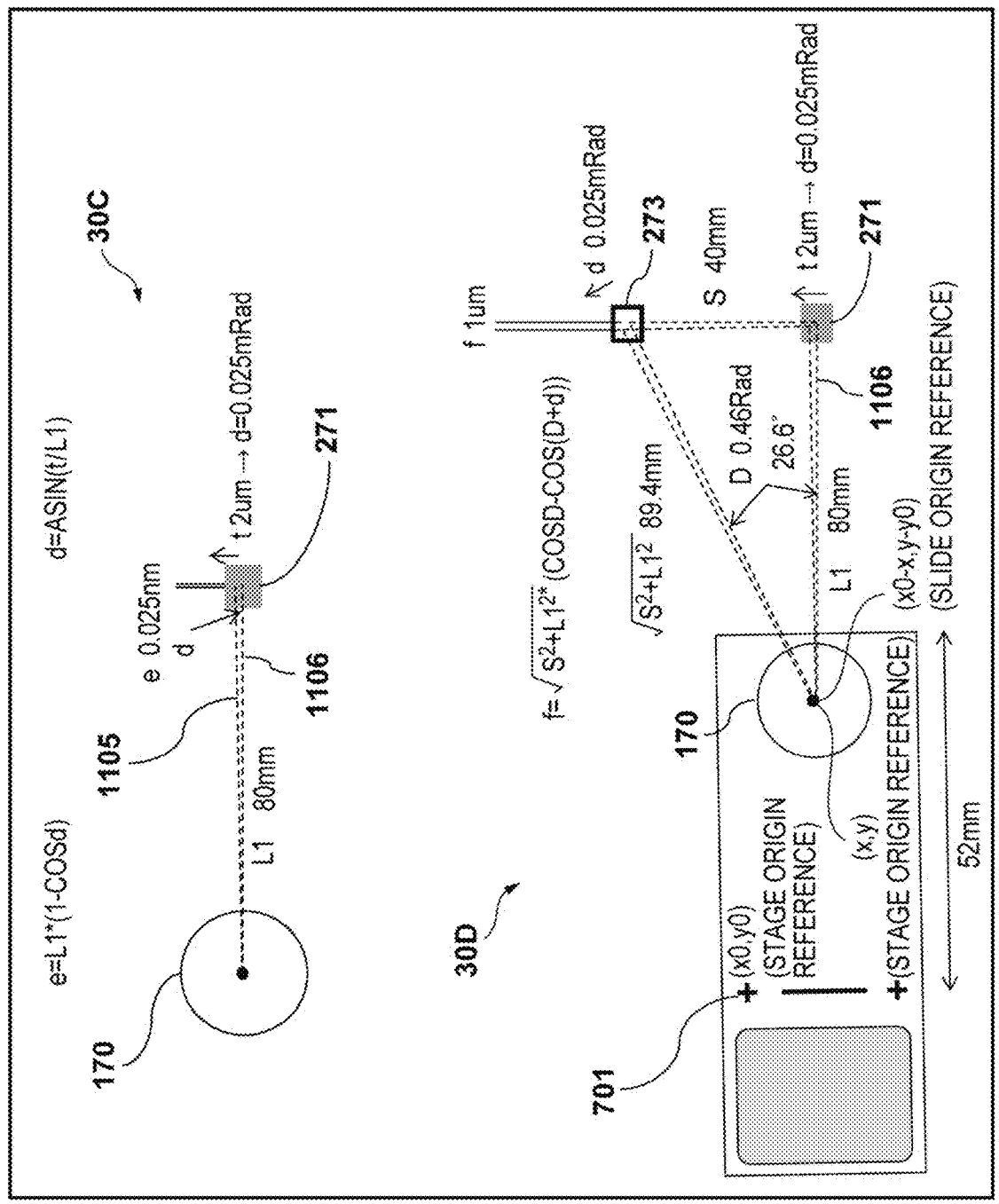

[Fig. 31]
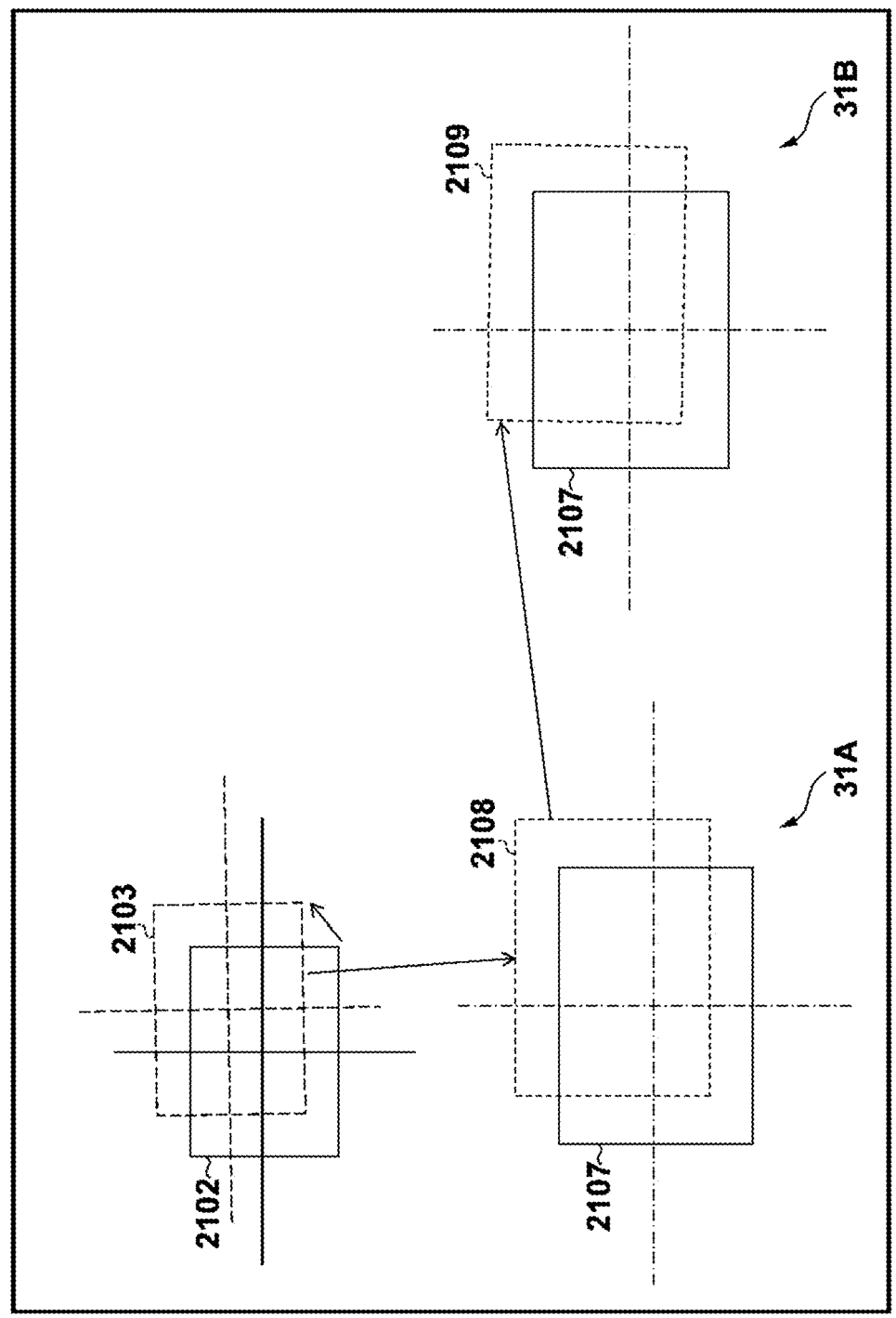

[Fig. 32]
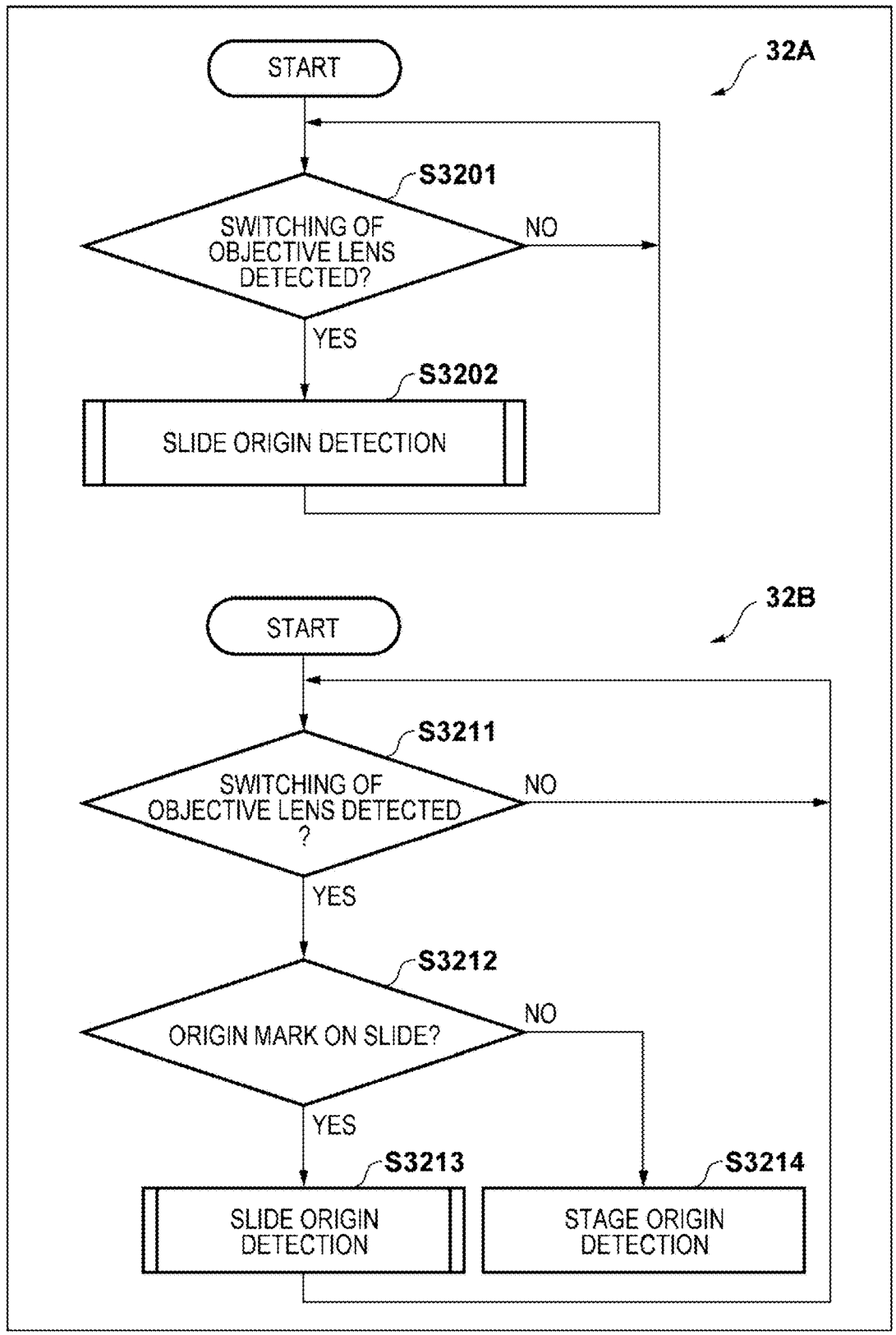

MICROSCOPE SYSTEM

TECHNICAL FIELD

The present invention relates to a microscope system.

BACKGROUND ART

The incidence rate of cancer has recently shown a tendency to greatly increase. To treat cancer, pathological diagnosis for diagnosing properties of cancer is important, and a treatment policy is determined depending on the diagnosis contents. As for the growth mechanism of cancer, it has been understood that cancer is caused by genes. A tumultus that has occurred in a gene appears as an atypical intracellular morphology, atypical cell morphology, atypical tissue morphology, or the like. It is morphological diagnosis in pathological diagnosis that observes these atypical shapes by a microscope and determines the tissue type.

On the other hand, recent medical advances have revealed that overexpression of a specific protein coded by an oncogene is often observed in a cancer cell. Characteristics of cancer can be specified by detecting the excessive protein. The protein is detected by, for example, specifically staining the target protein and observing the degree of staining of a tissue on a cell basis using a microscope. This method determines a functional feature of cancer and is called functional diagnosis in pathological diagnosis.

In both morphological diagnosis and functional diagnosis, it is essential to observe the micro-level fine structure of a tissue slice in detail using a microscope (to be referred to as micro observation or micro diagnosis hereinafter). An optical microscope is a particularly important tool for a pathologist. In micro diagnosis by the naked eye using a microscope, it is often necessary to record finding images that are important as evidence. Hence, a digital camera is mounted on the optical microscope and used to record finding images. A digital scanner or digital microscope incorporating a digital camera (image sensor) is also usable. In addition to the microscope, the digital camera that provides an imaging function is also being included in the tools important for the pathologist. For example, a digital microscope incorporating a digital camera (image sensor) (Japanese Patent No. 4600395) can easily capture an evidence image as needed during the process of screening operation. Hence, the digital microscope is very convenient and is desired to be used not only for cancer but widely in pathological diagnosis.

Generally, in pathological diagnosis by a pathologist, morphological diagnosis of a tissue slice is conducted in accordance with the following procedure. That is, in screening performed first in morphological diagnosis, a slide glass (to be referred to as a slide hereinafter) on which a tissue slice that has undergone general staining (HE staining) is placed is observed by a microscope at a low magnification, thereby specifying a morbid portion called a region of interest (ROI). The ROI is observed at a high magnification, thereby making detailed diagnosis. At this time, the pathologist repeats the observation at the low and high magnifications while moving the observation field, that is, moving the XY stage (slide) of the microscope.

For example, the pathologist screens the subject placed on the slide as a whole at a low magnification, and memorizes/records the position of the stage at which the part (ROI) that needs detailed observation has been observed. After ending the screening at the low magnification, the pathologist searches for the observation position of the ROI based on the memorized or recorded XY stage position, switches the magnification to the high magnification, and performs diagnosis. Alternatively, the pathologist can use a procedure of immediately observing, at the high magnification, the ROI found by the low-magnification screening.

On the other hand, in functional diagnosis, normally, functional staining (for example, functional staining by immunohistochemical staining in contrast to morphological staining in morphological diagnosis) is performed for continuous tissue slices having a specific finding in morphological diagnosis, and the tissue slices are observed by the microscope. That is, morphological information and functional diagnosis information are compared and observed between slides.

In morphological diagnosis, it is useful in terms of diagnosis to accurately align the morphological images of a plurality of slides created from a plurality of adjacent tissue slices, display the morphological images that are superimposed, and observe a thickness-direction change in the tissue.

Additionally, in functional diagnosis, it is useful in terms of diagnosis to accurately align a morphological image by general staining (HE staining) and (a plurality of) functional images by functional staining, superimpose the images, and compare and observe a morphological atypism and a function change.

In the microscope system, however, it is impossible to reproduce an observation position or still image capturing position at an accuracy capable of standing up to pathological diagnosis. For example, in the above-described morphological diagnosis, after the screening at the high magnification has ended, the observation position needs to be returned to the position in the low-magnification screening immediately before. Hence, the position of the XY stage immediately before needs to be memorized. That is, the pathologist specifies the observation position of the ROI based on the memory of the manual operation amount in operating the XY stage and the memory of a corresponding observation image.

This is because the general microscope system includes no means for grasping the coordinates of an observation position easily at a necessary accuracy. For example, if the accompanying stage is a manual stage, the coordinate acquisition means is formed from, for example, a main scale and a subscale, like a vernier caliper. It is not easy to read coordinate values from the positional relationship between the main scale and the subscale. In addition, the minimum reading accuracy is about 1/10 mm, which is too coarse in micro observation.

A motor-driven stage generally includes an X stage that moves in the X direction, and a Y stage that is provided on the X stage and moves in the Y direction. Each of the X stage and the Y stage includes a linear encoder configured to measure a moving amount in a corresponding direction. In this case, a position in the X direction is obtained from the linear encoder of the X stage, and a position in the Y direction is obtained from the linear encoder of the Y stage. Then, the coordinate values of the Y stage on which a slide is placed are obtained based on both pieces of position information. With the indirect measurement method of separately obtaining the X- and Y-direction positions, it is difficult to obtain position information of an accuracy required for pathological diagnosis because of coordinate errors caused by, for example, mechanical errors of the X and Y stages.

On the other hand, in functional diagnosis as well, since the observation position of an ROI specified by morphological diagnosis cannot be grasped at a required accuracy, much labor is needed to even search for the corresponding observation position in functional diagnosis.

SUMMARY OF INVENTION

According to one embodiment of the present invention, there is provided a microscope system capable of accurately acquiring the moving amount of a stage in X and Y directions in the microscope system and acquiring an observation position at a microscopic accuracy required for pathological diagnosis.

According to one aspect of the present invention there is provided a microscope system comprising: a microscope body; an XY stage mounted on the microscope body and including a stage configured to place a slide as an observation target and move in an X-axis direction and a Y-axis direction perpendicular to each other; and an XY two-dimensional scale plate fixed to the stage, wherein the XY two-dimensional scale plate is provided with a first mark that provides axis information in the X-axis direction throughout a movable range of the stage in the Y-axis direction and a second mark that provides axis information in the Y-axis direction throughout a movable range of the stage in the X-axis direction, which are used to recognize X- and Y-coordinates of the stage.

According to another aspect of the present invention there is provided a microscope system comprising: a microscope body; and an XY stage mounted on the microscope body and including a stage that is movable relative to a stage base in an X-axis direction and a Y-axis direction perpendicular to each other and is configured to place a slide as an observation target, wherein a mark that provides axis information in one of the X-axis direction and the Y-axis direction is arranged on the stage at a position where the mark is observable by the microscope body.

Further features of the present invention will become apparent from the following description of exemplary embodiments with reference to the attached drawings.

BRIEF DESCRIPTION OF DRAWINGS

FIG. 1 is a perspective view showing a microscope system according to an embodiment.

FIG. 2 shows views illustrating the outline of the arrangement of the optical system of the microscope system according to the embodiment.

FIG. 3 shows views illustrating the outer appearance of the stage included in the microscope according to the embodiment (3A), the upper surface of the stage (3B), and an enlarged part of an area scale (3C).

FIG. 4 shows a side view illustrating a position management plane stage (X stage) (4A) and views for explaining the positional relationship between an XY two-dimensional scale plate and X- and Y-axis sensors (4B, 4C).

FIG. 5 shows views illustrating the positional relationship between X and Y area scales, X- and Y-axis sensors, and skew detecting sensors.

FIG. 6 shows views illustrating the positional relationship between the X and Y area scales, the X- and Y-axis sensors, and the skew detecting sensors.

FIG. 7A shows views for explaining an XY crosshatch provided on the XY two-dimensional scale plate.

FIG. 7B shows views for explaining the XY crosshatch provided on the XY two-dimensional scale plate.

FIG. 8 shows views for explaining a ΔΘ stage (8A, 8B) and a view for explaining rotation of a slide placed on the ΔΘ stage (8C).

FIG. 9 shows views illustrating the position management plane stage.

FIG. 10 shows views illustrating a Y stage.

FIG. 11 shows views illustrating a stage base.

FIG. 12 is a view for explaining an adapter part for camera mounting.

FIG. 13 shows views for explaining a ΔC adapter.

FIG. 14 shows views illustrating a slide glass and reference marks of the slide glass.

FIG. 15 is a block diagram showing an example of the control arrangement of the microscope system according to the embodiment.

FIG. 16 is a flowchart showing the overall operation of the microscope system according to the embodiment.

FIG. 17 is a flowchart showing the initialization operations of parts of the microscope system.

FIG. 18 is a flowchart for explaining a correction operation by the ΔC adapter.

FIG. 19 shows views for explaining alignment adjustment (rotation correction) between an image sensor and a stage.

FIG. 20 is a flowchart for explaining a correction operation by a ΔΘ stage.

FIG. 21 shows views for explaining alignment adjustment (rotation correction) between the image sensor and a slide.

FIG. 22 is a flowchart showing an operation of detecting the origin of a slide.

FIG. 23 shows views for explaining the slide origin detection operation.

FIG. 24 is a flowchart for explaining generation and recording of an image file.

FIG. 25 is a view showing an example of the data structure of an image file.

FIG. 26 is a flowchart showing processing of synchronizing a display and an observation position on a stage.

FIG. 27 is a view for explaining synchronization between a display and an observation position on a stage.

FIG. 28 shows views for explaining the influence of a rotational deviation between the X- and Y-axes of a captured image and the X- and Y-axes of the stage.

FIG. 29 is a flowchart showing an example of processing of coping with a case in which a slide without an origin mark is placed.

FIG. 30A shows views for explaining oblique travel processing according to the embodiment.

FIG. 30B shows views for explaining oblique travel processing according to the embodiment.

FIG. 31 shows views for explaining oblique travel processing according to the embodiment.

FIG. 32 shows flowcharts for explaining processing upon switching an objective lens.

DESCRIPTION OF EMBODIMENTS

An embodiment of the present invention will now be described with reference to the accompanying drawings. Note that an erect-type microscope used for pathological diagnosis, which includes an objective lens arranged above an observation target (slide) and performs transmitted light observation by projecting observation light from the lower surface of the slide, will be described below as an embodiment of the present invention.

An observation position management microscope system according to this embodiment can manage an observation position at a predetermined accuracy required for pathological diagnosis and correctly reproduce a past observation position. For this purpose, the observation position management microscope system uses a slide with references for position management, and also includes an accurate XY stage with a means for, when a slide is placed, correcting a rotational error of the placed slide. In addition, the XY stage has a function of directly grasping the X- and Y-coordinate values of an observation position, and includes a means for correcting, for example, an error of the relative positional relationship to a mounted digital camera (image sensor) or the like. The predetermined accuracy required for pathological diagnosis may be the minimum size of a region of interest (ROI). Structures in a cell are distributed within a range on the micron or submicron order. An atypism observed here can be assumed to be an ROI in a minimum size obtained by pathological diagnosis. On the other hand, with a normally used objective lens for visible light, the resolution at a magnification of 100× is about 0.2 μm (in green light with a wavelength of 550 nm). When an objective lens for ultraviolet light is used, the resolution can be raised to about 0.1 μm (in ultraviolet light with a wavelength of 200 nm). Hence, the minimum size of an ROI is, for example, 10 times the ultraviolet resolution limit of 0.1 μm, that is, 1 μm square. Hence, the target accuracy of position management is 0.1 μm which is equal to the resolution limit. Coordinate management is done at, for example, 1/10 of the accuracy, that is, in steps of 0.01 μm. An observation position management microscope system that implements such a position accuracy will be described below. To support even an existing slide without references for position management from the viewpoint of compatibility, the observation position management microscope system according to this embodiment also includes a predetermined means for coping with the slide.

FIG. 1 is a perspective view showing the basic arrangement of an observation position management microscope system (to be referred to as a microscope system 10 hereinafter) according to this embodiment. The microscope system 10 includes a microscope body 100, a stage 200, an adapter part 300 for camera mounting, a digital camera 400, and a control unit 500. The stage 200, the adapter part 300, and the digital camera 400 have arrangements and functions ready for position management according to this embodiment. The control unit 500 includes a controller 501 and a display 502. The controller 501 includes a CPU 511 and a memory 512 (see FIG. 15). The CPU 511 executes a program stored in the memory 512, thereby executing various kinds of processing to be described later. The controller 501 controls display on the display 502 serving as a display part.

A microscope base stand 121 that constitutes the microscope body 100 is a solid body frame used to attach various structures of the microscope. An eyepiece base 122 is fixed to the microscope base stand 121 and connects an eyepiece barrel 123. A light source box 124 stores a light source (for example, a halogen lamp or LED) for transmission observation and is attached to the microscope base stand 121. A Z knob 125 is a knob used to move a Z base 130 in the Z-axis direction (vertical direction). The stage 200 that provides a position management function is placed on the Z base 130. The Z base 130 is mounted on the microscope base stand 121 by a Z-base moving mechanism 131 (see 2A of FIG. 2) that moves the Z base 130 in the Z direction in accordance with rotation of the Z knob 125. Reference numeral 126 denotes an objective lens unit. There exist a plurality of types of units according to optical magnifications. A revolver 127 has a structure capable of attaching the plurality of types of objective lens units 126. By rotating the revolver 127, a desired objective lens unit can be selected for observation by the microscope.

The stage 200 includes a ΔΘ stage 600 that rotates about the Z-axis while having a slide (to be referred to as a slide 700 hereinafter) with position references placed on it, and an XY stage that moves the ΔΘ stage 600 with the slide 700 placed on it on an XY plane including the X direction and the Y direction. The ΔΘ stage 600 provides a function of correcting a rotational deviation based on position reference marks on the slide 700. The stage 200 includes an XY two-dimensional scale plate 210 with accurate scales in the X and Y directions on the XY stage. An X knob 201 and a Y knob 202 are knobs used to manually move the stage 200 in the X direction and Y direction, respectively.

The adapter part 300 is an adapter for camera mounting which functions as a mounting part configured to mount the digital camera 400 on the eyepiece base 122 via a base mount 128. The adapter part 300 has a function of performing axis alignment between the digital camera 400 and the base mount 128. The base mount 128 includes a predetermined screw mechanism with an alignment reference.

The digital camera 400 is detachably attached to the microscope body 100 via the adapter part 300 and the base mount 128 while maintaining a predetermined positional relationship to the eyepiece base 122. The digital camera 400 captures a microscopic image obtained by the microscope body 100. The digital camera 400 aims at evidence recording. The digital camera 400 is connected to the controller 501 via, for example, a USB interface cable 11, and captures an observed image under the microscope in accordance with an instruction from the controller 501. The captured observed image is displayed on the display 502 under the control of the controller 501. The image capturing function of the digital camera 400 includes a still image capturing function and a live image capturing function of performing so-called live view that displays an output from an image sensor on a monitor in real time. The resolution of the live image capturing function is lower than that of the still image capturing function. The live image capturing function and the still image capturing function can transmit a captured image (moving image or still image) to an external apparatus via a predetermined interface (in this embodiment, a USB interface).

FIG. 2 shows views for explaining the optical system of the microscope system 10 according to this embodiment. As shown in 2A of FIG. 2, the light source box 124 stores a light source 141 for transmission observation, and a collector lens 142 that collects source light from the light source 141. A field stop 143 determines the illumination diameter on the slide. The source light that has passed through the field stop 143 passes through a mirror 144, a relay lens 145, an aperture stop 146, and a condenser lens 147 and irradiates a subject (tissue slice) on the slide. The light transmitted through the subject on the slide glass enters an objective lens 148 in the objective lens unit 126. The light that has passed through the objective lens 148 reaches a split prism 150 via an imaging lens 149. Note that each of the collector lens 142, the relay lens 145, the condenser lens 147, the objective lens 148, and the imaging lens 149, and the like is normally formed from a combination of a plurality of lenses.

The split prism 150 is also called a beam splitter, and has a function of switching the optical path of an optical image from the objective lens 148 to an eyepiece optical system or an imaging optical system. For example, a reflecting prism for the eyepiece optical system and a straight prism for the imaging optical system are replaced by a push-pull rod. It is therefore possible to attain one of a state in which only image capturing by the digital camera 400 (image sensor 401) is performed, and observation from the eyepiece barrel 123 cannot be done, and a state in which only observation from the eyepiece barrel 123 is performed, and image capturing by the image sensor 401 cannot be done.

In place of or in addition to the above-described arrangement, a half mirror split prism that passes a half light amount to each of the eyepiece optical system and the imaging optical system may be arranged. In this case, a state in which both image capturing by the image sensor 401 and observation from the eyepiece barrel 123 can be performed can be provided. When the split prism 150 is switched to the camera side, the light transmitted through the tissue slice forms an image on the image sensor 401 in the digital camera 400 via an adapter lens 301. The digital camera 400 including the image sensor 401 captures the image under the microscope.

The optical path of the eyepiece system is an optical path to the eyepiece barrel 123. In FIG. 2, 2B indicates a view for explaining an example of the eyepiece optical system of the eyepiece barrel 123, which illustrates an example of a siedentopf binocular barrel. In 2B of FIG. 2, the optical system on the right side is a left-eye optical system. A left-eye split prism 151 forms an image on an imaging plane 152 of the primary image of the left-eye system, and the image is observed by the user via a left-eye eyepiece 153. On the other hand, the optical system on the left side of 2B in FIG. 2 is a right-eye optical system. A right-eye parallel prism 154 forms an image on an imaging plane 155 of the primary image of the right-eye system, and the image is observed by the user via a right-eye eyepiece 156.

Referring back to 2A of FIG. 2, when the adapter part 300 and the digital camera 400 are mounted, the adapter lens 301 and the image sensor 401 are arranged in the optical path of the imaging optical system. The adapter lens 301 is a lens incorporated in the adapter part 300 attached to the eyepiece base 122, and is normally formed from a plurality of lenses. With the adapter lens 301, an observation image is formed on the imaging plane of the image sensor 401 disposed in the digital camera 400, and the microscopic image can be captured by the digital camera 400.

In FIG. 3, 3A is a perspective view showing the arrangement of the stage 200 ready for position management. In 3A of FIG. 3, a position management plane stage 220 serving as an X stage is located on the uppermost surface of the stage 200, and moves in the X direction on a Y stage 240. The Y stage 240 moves in the Y direction on a stage base 260. The stage base 260 is fixed on the Z base 130 of the microscope body 100. An XY stage is formed by the stage base 260, the Y stage 240, and the position management plane stage 220. The XY two-dimensional scale plate 210 are fixed and the ΔΘ stage 600 are placed on the position management plane stage 220. The slide 700 is placed on the ΔΘ stage 600.

In FIG. 3, 3B is a view showing the upper surface of the position management plane stage 220. As described above, the ΔΘ stage 600 and the XY two-dimensional scale plate 210 are disposed on the upper surface of the position management plane stage 220. An X area scale 211 having X-direction axis information used for position management when moving in the X direction, a Y area scale 212 having Y-direction axis information used for position management when moving in the Y direction, and an XY crosshatch 213 serving as an XY-axis alignment reference are formed highly accurately on the upper surface of the XY two-dimensional scale plate 210. Note that to form the references that implement accurate position management, a material having a very small thermal expansion coefficient, for example, synthetic quartz is used as the material of the XY two-dimensional scale plate 210, and the XY two-dimensional scale plate 210 is integrally formed.

Nanotechnology of a semiconductor exposure apparatus or the like is used to form the patterns of the X area scale 211, the Y area scale 212, and the XY crosshatch 213 of the XY two-dimensional scale plate 210. For example, the X area scale 211, the Y area scale 212, and the XY crosshatch 213 formed from sets of lines along the X- and Y-axes are integrally formed on a quartz wafer by the nanotechnology at an accuracy of 5 nm to 10 nm. Note that the X area scale 211, the Y area scale 212, and the XY crosshatch 213 can be formed by drawing using a semiconductor exposure apparatus, but nanoimprint is preferably used to implement at low cost. After that, the wafer is cut into a predetermined shape by machining, thereby obtaining the XY two-dimensional scale plate 210. For this reason, the degree of matching between the X- and Y-axes of the X area scale 211 and the X- and Y-axes of the XY crosshatch 213, the degree of matching between the X- and Y-axes of the Y area scale 212 and the X- and Y-axes of the XY crosshatch 213, and the perpendicularity between the X-axis and the Y-axis can be formed on the nanometer order. Hence, the X-axis and the Y-axis of the XY crosshatch 213 can represent the X-axis and the Y-axis of the X area scale 211 and the Y area scale 212 at an accuracy of nanometer order. Note that the X area scale 211, the Y area scale 212, and the XY crosshatch 213 can also be individually separated or separately formed and disposed on the position management plane stage such that they hold a predetermined positional relationship. However, to implement this, an advanced alignment technique for correcting mechanical errors is needed, resulting in an increase in the cost.

The slide 700 is placed on the ΔΘ stage 600. As for the placement direction, the slide 700 is placed such that, for example, a label area 721 is located on the left side of an origin mark 701, and a cover glass area 722 that is a region to arrange the observation target and a cover glass is located on the right side of the origin mark 701, as shown in 3B of FIG. 3. A region 205 indicated by a broken line is the observation target region of the microscope. The observation target region 205 is a range in which the center position of the objective lens 148 (or the center position (observation position) of the image sensor 401) moves relative to the XY stage. The observation target region 205 has a size to include the slide 700 and the XY crosshatch 213 with an allowance. This allows the slide 700 and the XY crosshatch 213 to be arranged in the observation target region 205 under any condition. That is, not only the slide 700 but also the XY crosshatch 213 are arranged to be captured by the digital camera 400 serving as an image capturing part.

In this embodiment, the upper right corner of the observation target region 205 is defined as a crosshatch origin on the XY crosshatch. The crosshatch origin is made to match a stage origin 206. In addition, a state in which the center of the objective lens 148 (or the center (observation position) of the image sensor 401) matches the stage origin 206 is defined as the XY initialization position of the stage 200. However, another point may be defined as the stage origin, as a matter of course. Note that the X-axis and the Y-axis of stage coordinates, that is, a stage X-axis 203 and a stage Y-axis 204 are parallel to the X- and Y-axes of the XY crosshatch 213, respectively.

In FIG. 3, 3C shows an example of the scale pattern of the X area scale 211. The X area scale 211 is formed as a transmission diffraction grating including transmission parts and light-shielding parts in the X direction to detect a position. For example, each of the transmission parts and the light-shielding parts is a line having a width of 2 μm. The transmission parts and the light-shielding parts are disposed in pairs at a pitch of 4 μm. Note that the scale pattern may be a phase grating that has step differences so as to periodically change the optical path length.

In FIG. 4, 4A is a view showing the Z-direction positional relationship between the slide 700 and the X area scale 211, the Y area scale 212, and the XY crosshatch 213 on the XY two-dimensional scale plate 210. As shown in 4A of FIG. 4, the position management plane stage 220 and the ΔΘ stage 600 are designed such that the upper surface of the slide 700 and that of the XY two-dimensional scale plate 210 become flush with each other at a predetermined accuracy. Hence, the upper surface of the ΔΘ stage 600 is lower than the upper surface of the XY two-dimensional scale plate 210 by an amount corresponding to the thickness of the slide 700. As described above, in this embodiment, the upper surface of the XY two-dimensional scale plate 210 (the surface on which the X area scale 211, the Y area scale 212, and the XY crosshatch 213 are arranged) and the upper surface of the slide 700 are made to match (almost flush with each other). The Z-direction positions of the marks (patterns) arranged on the XY two-dimensional scale plate 210 can thus match those of the marks (patterns) provided on the slide 700. This makes it possible to accurately manage the XY position of the observation surface, that is, the upper surface part of the slide 700 based on the external position references (the X area scale 211 and the Y area scale 212). Since the XY crosshatch 213 represents the X area scale 211 or the Y area scale 212, it is important that the XY crosshatch 213 is located on the same plane as these area scales. Note that from the viewpoint of implementation, the upper surface of the XY two-dimensional scale plate 210 (the surface on which the marks are arranged) and the upper surface of the slide 700 need only exist within the range of about 0.5 mm in the Z direction.

The scale pattern of the X area scale 211 or the Y area scale 212 is read by a detection sensor (an X-axis sensor 271 or a Y-axis sensor 272) fixed to the stage base 260, and the XY coordinates of the stage 200 are directly accurately acquired in correspondence with an observation position itself. That is, the microscope system does not use an indirect method in which a coordinate on one specific axis for each axis (X-axis or Y-axis) of the XY stage represents a coordinate value, for example, the coordinate values of the Y stage are obtained by combining position information in the X direction obtained from the linear encoder of the X stage and position information in the Y direction obtained from the linear encoder of the Y stage. In this embodiment, the movement of the position management plane stage (X stage) 220 that moves in the X and Y directions is directly measured by the XY two-dimensional scale plate 210. This allows the detection sensor to detect, for example, a small displacement in the Y direction when the X stage 220 moves in the X direction or a small displacement in the X direction when the Y stage 240 moves in the Y direction according to a mechanical play or error. Hence, the accuracy of position management can largely be improved. There are two methods concerning the Z-direction positional relationship between the X area scale 211 and the Y area scale 212 and the X-axis sensor 271 and the Y-axis sensor 272, as shown in 4B and 4C of FIG. 4. In 4B of FIG. 4 that shows the first method, the X-axis sensor 271 and the Y-axis sensor 272 are arranged above the XY two-dimensional scale plate 210 (on the objective lens side). In this case, a light-shielding film 214 needs to be provided on the lower surface of the XY two-dimensional scale plate 210. In 4C of FIG. 4 that shows the second method, the X-axis sensor 271 and the Y-axis sensor 272 are arranged under the XY two-dimensional scale plate 210 (on the side of the Z base 130). In this case, the light-shielding film 214 is provided on the upper surface of the XY two-dimensional scale plate 210. Note that the XY crosshatch 213 needs to be observed by the digital camera 400, the light-shielding film is not arranged at the position of the XY crosshatch 213.

In the first method, as shown in 4B of FIG. 4, the X-axis sensor 271 and the Y-axis sensor 272 are implemented on the lower surface of a sensor attachment member 208 that hangs over the position management plane stage 220 via an L-shaped member 207 fixed to the stage base 260. The detection surfaces of the X-axis sensor 271 and the Y-axis sensor 272 face downward to read the X area scale 211 and the Y area scale 212 on the position management plane stage 220. In the second method, the X-axis sensor 271 and the Y-axis sensor 272, each having the detection surface facing upward, are implemented on the stage base 260 such that the detection surfaces are located at a predetermined height. The X-axis sensor 271 and the Y-axis sensor 272 on the stage base 260 located in the lowermost part read, from the lower side via holes each formed in the Y stage 240 and the position management plane stage 220 and having a predetermined size, the X area scale 211 and the Y area scale 212 located in the uppermost part.

Note that the X- and Y-direction arrangements of the X-axis sensor 271 and the Y-axis sensor 272 are common to the first and second methods. The attached position of the X-axis sensor 271 in the Y-direction is set on the X-axis passing through the field center (the center of the objective lens 148) of an observation field 170 (illustrated much larger than the size of the actual observation field) of the microscope, thereby ensuring the position detection accuracy in the X direction. The attached position of the Y-axis sensor 272 in the X-direction is set on the Y-axis passing through the center (the field center (the center of the objective lens 148)) of the observation field 170 (illustrated much larger than the size of the actual observation field) of the microscope, thereby ensuring the position detection accuracy in the Y direction. By the XY two-dimensional scale plate 210, the X area scale 211 and the Y area scale 212 used to obtain the X-coordinate and the Y-coordinate of the stage 200, and the XY crosshatch for axis alignment (to be described later) of the image sensor 401 are provided on the same surface of the same member. It is therefore possible to obtain the X and Y area scales having an accurate pitch and perpendicularity and the XY crosshatch that accurately matches the axial directions of the area scales and thus acquire accurate coordinates.

Note that in this embodiment, skew detecting sensor 273 is provided so as to maintain the position management accuracy even if a small oblique travel or meandering (complex oblique travel) occurs in the position management plane stage 220. In the examples shown in 4B and 4C of FIG. 4, an oblique travel is detected in the X-axis direction. The skew detecting sensor 273 is implemented at a predetermined interval in the Y direction of the attached position of the X-axis sensor 271. The longer the interval between the X-axis sensor 271 and the skew detecting sensor 273 is, the higher the accuracy is. Hence, the two sensors are arranged within the movable range of the stage as far as possible unless they are off the X area scale 211. Note that the oblique travel may be detected in the Y-axis direction. In that case, the skew detecting sensor 273 is implemented at a predetermined interval in the X direction of the attached position of the Y-axis sensor 272. Since the perpendicularity between the X area scale 211 and the Y area scale 212 is guaranteed to be accurate by the forming method, detecting an oblique travel in one of the X and Y directions suffices.

Note that as each of the X-axis sensor 271 and the Y-axis sensor 272, a detection sensor described in Japanese Patent Application No. 2014-079401 by the same applicant is usable. When this detection sensor and an accurate area scale by nanotechnology are used, for example, a resolution of 10 nm (0.01 µm) or less and a position accuracy of 0.1 µm can be implemented by a ½000 interpolation operation. This is merely an example, as a matter of course. Another commercially available detection sensor using an optical lens may be used as each of the X-axis sensor 271 and the Y-axis sensor 272, and a resolution of 10 nm (0.01 µm) or less and a position accuracy of 0.1 µm may be implemented by a known interpolation operation. The scale shown in 3C of FIG. 3 is an example of an incremental type. However, it may be an absolute type. That is, an encoder (scale and sensor) of any type is employable as long as a predetermined accuracy is obtained. Note that the Y area scale 212 has a scale pattern obtained by rotating the X area scale 211 by 90° around the Z-axis. The X area scale may include Y-axis information, or conversely, the Y area scale may include X-axis information.

In FIGS. 5, 5A and 5B show the positional relationship between the X-axis sensor 271, the Y-axis sensor 272, and the skew detecting sensor 273 and the X area scale 211 and the Y area scale 212. This relationship is the same for both the sensor arrangement by the above-described first method and the sensor arrangement by the second method.

In FIG. 5, 5A shows the positional relationship between the sensors and the scales in a case in which the observation position by the microscope, that is, the center of the observation field 170 (illustrated much larger than the size of the actual observation field) of the microscope is located at the XY initialization position, that is, the stage origin 206. In this case, the position management plane stage 220 is located at the lower left end (the left end and the far end) with respect to the microscope base stand 121. On the other hand, 5B of FIG. 5 shows the positional relationship between the sensors and the scales in a case in which the observation position by the microscope, that is, the center of the observation field 170 is located at the lower left corner of the observation target region 205. In this case, the position management plane stage 220 is located at the upper right end (the right end and the near end) with respect to the microscope base stand 121.

Sizes needed by the X area scale 211 and the Y area scale 212 can be known from 5A and 5B of FIG. 5. That is, the X area scale 211 needs a size obtained by adding a size to include the X-direction moving amount of the observation target region 205 with an allowance and the same size for oblique travel detection, that is, a size about twice larger than the size of the observation target region 205, and the Y area scale 212 needs a size to include the Y-direction moving amount of the observation target region 205 with an allowance.

However, when detecting an oblique travel in the Y direction, the Y area scale 212 needs a size about twice larger than the size of the observation target region, and the X area scale 211 needs a size to include the X-direction moving amount of the observation target region 205 with an allowance.

If each of the X-axis sensor, the Y-axis sensor, and the skew detecting sensor includes a plurality of sensors, and detection is relayed by the sensors, the size of each area scale can be reduced. This enables downsizing of the position management plane stage 220. In FIGS. 6, 6A and 6B show an example in which each sensor includes two sensors. Note that in this example, a plurality of sensors configured to do relay are arranged for each of the X-axis sensor and the Y-axis sensor. However, a plurality of sensors configured to do relay may be arranged for one of the X-axis sensor and the Y-axis sensor.

Referring to 6A and 6B of FIG. 6, an X-axis intermediate sensor 271a, a Y-axis intermediate sensor 272a, and an skew detecting intermediate sensor 273a are arranged at the intermediate positions (positions at which the X- and Y-direction moving amounts are halved) to the X-axis sensor 271, the Y-axis sensor 272, and the skew detecting sensor 273, respectively. In FIG. 6, 6A shows a case in which the center of the observation field 170 is located at the XY initialization position, that is, the stage origin 206. In FIG. 6, 6B shows a case in which the center of the observation field 170 is located at the lower left corner of the observation target region 205. As is apparent from 5A and 5B of FIGS. 5 and 6A and 6B of FIG. 6, when relay by the intermediate sensors is performed, the X area scale 211 can have a size ½ in the X direction, and the Y area scale 212 can have a size ½ in the Y direction. That is, the X-axis sensor 271 and the X-axis intermediate sensor 271a are arranged at a predetermined interval along the X-axis direction, and the size of the X area scale 211 in the X-axis direction is larger than the predetermined interval but can be made smaller than the movable range of the XY stage in the X-axis direction. This also applies to a case in which the Y-axis intermediate sensor 272a is provided. Hence, the size of the XY two-dimensional scale plate 210 can be reduced as compared to a case in which each of the X-axis sensor 271 and the Y-axis sensor 272 includes one sensor.

The XY crosshatch 213 provided on the XY two-dimensional scale plate 210 will be described next. In FIGS. 7A, 7A and 7B are views for explaining the pattern of the XY crosshatch 213. As shown in 7A of FIG. 7A, the XY crosshatch 213 includes four types of position reference marks, that is, a crosshatch 290, a crosshatch origin 291, a crosshatch X-axis 292, and a crosshatch Y-axis 293. The crosshatch X-axis 292 and the crosshatch Y-axis 293 are linear patterns extending in the X direction and the Y direction, respectively.

The crosshatch origin 291 is used as the stage origin 206 (that is, the stage reference position used to obtain the coordinates of the stage origin reference) at the XY initialization position of the stage, and located at the upper right corner of the observation target region 205 (the region in which the center of the objective lens 148 moves). The crosshatch 290, the crosshatch X-axis 292, and the crosshatch Y-axis 293 are the references of the X-axis and the Y-axis of the stage 200. The parts of the stage 200 are assembled so as to be aligned with the X-axis and the Y-axis of the XY crosshatch 213, or adjusted after assembled. That is, the parts are assembled such that the X and Y moving directions (the stage X-axis 203 and the stage Y-axis 204) of the stage 200 accurately match the X and Y directions of the XY crosshatch 213. The X and Y moving directions of the stage 200 are thus aligned with the X-axis direction of the X area scale 211 and the Y-axis direction of the Y area scale 212, respectively. The XY crosshatch 213 arranged at a position on the XY two-dimensional scale plate 210 observable by the digital camera 400 can thus be used for XY-axis alignment between the stage 200 and the image sensor 401 of the digital camera 400. Note that when attaching the stage 200 to the microscope body 100, the XY crosshatch 213 can also be used for XY-axis alignment between the stage 200 and the microscope base stand 121.

As will be described later, in the microscope system according to this embodiment, the X- and Y-axis directions of the stage 200 and the X- and Y-axis directions of the slide 700 placed on the stage 200 are made to accurately match via the image sensor 401. This enables universal position management without any influence of a displacement that occurs when one slide is replaced and observed or a stage characteristic between different digital microscopes. More specifically, the X- and Y-axis directions of the stage 200 and those of the image sensor 401 are made to match based on an image obtained by capturing the XY crosshatch 213 by the digital camera 400, and the X- and Y-axis directions of the slide 700 and those of the image sensor 401 are made to match based on an image obtained by capturing the Y-axis mark of the slide 700 using the digital camera 400, thereby matching the X- and Y-axis directions of the stage 200 with the X- and Y-axis direction of the slide 700 placed on the stage 200. Details of processing will be described later.

In FIG. 7A, 7B shows a detailed example of the dimensional relationship between the four marks, that is, the crosshatch origin 291, the crosshatch X-axis 292, the crosshatch Y-axis 293, and the crosshatch 290. The crosshatch X-axis 292 is a complex of a plurality of X-axis lines having different widths, and the crosshatch Y-axis 293 is a complex of a plurality of Y-axis lines having different widths. The crosshatch X-axis 292 and the crosshatch Y-axis 293 have axis information in the X-axis direction and axis information in the Y-axis direction, respectively. Note that the widths of the lines correspond to the objective lenses with a plurality of magnifications. That is, each of the crosshatch X-axis 292 and the crosshatch Y-axis 293 is formed from a plurality of lines with different widths. The plurality of lines are line patterns arranged to be symmetric with respect to the center line (X-axis or Y-axis). The crosshatch origin 291 is arranged such that its center matches the intersection between the center line of the crosshatch X-axis 292 and that of the crosshatch Y-axis 293. An X initial position mark 234 (9B of FIG. 9) and a Y initial position mark 253 (10B of FIG. 10) (both will be described later) are implemented according to the crosshatch origin 291.

In FIGS. 7B, 7C and 7D show a more detailed example of the structure of the crosshatch Y-axis 293. 7D is an enlarged view of the central part of 7C. The crosshatch Y-axis 293 has a structure in which, for example, a plurality of pairs of lines with the same width are arranged to be symmetric with respect to the center line serving as the axis of symmetry while changing the width. Note that a certain line may exist on the center line. In addition, the relationship between lines and spaces may be reversed. Accordingly, in both the angle of view at a low magnification of the objective lens and the angle of view at a high magnification, an appropriate number of lines with appropriate widths are captured by the live image capturing function or the still image capturing function, and a predetermined accuracy is ensured in center-of-gravity (barycentric position) detection (to be described later). The crosshatch X-axis 292 has a structure obtained by rotating the crosshatch Y-axis 293 by 90°. The intervals of the center lines of the lines or spaces of the crosshatch X-axis 292 and the crosshatch Y-axis 293, the intervals of the boundaries (edges) between the lines and spaces, the widths of the lines or spaces, and the like are set to predetermined values and are useful as actual distance information. Each line may further be formed from an aggregate of pairs of fine lines and spaces. The width of the fine line is set to, for example, 1/10 or less of the width of the narrowest line out of the plurality of lines that form the mark (for example, 1 μm). This enables finer actual distance information to be included.

The crosshatch 290 is formed by arranging, in the X direction and the Y direction at a pitch of 1 mm, small crosshatches each including two X-axis lines and two Y-axis lines which are 0.5 mm long each and are alternately arranged within a 1 mm square. In FIG. 7B, 7E shows a detailed example of the structure of the small crosshatch. The 0.5 mm long X- and Y-axis lines of the small crosshatch are larger than the field size (0.37 mm) of a 40× objective lens. Only an X-axis line or Y-axis line can be observed in an appropriate width within the visual field, and accurate position information can be acquired by barycentric position detection. The crosshatch 290 is useful for adjustment or maintenance of the stage moving accuracy. The crosshatch 290 can also be used to measure a distortion on the periphery of the observation field 170. The measured distortion can be used for distortion correction of a captured image. Note that the intervals between the reference marks included the XY crosshatch 213, the sizes of the reference marks, the structures of the reference marks, the intervals of the center lines of the lines or spaces of the reference marks, the intervals of the boundaries (edges) between the lines and spaces, the widths of the lines or spaces, and the like are set to predetermined values and are useful as actual distance information. Note that as shown in 7B of FIG. 7A, all of the sizes of the reference marks, the distances between them, and the like are more than the field size of, for example, a 10× objective lens, that is, 1.5 mm. That is, to efficiently detect the mark positions, the position reference marks are disposed at intervals equal to or more than a distance equivalent to the field size (in this embodiment, equal to or more than the field size (1.5 mm) of the 10× objective lens) so as not to simultaneously observe adjacent position reference marks within the same visual field of the microscope. Note that the crosshatch origin 291 may also include fine lines (for example, white lines and black lines which are 1 μm wide each and are alternately arranged), like the crosshatch X-axis 292 and the crosshatch Y-axis 293.

Note that the XY two-dimensional scale plate 210 need not always be integrally formed if the X area scale 211, the Y area scale 212, and the XY crosshatch 213 can maintain the accuracy in the axial directions of the XY stage and the accuracy of perpendicularity between the X-axis direction and the Y-axis direction. However, if a structure in which the Y area scale configured to detect a Y-direction position is arranged on the Y stage, and the X area scale configured to detect an X-direction position is arranged on the X stage, like a general XY stage in which a linear (uniaxial) scale configured to detect a Y-direction position is arranged on the Y stage, and a linear (uniaxial) scale configured to detect an X-direction position is arranged on the X stage, is employed, an advanced machining technique and alignment technique are required to maintain the above-described accuracies. This may lead to an increase in the cost of the microscope. In addition, if the scales are separately provided on the stages, it is impossible to detect a motion in another direction (for example, the Y direction) caused by "looseness" of the mechanism during stage movement only in one direction (for example, the X direction). However, if the integrally formed XY two-dimensional scale plate 210 is used, a position change caused by the "looseness" can reliably be detected because the X area scale 211 and the Y area scale 212 always move together.

The structure of the ΔΘ stage 600 disposed on the position management plane stage 220 will be described next with reference to 8A and 8B of FIG. 8. The ΔΘ stage 600 is a rotating stage that rotates around the Z-axis with respect to a rotation center 601 as the center. The ΔΘ stage 600 aims at correcting a rotational deviation of a slide that occurs upon placing the slide and attaining the above-described target accuracy of ±0.1 µm in position management of the observation position whether in automatic slide loading or in manual loading.

The worst value of the rotational deviation is assumed to be about ±0.5 mm at an end, which is equivalent to a rotational deviation of about)±0.4° (±0.38°. This state is shown in 8C of FIG. 8. To correct the rotational deviation of the slide, the slide is rotated by the ΔΘ stage 600 and corrected to a vertical error (tangent error or TAN error) of ±0.1 µm (about ±0.1 millidegree) within the observable range (56 mm). Note that practically, if the vertical error can be suppressed to ±0.1 µm (about ±3 millidegrees) or less at the two ends of a 2 mm observation range, a level more than enough for pathological diagnosis is expected to be obtained. A range of ±2° to ±3° is sufficient as the maximum movable range of ΔΘ.

In 8A of FIG. 8, a slide holder 602 that defines the placement position of a slide is disposed on the ΔΘ stage 600, and the slide 700 with position references is placed. A lever 604 provided on the slide holder 602 has a function of pressing the slide 700 against a reference position 603 of the slide holder 602. The slide 700 is thus stably placed.

Within the XY plane of the ΔΘ stage 600, the ΔΘ stage 600 can slidably rotate around the rotation center 601 that serves as a rotation axis and is fixed to the position management plane stage 220. For example, in the position management plane stage 220, a ΔΘ driving motor 611, a screw shaft 612 of a ball screw, and a nut part 613 of a ball screw are implemented. The screw shaft 612 is a member disposed at the distal end of the rotating shaft of the ΔΘ driving motor 611, and the nut part 613 is a member that moves in the screw shaft direction in accordance with rotation of the screw shaft 612 of the ball screw. When the ΔΘ driving motor 611 is rotated, the screw shaft 612 rotates, and a driving linear gear 614 attached to the nut part 613 moves. For this reason, a driven arc gear 615 as the counterpart of fitting attached to an end of the ΔΘ stage 600 moves. As a result, the ΔΘ stage 600 rotates around the rotation center 601 together with the placed slide, and the rotational error of the slide is corrected. In FIG. 8, 8B shows a state in which the slide 700 is rotated clockwise by an angle θ. Note that the rotational driving of the ΔΘ stage 600 can be done not only by the above-described combination of a driving motor, a ball screw, and gears but also by, for example, ultrasonic driving using friction caused by a moving element and a driving motor.

In addition, a ΔΘ initial position mark 620 used for initialization at the time of activation is attached to the end of the ΔΘ stage 600, and defines the initial position of the ΔΘ stage 600. A ΔΘ initial position sensor 621 is provided on the side of the position management plane stage 220 so as to face the ΔΘ initial position mark 620, and detects the initial position of the ΔΘ stage 600 at the time of activation. If the initial position is used as a reference position in a case without a rotational deviation of the slide, rotating the ΔΘ stage 600 within the range of, for example, ±2° to ±3° to each side of the reference position suffices. Control of the ΔΘ stage 600 will be described later.

The position management plane stage 220, the Y stage 240, and the stage base 260, which constitute the XY stage of the stage 200 according to this embodiment, will be described next in detail. Note that the structure of each stage in a case in which the sensor arrangement method (the method of arranging the X-axis sensor 271, the Y-axis sensor 272, and the skew detecting sensor 273 on the stage base 260) explained with reference to 4C of FIG. 4 is used will be described below. However, the structures and the like in a case in which the sensor arrangement method shown in 4B of FIG. 4 is used can also be known from the following explanation.

The position management plane stage 220 will be described first with reference to 9A and 9B of FIG. 9. In FIG. 9, 9A is a top view of the position management plane stage 220 (viewed from the objective lens side), and 9B is a bottom view of the position management plane stage 220 (viewed from the side of the Z base 130). In this embodiment, the position management plane stage 220 has the function of an X stage that moves in the X direction on the Y stage 240.

Openings 221 and 222 that allow the X-axis sensor 271, the Y-axis sensor 272, and the skew detecting sensor 273 to access the area scales are provided at positions corresponding to the X area scale 211 and the Y area scale 212 of the XY two-dimensional scale plate 210. The openings 221 and 222 have sizes to include the X area scale 211 and the Y area scale 212, respectively.

An opening 223 is provided in a range in which a condenser lens opening 224 relatively moves on the position management plane stage 220 when the center of the condenser lens opening 224 (having a size larger than the size of a condenser lens unit incorporating the condenser lens 147 so as to form an allowance) moves relative to the XY stage throughout the observation target region 205. Because of the opening 223, the condenser lens unit (the case incorporating the condenser lens) never interferes with the position management plane stage 220 no matter where the position management plane stage 220 moves in the observation target region 205.

Two X-axis cross roller guides 231 are disposed on the lower side on the position management plane stage 220 so as to be parallel to the X-axis direction. X-axis cross roller guides 241 (10A and 10B of FIG. 10) are attached to the upper surface of the Y stage 240 so as to face the X-axis cross roller guides 231. The position management plane stage 220 is thus supported by the Y stage 240 so as to be slidable in the X direction. An X slider 232 is the movable element of an X-axis driving motor 242 (10A and 10B of FIG. 10) incorporated in the opposing surface of the Y stage 240. The position management plane stage 220 is driven in the X-axis direction by the X-axis driving motor 242. That is, the X-axis driving motor 242 and the X slider 232 form a linear motor by, for example, an ultrasonic wave.

An X-axis rack gear 233 moves the position management plane stage 220 in the X direction along with rotation of an X-axis pinion gear 244 on the Y stage 240 that rotates in synchronism with the X knob 201. Note that the manual movement of the position management plane stage 220 in the X direction can be done not only by the rack and pinion but also by, for example, a wire and pulley method. At any rate, in this embodiment, the position management plane stage 220 can be moved in the X direction by both the manual driving means and the electric driving means.

The X initial position mark 234 corresponds to the X-direction position of the stage origin 206 that is the XY initialization position of the stage 200. In this embodiment, the X initial position mark 234 is implemented on an extension of the center line of the crosshatch Y-axis 293 passing through the crosshatch origin 291 of the XY crosshatch 213.

The Y stage 240 will be described next with reference to 10A and 10B of FIG. 10. In FIG. 10, 10A is a top view of the Y stage 240 (viewed from the side of the position management plane stage 220), and 10B is a bottom view of the Y stage 240 (viewed from the side of the Z base 130).

In 10A of FIG. 10, the X-axis cross roller guides 241 are paired with the X-axis cross roller guides 231 disposed on the lower surface of the position management plane stage 220 and support the position management plane stage 220 slidably in the X-axis direction. The X-axis driving motor 242 moves the position management plane stage 220 in the X direction via the X slider 232 of the position management plane stage 220. The X-axis pinion gear 244 meshes with the X-axis rack gear 233 provided on the lower surface of the position management plane stage 220, and moves the position management plane stage 220 in the X-axis direction by rotation. Since the X-axis pinion gear 244 rotates in accordance with the rotation of the X knob 201, the user can move the position management plane stage 220 in the X-axis direction by operating the X knob 201. An X initial position sensor 243 detects the X initial position mark 234 provided on the lower surface of the position management plane stage 220.

An opening 245 is an opening that causes the X-axis sensor 271 and the skew detecting sensor 273 arranged on the stage base 260 to access the X area scale 211 via the opening 221 of the position management plane stage 220. Since the Y stage 240 moves in the Y direction out of the X and Y directions relative to the stage base 260, the opening 245 has a shape extending in the Y direction. Similarly, an opening 246 is an opening that causes the Y-axis sensor 272 provided on the stage base 260 to access the Y area scale 212 via the opening 222 of the position management plane stage 220. An opening 247 corresponds to a region in which condenser lens opening 224 moves in a case in which the center (also serving as the center of the condenser lens 147) of the condenser lens opening 224 (having a size larger than the size of the condenser lens unit incorporating the condenser lens 147 so as to form an allowance) moves in the observation target region 205. As described above, since the Y stage 240 moves in the Y direction out of the X and Y directions, the opening 247 has a shape extending not in the X-axis direction but in the Y-axis direction. Because of the opening 247, the Y stage 240 never interferes with the condenser lens unit even when moved in the Y direction of the observation target region 205.

Two Y-axis cross roller guides 251 are disposed on the lower surface of the Y stage 240 (10B of FIG. 10) so as to be parallel to the Y-axis. Cross roller guides paired with the Y-axis cross roller guides 251 are attached to the stage base 260. The Y stage 240 is thus supported by the stage base 260 so as to be slidable in the Y direction. A Y slider 252 is the movable element of a Y-axis driving motor 264 (FIG. 11) incorporated in the opposing surface of the stage base 260. The Y stage 240 is driven in the Y-axis direction by the Y-axis driving motor 264. The Y-axis driving motor 264 and the Y slider 252 form a linear motor by, for example, an ultrasonic wave.

A Y-axis pinion gear 254 rotates along with rotation of the Y knob 202. As the Y knob 202 rotates, the Y-axis pinion gear 254 moves a Y-axis rack gear 263 (FIG. 11) fixed on the stage base 260 in the Y-axis direction. Hence, the user can manually move the Y stage 240 in the Y-axis direction by operating the Y knob 202. Note that the manual movement of the stage in the Y direction can be done not only by the rack and pinion but also by, for example, a wire and pulley method. At any rate, in this embodiment, the Y stage 240 can be moved in the Y direction by both the manual driving means and the electric driving means. The Y stage 240 moves in the Y direction relative to the stage base 260 while supporting the position management plane stage 220. The Y initial position mark 253 is a mark arranged at a position corresponding to the Y-direction position of the stage origin 206. In this embodiment, the Y initial position mark 253 is implemented on an extension of the center line of the crosshatch X-axis 292 passing through the crosshatch origin 291 of the XY crosshatch 213.

The stage base 260 will be described next with reference to FIG. 11. FIG. 11 is a top view of the stage base 260 (the stage base 260 viewed from the side of the Y stage 240). The X-axis sensor 271 and the skew detecting sensor 273 which are configured to read the X area scale 211 and the Y-axis sensor 272 configured to read the Y area scale 212 are attached onto the stage base 260. The heights of the sensors are adjusted by a base (not shown) so as to obtain predetermined distances to the X area scale 211 and the Y area scale 212 of the XY two-dimensional scale plate 210 provided on the position management plane stage 220. As described above, the X-axis sensor 271 is provided on the X-axis passing through the stage origin 206, and the Y-axis sensor 272 is provided on the Y-axis passing through the stage origin 206. The skew detecting sensor 273 is implemented at a predetermined interval in the Y direction of the attached position of the X-axis sensor 271.

Y-axis cross roller guides 262 are paired with the Y-axis cross roller guides 251 disposed on the lower surface of the Y stage 240 and support the Y stage 240 slidably in the Y-axis direction. The Y-axis driving motor 264 is a motor configured to electrically move the Y stage 240 (Y slider 252) in the Y direction. The Y-axis rack gear 263 moves the Y stage 240 in the Y direction in accordance with the rotation of the Y-axis pinion gear 254. A Y initial position sensor 265 detects the Y initial position mark 253 provided on the lower surface of the Y stage 240. An opening 261 corresponds to the condenser lens opening 224 (having a size larger than the size of the condenser lens unit incorporating the condenser lens 147 so as to form an allowance). Because of the opening 261, the condenser lens unit never interferes with the stage base 260.

Note that the lower surface of the stage base 260 is provided with a plurality of screw holes (not shown) to fix the stage base 260 on the Z base 130.

The openings 261, 247, and 223 allow the condenser lens unit to approach the observation position on the slide from the lower side of the slide, and also pass source light condensed by the condenser lens 147.

The sizes of the openings for the X-axis sensor 271, the Y-axis sensor 272, the skew detecting sensor 273, and the condenser lens 147 provided in the above-described stages can be large to some extent as long as the mechanical strength and accuracies are maintained.

The adapter part 300 configured to connect the eyepiece base 122 and the digital camera 400 will be described next. The image sensor 401 is an area sensor (camera sensor) in which pixels each formed from, for example, a CMOS element are arrayed in a matrix, that is, in the row direction (X direction) and the column direction (Y direction), and has X- and Y-axes. Generally, in the microscope, the X and Y-axes (determined by the optical system of the split prism 150 and the eyepiece barrel 123 (2B of FIG. 2)) of the observation optical system are assembled in accordance with the X-axis of the microscope base stand 121. The XY stage is also attached via the Z base 130 at a predetermined accuracy in accordance with the X-axis of the microscope base stand 121. Hence, if the X-axis of the image sensor 401 has a rotational deviation with respect to the X-axis of the eyepiece barrel 123 (=the X-axis of the microscope base stand 121), the X- and Y-axes have a rotational deviation with respect to the X- and Y-axes of an eyepiece observation image and the X- and Y-axes of the stage.

The digital camera 400 is attached to the adapter part 300 via a lens mount with an alignment pin. The adapter part 300 is attached to the eyepiece base 122 by screwing with an alignment pin. The alignment pin is assumed to always produce a slight rotational deviation because of its mechanical accuracy. In FIGS. 28, 28A and 28B are views for explaining the influence of a rotational deviation between the X- and Y-axes of a captured image (the X- and Y-axes of the image sensor 401) and the X- and Y-axes of the stage. The views are exaggerated to some extent for the descriptive convenience. For example, as shown in 28A of FIG. 28, when the stage 200 is moved in the X-axis direction, and an entire ROI is captured as two adjacent images 2001 and 2002, the images are captured obliquely alike due to the rotational deviation.

On the other hand, the captured images 2001 and 2002 (evidence images) are displayed using the X-axis of the image sensor as the horizontal axis, as shown in 28B of FIG. 28. Referring to 28B of FIG. 28, reference numeral 2011 denotes a field center which matches the center of the image sensor 401. Reference numeral 2012 assumes an object of interest in the ROI area and indicates the same object in the images 2001 and 2002. However, because of the above-described rotational deviation, the Y-coordinate value changes between the images 2001 and 2002 that are adjacent on the left and right. This means that the coordinate values on each evidence image are different from position coordinates by the stage. In particular, assuming a case in which the ROI is large, and the entire ROI area covers the whole tissue slice area on the slide, this means that the coordinates of the observation position based on the X- and Y-axes of the sensor largely deviate from the coordinate values based on the X- and Y-axes of the stage. From the viewpoint of position management, the coordinates of a point of interest on the evidence image based on the X- and Y-axes of the sensor are preferably the same as the coordinates based on the X- and Y-axes of the stage. The target accuracy of the degree of matching is the same as the target of position management by the above-described XY stage, that is, 0.1 μm (in steps of 0.01 μm).

In addition, when the controller 501 composes the two images to generate the evidence image of the entire ROI, rotation correction by image processing is necessary. However, the amount of the rotational deviation is unknown, the degree of difficulty in accurately connecting images by image recognition processing is high, and rotation calculation processing normally causes degradation in image quality. However, if the rotational deviation falls within the position management target of 0.1 μm, the two images can accurately be connected by simple translation. The adapter part 300 according to this embodiment includes a mechanism configured to align the X- and Y-axes of the image sensor 401 with the X- and Y-axes of the stage 200 (XY stage), and thus copes with the above-described problem.

FIG. 12 is a view showing the structure of the adapter part 300. In general, the microscope body 100 and the digital camera 400 are manufactured by different makers. In consideration of compatibility between products of different makers, the adapter part 300 has a three body structure including an optical adapter 320 that is a first adapter part, a ΔC adapter 340 that is a second adapter part, and a camera adapter 360 that is a third adapter part. This is because since the base mount 128 of the eyepiece base 122 complies with a standard unique to a microscope maker, and the camera mount of the digital camera 400 complies with a standard unique to a camera maker, it is preferable to provide the ΔC adapter 340 with a new mount as a new common standard.

Note that the base mount 128 on the eyepiece base 122 shown in FIG. 12, which complies with the standard unique to the microscope maker, generally only aims at fixing the optical adapter, and the position in the rotation direction is indefinite. In this embodiment, however, the base mount 128 includes a mount that is newly given an alignment reference hole 311 such that rotation positions of the eyepiece base 122 and the optical adapter have a predetermined positional relationship. In correspondence with this, a base stand-side mount 321 of the optical adapter 320 whose position in the rotation direction is indefinite is also newly given an alignment reference projection 322. When the optical adapter 320 is mounted by fitting the reference projection 322 in the alignment reference hole 311 of the base mount 128, the position of the optical adapter 320 in the rotation direction (the fitting position to the alignment reference hole 311) is uniquely determined with respect to the eyepiece base 122.

The adapter lens 301 is stored in the optical adapter 320. In addition, an adapter-side mount 331 serving as the concave side of the new common standard mount is provided at an end on the opposite side of the base stand-side mount 321 of the optical adapter 320. The adapter-side mount 331 has an alignment reference hole 332 and is connected to the ΔC adapter 340. A base stand-side mount 341 that is the convex side of the new common standard mount of the ΔC adapter 340 includes an alignment reference projection 358 which is fitted in the alignment reference hole 332 to connect the base stand-side mount 341 to the adapter-side mount 331 of the optical adapter 320.

A camera-side mount 342 of the ΔC adapter 340 is a mount serving as the concave side of the new common standard mount. The camera-side mount 342 has an alignment reference hole 359 and is connected to the camera adapter 360. On the other hand, in the camera adapter 360, an adapter-side mount 361 is the convex side of the new common standard mount and includes a reference projection 362 for alignment. The adapter-side mount 361 of the camera adapter 360 is mounted on the camera-side mount 342 of the ΔC adapter 340. When mounting the camera adapter 360 on the ΔC adapter 340, the reference projection 362 of the camera adapter 360 is fitted in the alignment reference hole 359 of the ΔC adapter 340, and the rotation direction of the camera adapter 360 is uniquely determined with respect to the ΔC adapter 340. A camera lens mount 363 of the camera adapter 360 is a mount complying with a standard unique to the camera maker, and normally includes an alignment mechanism of a unique standard to a camera mount 402 of the digital camera 400.

With the above-described arrangement, via
    mechanical connection between the eyepiece base 122 and the optical adapter 320
    mechanical connection between the optical adapter 320 and the ΔC adapter 340 mechanical connection between the ΔC adapter 340 and the camera adapter 360, and mechanical connection between the camera adapter 360 and the digital camera 400, the positions of the eyepiece base 122 and the image sensor 401 of the digital camera 400 in the rotation direction are defined within a predetermined accuracy. That is, the positional relationship in the rotation direction between the X- and Y-axes of the microscope base stand 121 of the microscope and the X- and Y-axes of the image sensor 401 of the digital camera 400 is ensured within the predetermined accuracy determined by the mechanical accuracy. In this case, since the mechanical accuracies at the above-described four connection portions are totaled, the rotation alignment accuracy is, for example, ±0.5 mm (about ±1°) at worst in the periphery with 50 mmΦ. This corresponds to a rotational deviation of ±0.5 mm at two ends of a 50 mm observation range.

The alignment accuracy by the above-described mechanical reference mechanism provided on the mount cannot implement the target accuracy of ±0.1 μm, and cannot cope with the problem concerning the rotation of the image sensor 401 described above with reference to 28A and 28B of FIG. 28. The ΔC adapter 340 according to this embodiment corrects the rotational deviation between the microscope base stand 121 and the image sensor 401 of the digital camera 400, and implements the target accuracy of ±0.1 μm in accurate position management. A vertical error of ±0.1 μm corresponds to about ±0.1 millidegree at the two ends of a 56 mm observation range. Hence, the ΔC adapter 340 is required to have a capability of correcting an error within the range of about ±1° to about ±0.1 millidegree. Note that practically, if the vertical error can be suppressed to ±0.1 μm (about ±3 millidegrees) at the two ends of a 2 mm observation range, a level more than enough for pathological diagnosis is expected to be obtained. In this case as well, the ΔC adapter 340 needs to correct an error within the range of about ±1° to about ±3 millidegree. Note that a range of ±2° to ±3° is sufficient as the maximum correction range of the ΔC adapter 340. The ΔC adapter 340 includes a rotation mechanism configured to implement a function of performing alignment adjustment (rotation correction) at such an accuracy.

In FIG. 13, 13A shows the structure of the ΔC adapter 340. The mount 341 is the convex side of the common standard mount including the alignment reference projection 358 serving as a connection part. An inner cylinder part 343 on the convex side is fixed to an outer ring part 345 of a cross roller ring 344. An outer cylinder 346 is assembled to the upper part of the outer ring part 345. The outer cylinder 346 includes an outer cylinder base plate 347. A ΔC driving motor 348, a ball screw 349 (13B of FIG. 13), an electric circuit board (not shown) for driving control, and the like are implemented on the outer cylinder base plate 347. The mount 342 serving as the concave side of the common standard mount is assembled to an inner ring part 350 of the cross roller ring 344. The inner ring part 350 smoothly rotates relative to the outer ring part 345 via a roller bearing 351 disposed between the outer ring part 345 and the inner ring part 350 of the cross roller ring 344. That is, the mount 342 includes the concave side of the common standard mount as the connection part to the camera adapter 360, and rotates relative to the base mount 341 that is the convex side of the common standard mount. As a result, the digital camera 400 rotates relative to the microscope base stand 121 (eyepiece base 122). A driving mechanism that changes the arrangement relationship (in this embodiment, the rotation positional relationship) between the mount 341 and the mount 342 is thus constituted.

In FIG. 13, 13B is a view showing the rotational driving method of the ΔC adapter 340. A screw shaft 352 of the ball screw 349 is formed at the end of the rotor shaft of the ΔC driving motor 348 fixed on the outer cylinder base plate 347. Along with rotation of the screw shaft 352, a nut part 353 of the ball screw linearly moves in the axial direction of the ΔC driving motor 348. At this time, a driving linear gear 354 fixed to the nut part 353 of the ball screw also moves. The counterpart of fitting of the driving linear gear 354 is a driven arc gear 355 fixed to the outer wall of the mount 342 serving as the concave side of the common standard mount. As the driving linear gear 354 moves, the mount 342 is rotationally driven. Rotation correction of the mount 342 serving as the concave side of the common standard mount is thus performed relative to the mount 341 serving as the convex side of the common standard mount. The ΔC driving motor 348 is driven by a control circuit (not shown) so as to rotate the mount 342 by a predetermined angle in accordance with a driving instruction from the controller 501. Note that the rotational driving of the mount 342 can be done not only by the combination of a driving motor, a ball screw, and gears but also by, for example, ultrasonic driving using friction caused by a moving element and a driving motor.

A ΔC initial position mark 356 used for initialization at the time of activation is attached to a predetermined position of the outer wall of the mount 342 serving as the convex side of the common standard mount, and defines the ΔC initial position. A ΔC initial position sensor 357 is disposed on the outer cylinder base plate 347 so as to face the ΔC initial position mark 356, and detects the initial position at the time of activation. For example, when the ΔC initial position is assumed to be the fitting position between an alignment reference hole and an alignment reference projection, the ΔC adapter 340 performs ΔC correction within the range of, for example, ±2° to ±3° based on the detected initial position. That is, the ΔC adapter 340 according to this embodiment performs coarse alignment (first adjustment) by the mechanical alignment mechanisms using the alignment reference projections 322, 358, and 362 and the alignment reference holes 311, 332, and 359 and the alignment mechanism by the ΔC initial position sensor 357. After that, fine alignment (second adjustment) using the ΔC driving motor 348 is done based on an image acquired by the image sensor 401. By the two-stage alignment, the X- and Y-axis directions of the image sensor 401 are made to accurately match the X- and Y-axis directions of the stage.

The slide (slide 700) with position references used in the microscope system 10 according to this embodiment will be described next. In FIG. 14, 14A to 14C are views for explaining the slide 700 according to this embodiment. As will be described below, the slide 700 has at least two marks, that is, the origin mark 701 and a Y-axis mark 703. The marks represent a specific position on the Y-axis and a specific position on the X-axis, respectively, and at least one of the marks represents axis information in the X direction or Y direction. With these marks, the reference position (origin position) and the axis information can correctly be specified. In this embodiment, the Y-axis mark 703 defines the Y-axis direction. Position references with such a structure are suitable in a case in which only a strip-shaped narrow region is usable. All of these marks are disposed in a gap region between the label area 721 and the cover glass area 722 that is the arrangement position of a cover glass and a subject (tissue slice) as an observation target. Note that the subject needs to be placed within the range of the cover glass area 722. However, as for the cover glass, it is all right to cover the marks with a cover glass larger than the cover glass area 722, although the focus position changes. That is, in this specification, the cover glass area 722 indicates the area in which the observation target is placed but does not define the size of the cover glass. In addition, if the subject arrangement position changes, and the blank region usable to arrange the position references moves to the right end of the slide 700 in the future, it is possible to cope with this change by disposing the position reference marks according to this embodiment at the right end.

In 14A of FIG. 14, the origin mark 701 is a position reference mark of the slide 700, and serves as an origin used to manage the coordinates of the observation position of a subject on the slide 700. Reference numeral 702 denotes a spare origin mark that is a spare origin used in a case in which the origin mark 701 is undetectable because of dirt, a flaw, or the like. The origin mark 701 and the spare origin mark 702 are disposed in a predetermined positional relationship. Reference numeral 703 denotes the Y-axis mark indicating a Y-axis line having axis information in the Y direction. The axis information represented by the Y-axis mark 703 is a direction perpendicular to end faces in the longitudinal direction of the slide 700. This direction will be referred to as a Y-axis direction. The origin mark 701, the Y-axis mark 703, and the spare origin mark 702 are arranged while being spaced part from each other so they are not simultaneously observed when observed at a magnification of the microscope used to detect the center line (axis information) (to be described later). The origin mark 701 and the spare origin mark 702 are arranged on both sides of the Y-axis mark 703 on the center line of the Y-axis mark 703. Note that although the center line of the Y-axis mark 703 is used to specify the original position, the present invention is not limited to this, and any line (to be referred to as a reference line hereinafter) along the Y-axis direction uniquely specified by the Y-axis mark 703 is usable. A specific position on an extension of the reference line is defined as the origin position. Hence, the origin mark 701 (or the spare origin mark 702) is arranged while being spaced apart from the Y-axis mark 703 so as to indicate a specific position on the extension of the reference line. The origin mark 701, the Y-axis mark 703, and the spare origin mark 702 will generically be referred to as position reference marks hereinafter.

These position reference marks are preferably disposed at intervals equal to or more than the distance corresponding to the field size (for example, the field size of a 10× objective lens=φ1.5 mm or more). This is because the adjacent position reference marks are prevented from being visually mixed in the same visual field of the microscope, and the marks can efficiently be detected. In addition, to obtain an accurate origin reference, it is important to consider dirt or a flaw. Hence, if dirt or a flaw is found by naked-eye detection or image recognition, a measure to, for example, use the spare origin mark 702 in place of the origin mark 701 is needed. Note that since the position of the spare origin mark 702 with respect to the origin mark 701 is known, conversion of the coordinate values and the like can easily be done. The following explanation will be made assuming that the position reference marks considered not to be affected by dirt or a flaw are observed.

In FIGS. 14, 14B and 14C show detailed examples of the position reference marks. In 14B of FIG. 14, the origin mark 701 (or the spare origin mark 702) uses two, upper and lower isosceles triangles, and the contact point of their apexes is the origin (or the spare origin). The Y-axis mark 703 is formed from a complex of Y-axis lines having different widths, as shown in 14B of FIG. 14, and its center line represents the Y-axis of the origin. Note that the Y-axis mark 703 is disposed to be perpendicular to the horizontal frames of the slide 700. The Y-axis lines having different widths are arranged to cope with low to high magnifications of the objective lens magnification.

The Y-axis mark 703 has the same pattern structure as the crosshatch Y-axis 293. An example of the structure will be described with reference to 7C and 7D of FIG. 7B. The Y-axis mark 703 has a structure in which a plurality of pairs of lines with the same width are arranged to be symmetric with respect to the center line serving as the axis of symmetry while changing the width. Note that as for the center part, a certain line may exist on the center line. In addition, the relationship between lines and spaces may be reversed. Accordingly, in both the angle of view at a low magnification of the objective lens and the angle of view at a high magnification, an appropriate number of lines with appropriate widths are captured by image capturing (in both live image and still image), and a predetermined accuracy is ensured in barycentric position detection (to be described later). The intervals of the center lines of the lines or spaces of the Y-axis mark, the boundaries (edges) between the lines and spaces, the widths of the lines or spaces, and the like are set to predetermined values and are useful as actual distance information. Each of the Y-axis mark 703, the origin mark 701, and the spare origin mark 702 may be formed from an aggregate of pairs of fine lines and spaces having a width of, for example, 1 μm, like the crosshatch Y-axis 293 or the crosshatch origin 291. This enables finer actual distance information to be included. Note that the intervals between the reference marks on the slide 700, the sizes of the reference marks, the structures of the reference marks, the intervals of the center lines of the lines or spaces of the reference marks, the boundaries (edges) between the lines and spaces, the widths of the lines or spaces, and the like are set to predetermined values and are also usable as actual distance information.

In FIG. 14, 14C shows another example of the origin mark 701 (or the spare origin mark 702) which is formed from a complex of X-axis lines having different widths, and its center line in the X-axis direction represents the X-axis of the origin or spare origin. Hence, the intersection between the center line in the X-axis direction obtained from the origin mark 701 (or the spare origin mark 702) and the center line in the Y-axis direction obtained from the Y-axis mark 703 is the origin (spare origin) of the slide 700. Note that a more detailed structure of the origin mark 701 (or the spare origin mark 702) shown in 14C of FIG. 14 is obtained by, for example, rotating 7C and 7D of FIG. 7B by 90°.

As for the positional relationship between the position reference marks, the origin mark 701 and the spare origin mark 702 are arranged on the center line of the Y-axis mark 703, as shown in 14B and 14C of FIG. 14. In this embodiment, the center line of each of the origin mark 701 and the spare origin mark 702 is caused to match the center line of the Y-axis mark 703. Additionally, like the dimensional relationship exemplified in 14B and 14C of FIG. 14, all of the sizes of the reference marks, the distances between them, and the like are more than the field size of a 10× objective lens, that is, φ1.5 mm.

Note that these position reference marks are formed on a slide at an accuracy of 5 nm to 10 nm using, for example, a nanoimprint technology to achieve the target accuracy and implement cost reduction as expendables. For this reason, the degree of matching between the Y-direction center line of the Y-axis mark 703 and the Y-direction center lines of the origin marks 701 and 702 and the perpendicularity between the Y-direction center line (origin Y-axis) of the Y-axis mark 703 and the X direction center line of the origin mark 701 are formed on the nanometer order. Hence, the position of the slide origin defined by the Y-axis mark 703 and the origin mark 701 or the spare origin mark 702 and a slide X-axis 711 and a slide Y-axis 712 using the origin as the starting point have an accuracy on the nanometer order.

FIG. 15 is a block diagram showing an example of the control arrangement of the microscope system 10 according to this embodiment. The stage 200 is connected to the controller 501 via an interface cable 13 such as a USB. In the stage 200, a stage MPU 280 controls return of the stage 200 to the origin position or movement of the stage 200 according to an instruction from the controller 501. A ΔΘ driving circuit 281 drives the ΔΘ driving motor 611 of the ΔΘ stage 600 in accordance with an instruction from the stage MPU 280. In accordance with an instruction from the stage MPU 280, an X-axis driving circuit 282 drives the X-axis driving motor 242 that moves the position management plane stage 220 in the X direction. In accordance with an instruction from the stage MPU 280, a Y-axis driving circuit 283 drives the Y-axis driving motor 264 that moves the Y stage 240 in the Y direction, thereby moving the position management plane stage 220 in the Y direction.

An X-axis sensor processing circuit 284 generates an X-coordinate value based on a signal output from the X-axis sensor 271 upon detecting the X area scale 211, and supplies the X-coordinate value to the stage MPU 280. An skew detecting sensor processing circuit 285 generates an X-coordinate value based on a signal output from the skew detecting sensor 273 upon detecting the X area scale 211, and supplies the X-coordinate value to the stage MPU 280. A Y-axis sensor processing circuit 286 generates a Y-coordinate value based on a signal output from the Y-axis sensor 272 upon detecting the Y area scale 212, and supplies the Y-coordinate value to the stage MPU 280. Detection signals from the ΔΘ initial position sensor 621, and X initial position sensor 243, and the Y initial position sensor 265 are supplied to the stage MPU 280 and used for, for example, the initialization operations of the stages.

Note that the motor driving circuits such as the ΔΘ driving circuit 281, the X-axis driving circuit 282, and the Y-axis driving circuit 283, the stage MPU 280, the power supply circuit (not shown), and the like consume relatively high power and can be heat sources, and there is a fear of the influence of thermal expansion on the position accuracy. Hence, these electric circuits may be stored in another case as external controllers. In addition, the functions of the stage MPU 280 may be implemented by the controller 501.

The ΔC adapter 340 of the adapter part 300 is connected to the controller 501 via an interface cable 12 such as a USB. In the ΔC adapter 340, a ΔC MPU 380 performs, for example, rotation control of the mount 342 in the ΔC adapter 340 in accordance with an instruction from the controller 501. A ΔC driving circuit 381 drives the ΔC driving motor 348 in accordance with an instruction from the ΔC MPU 380. A signal from the ΔC initial position sensor 357 is supplied to the ΔC MPU 380 and used to return the mount 342 of the ΔC adapter 340 to the initial position (the origin position of rotation). Note that the electric circuit components such as the ΔC driving circuit 381, the ΔC MPU 380, and the power supply circuit (not shown) consume relatively high power and can be heat sources, and there is a fear of the influence of thermal expansion on the position accuracy. Hence, these electric components may be stored in another case as external controllers. In addition, the functions of the ΔC MPU 380 may be implemented by the controller 501.

The digital camera 400 is connected to the controller 501 via the interface cable 11 such as a USB, and transmits an image captured by the image sensor 401 to the controller 501. In the digital camera 400, a camera MPU 480 executes each control of the digital camera 400. An image processing circuit 481 processes an image signal obtained by the image sensor 401 and generates digital image data.

Note that in this embodiment, a general-purpose digital camera is used as the digital camera 400 and attached/detached via the adapter part 300. However, the present invention is not limited to this. For example, an image capturing part with the image sensor 401 may be fixed to the eyepiece base 122. At this time, if the image sensor 401 is assembled in a state in which its X- and Y-axes accurately match the X- and Y-axes of the stage, the rotation correction mechanism by the adapter part 300 can be omitted. Each of the above-described stage MPU 280, ΔC MPU 380, and camera MPU 480 may implement various functions by executing a predetermined program or may be formed from a dedicated hardware circuit.

The controller 501 is a computer apparatus that includes, for example, the memory 512 that stores a program, and the CPU 511 that implements various kinds of processing by executing the program stored in the memory 512, and has a measurement/control function in the microscope system 10. The operation of the microscope system 10 according to this embodiment will be described below in detail.

FIG. 16 is a flowchart for explaining the operation of the controller 501 in the microscope system 10 according to this embodiment. When each part of the microscope system 10 is powered on, and execution of an observation position management mode is instructed by the controller 501, the operation shown in the flowchart of FIG. 16 starts.

First, in step S11, the controller 501 initializes itself. In the initialization of the controller 501, for example, configuration at the time of activation is done on a platform used to execute a position management application having the measurement/control function in the microscope system 10. When the configuration ends, for example, in Windows®, desired application software is automatically activated from an activation shortcut placed in a startup folder. In this embodiment, the activation shortcut of position management application software (to be referred to as a position management application hereinafter) that implements the measurement/control function of the microscope system is placed in the startup folder, and the position management application is automatically activated. When the position management application is activated in the above-described way, in step S12, the controller 501 waits for an initialization completion notification from each of the stage 200, the adapter part 300 (AC adapter 340), and the digital camera 400.

FIG. 17 is a flowchart showing the initialization operations of the parts of the microscope system 10, that is, the stage 200, the adapter part 300 (AC adapter 340), and the digital camera 400. When the parts are powered on, they perform the initialization operations upon power-on as shown in FIG. 17.

Initialization of XY Stage

In step S101, the stage MPU 280 of the stage 200 moves the position management plane stage 220 and the Y stage 240 to initial positions, thereby initializing the XY stage. That is, the stage MPU 280 sends a driving control command to a predetermined direction to each of the X-axis driving circuit 282 and the Y-axis driving circuit 283. For example, a moving direction and a moving speed are added to the driving control command as parameters. Upon receiving the driving control commands, the X-axis driving circuit 282 and the Y-axis driving circuit 283 respectively send driving signals to the X-axis driving motor 242 and the Y-axis driving motor 264 and move the X stage (position management plane stage 220) and the Y stage 240 in accordance with the designated directions and speeds.

The stage 200 includes the X-axis sensor processing circuit 284 and the Y-axis sensor processing circuit 286 which can perform interpolation processing of detection signals from the X-axis sensor 271 and the Y-axis sensor 272 capable of accurately detecting the X area scale 211 and the Y area scale 212, respectively. In this interpolation processing, if, for example, a ½₀₀₀ interpolation operation is performed, a resolution of 10 nm or less is obtained from a 2 μm wide line pattern, and the target position management accuracy of the observation position management microscope system according to the embodiment, that is, an accuracy of 0.1 μm can be obtained. The stage MPU 280 accurately grasps and manages the X-direction moving amount and position (X-coordinate) of the position management plane stage 220 and the Y-direction moving amount and position (Y-coordinate) of the Y stage 240 based on the signals from the X-axis sensor processing circuit 284 and the Y-axis sensor processing circuit 286.

When the X initial position mark 234 on the position management plane stage 220 reaches the detection position of the X initial position sensor 243, a status change from the X initial position sensor 243 is transmitted to the stage MPU 280. Similarly, when the Y initial position mark 253 on the Y stage 240 reaches the detection position of the Y initial position sensor 265, a status change from the Y initial position sensor 265 is transmitted to the stage MPU 280. Upon receiving the status changes, the stage MPU 280 sends a stop control command to each of the X-axis driving circuit 282 and the Y-axis driving circuit 283 and stops the XY driving of the stage 200.

Next, the stage MPU 280 sends a control command to each of the X-axis driving circuit 282 and the Y-axis driving circuit 283 to sequentially perform forward and reverse fine movements by setting a lower moving speed, selects a more correct initial position, and stops the position management plane stage 220 and the Y stage 240. Then, the stage MPU 280 resets the X-coordinate value and the Y-coordinate value obtained based on the signals from the X-axis sensor processing circuit 284 and the Y-axis sensor processing circuit 286 and held in itself to zero, and sets the XY initialization position as the XY stage origin (coordinates (0, 0)). Note that the detection accuracy of the XY initialization position, that is, the stage origin by the X and Y initial position marks and the X and Y initial position sensors includes a small reproducibility error (a slight deviation occurs when re-initialization is performed) caused by the mechanical accuracy. However, the moving amount of the stage is accurately managed by the area scales and the predetermined detection parts (the X-axis sensor 271, the Y-axis sensor 272, and the skew detecting sensor 273).

Initialization of ΔΘ Stage 600

Next, the stage MPU 280 sends a driving control command to a predetermined direction to the ΔΘ driving circuit 281. For example, a moving direction and a moving speed are added to the driving control command as parameters. Upon receiving the driving control command, the ΔΘ driving circuit 281 sends a driving signal to the ΔΘ driving motor 611, thereby rotating the ΔΘ stage 600 in accordance with the designated direction and speed. When the ΔΘ initial position mark 620 on the ΔΘ stage 600 reaches the detection position of the ΔΘ initial position sensor 621, a status change from the ΔΘ initial position sensor is transmitted to the stage MPU 280. Upon receiving the status changes, the stage MPU 280 sends a stop control command to the ΔΘ driving circuit 281 and stops the ΔΘ driving. Next, the stage MPU 280 issues a control command to the ΔΘ driving circuit 281 to sequentially perform forward and reverse fine rotations by setting a lower moving speed, selects a more correct initial position, and stops the ΔΘ stage 600. Then, the stage MPU 280 resets the ΔΘ coordinate value held in itself to zero, and obtains a ΔΘ center position, that is, a correct position without a rotational deviation. If the ΔΘ position of the ΔΘ stage 600 at the time of activation is unknown (for example, in a case in which the position is not saved in the nonvolatile memory), for example, the ΔΘ stage 600 is rotated by 3° in one direction, and if the ΔΘ initial position mark 620 cannot be found, returned by 6° in the reverse direction.

When initialization of the XY stage of the stage 200 and the ΔΘ stage 600 ends in the above-described way, the stage MPU 280 transmits a stage initialization end command to the controller 501 in step S103.

Initialization of ΔC Adapter 340

The initialization operation of the ΔC adapter 340 (the second adapter part in the adapter part 300) will be described next. In step S111, the ΔC MPU 380 sends a driving control command to a predetermined direction to the ΔC driving circuit 381. For example, a moving direction and a moving speed are added to the driving control command as parameters. Upon receiving the driving control command, the ΔC driving circuit 381 sends a driving signal to the ΔC driving motor 348. When the ΔC driving motor 348 is driven, the mount 342 serving as the concave side of the common standard mount of the ΔC adapter 340 rotates in accordance with the designated direction and speed. When the ΔC initial position mark 356 on the mount 342 serving as the concave side of the common standard mount reaches the detection position of the ΔC initial position sensor 357, a status change is transmitted from the ΔC initial position sensor 357 to the ΔC MPU 380. Upon receiving the status changes, the ΔC MPU 380 sends a stop control command to the ΔC driving circuit 381 and stops the ΔC driving motor 348.

Next, the ΔC MPU 380 issues a control command to the ΔC driving circuit 381 to sequentially perform forward and reverse fine rotations by setting a lower moving speed, selects a more correct initial position, and stops the rotational driving. Then, the ΔC MPU 380 resets the ΔC-coordinate value (the rotation angle of the ΔC adapter) held in itself to zero, and obtains a ΔC center position, that is, a correct position without a rotational deviation. Note that if the ΔC position at the time of activation is unknown (for example, in a case in which the position is not saved in the nonvolatile memory), for example, the ΔC adapter is rotated by 3° in one direction, and if the ΔC initial position mark cannot be found, returned by 6° in the reverse direction. When the ΔC adapter 340 is set at the initial rotation position in the above-described way, the ΔC MPU 380 transmits a ΔC adapter initialization end command to the controller 501 in step S112.

Note that absolute-type scales and sensors may be used to manage the position of the XY stage in the stage 200, the rotation position of the ΔΘ stage 600, and the rotation position of the ΔC adapter 340. When absolute-type scales and sensors are used, the above-described detection of the XY initial position of the stage 200 and detection of the initial positions of the ΔΘ stage 600 and the ΔC adapter 340 can be omitted.

Initialization of Digital Camera 400

The camera MPU 480 of the digital camera 400 performs configuration for the operation of a predetermined position management corresponding function (to be described later) (step S121). When the initialization ends, a camera initialization end command is transmitted to the controller 501 (step S122). Note that in this embodiment, the digital camera 400 executes camera operation initialization when powered on, and transmits a completion notification to the controller 501. However, the present invention is not limited to this. For example, the camera initialization end command may be transmitted when the user sets, from the user interface (operation menu) of the digital camera 400, a mode to execute an camera operation initialization according to an external command from the controller 501.

Referring back to FIG. 16, as described above, the controller 501 waits for reception of all of the stage initialization end command, the ΔC adapter initialization end command, and the camera initialization end command (step S12) after ending the initialization of itself (step S11). Upon receiving all the initialization end commands, the controller 501 determines that the initialization is completed, and advances the process from step S12 to step S13. The position management application starts a preparation operation for observation position management.

In step S13, the controller 501 controls the ΔC adapter 340 so as to align the X- and Y-axes of the image sensor 401 with the X- and Y-axes of the stage based on the image of the XY crosshatch 213 on the stage 200 captured by the digital camera 400. AC correction for aligning the array of the pixels of the image sensor 401 with the stage X-axis 203 and the stage Y-axis 204 of the stage 200 is thus performed.

FIG. 18 is a flowchart for explaining the ΔC correction operation. As described above, the purpose of ΔC correction is to align the X- and Y-axes of the pixel array of the image sensor 401 with the X- and Y-axes of the stage 200. In this embodiment, axis alignment between the X- and Y-axes of the image sensor 401 and the X- and Y-axes of the XY crosshatch 213 disposed in the observation target region 205 and representing the X- and Y-axes of the stage 200 is performed.

First, in step S201, the controller 501 in which the position management application is operating sends a predetermined control command to the camera MPU 480 to set the digital camera 400 in a color live mode. In the color live mode, the camera MPU 480 of the digital camera 400 captures a color low-resolution still image (a thinned image captured without using all pixels of the image sensor) of an observed image, and transmits it to the controller 501 at a predetermined time interval as needed. Every time the low-resolution still image is transmitted from the digital camera 400, the controller 501 displays it on the display 502, thereby providing a live image.

In step S202, using, for example, the display 502, the controller 501 prompts the observer (operator or user) to change the objective lens of the microscope to a low magnification (for example, 10×). After changing the objective lens to the 10× objective lens by rotating the revolver 127, the observer notifies the controller 501 via an input part (for example, a keyboard operation or a mouse operation on a GUI) (not shown) that the 10× objective lens is being used. Note that if the microscope includes a motor-driven revolver, the low magnification setting of the objective lens may automatically be executed by sending a predetermined control command from the controller 501 to the microscope.

In step S203, the controller 501 sends a control command to the stage MPU 280 to move the observation position onto the crosshatch X-axis 292 of the XY crosshatch 213 arranged so as to be captured by the digital camera 400. Note that the observation position (coordinates) of the crosshatch X-axis 292 has known coordinate values based on the stage origin. The crosshatch X-axis 292 is spaced apart from other position reference marks at distances equal to or more than, for example, the field size (for example, φ1.5 mm) of the 10× objective lens so as not to be visually mixed with the other marks. For this reason, the live image of only the crosshatch X-axis 292 is displayed on the display 502. In 19A of FIG. 19, reference numeral 801 denotes an imaging field by the image sensor 401. Note that as shown in 19B of FIG. 19, the imaging field 801 of the image sensor 401 is inscribed in a region 804 that is narrower than an observation field 803 of the microscope (optical system) and is located in the observation field 803 and also has a more uniform light amount and less distortion. However, for safety's sake, a region 802 smaller than the imaging field 801 may be set as the imaging field of the image sensor 401. Note that the field size of the observation field 803 of the image sensor 401 is adjusted by the magnification of the adapter lens 301 in the optical adapter 320.

In steps S204 to S207, the angle of view for image capturing by the digital camera 400 is adjusted. For example, first, in step S204, the controller 501 calculates the Y-direction position of barycentric position (the center of gravity of the pixel values) of the black image of the crosshatch X-axis 292 in the imaging field 801. Note that in this embodiment, the Y-direction position of barycentric position of the black image is obtained. However, the present invention is not limited to this, and the Y-direction position of barycentric position of the white image may be obtained. Alternatively, the average value of the Y-direction position of barycentric position of the black image and that of the white image may be used. In step S205, the controller 501 sends a control command to the stage MPU 280 to move the XY stage such that the barycentric position calculated in step S204 is located at the center of the imaging field. In step S206, the controller 501 determines whether the angle of view of image capturing by the image sensor 401 meets a condition. In this embodiment, based on the number of lines and/or the size of the line width of the black or white image of the crosshatch X-axis 292 in the imaging field 801 assumed for, for example, a 40× objective lens, the controller 501 determines whether the angle of view meets the condition. Upon determining that the angle of view meets the condition, the process advances from step S206 to step S208. If the angle of view does not meet the condition, the process advances from step S206 to step S207. In step S207, using, for example, the display 502, the controller 501 prompts the observer (operator or user) to increase the magnification of the objective lens of the microscope. In a case of a motor-driven revolver, the high magnification setting of the objective lens is automatically done by sending a control command from the controller 501 to the microscope.

By repeating steps S204 to S207 described above, the objective lens is switched from the low magnification (10×) to the high magnification by the manual operation of the user or the control command, and the stage moves to the position of barycentric position calculated in step S204. In this embodiment, an angle of view as shown in 19C of FIG. 19 is finally obtained by the 40× objective lens. Note that the magnification of the objective lens may be changed stepwise from 10×→20×→40× or changed in a stroke from 10×→40×.

Upon determining in step S206 that the angle of view meets the condition, the angle of view is considered to have changed to the angle of view corresponding to the 40× objective lens, and the process advances to step S208. In step S208, the controller 501 sends a control command to the camera MPU 480 to switch the digital camera 400 to a measurement mode. The measurement mode is a mode to use the image information of the image sensor 401 on a pixel basis. For example, if the image sensor 401 uses color filters in a primary color Bayer arrangement for color image capturing as shown in 19E of FIG. 19, the image processing circuit 481 handles the image of each of RGB pixels as a monochrome signal. At this time, the image processing circuit 481 normalizes the image signals from the RGB pixels and makes their dynamic ranges match. Nonlinear processing such as gamma processing is not performed, and the image signals from the pixels which remain linear are processed and output. The measurement mode is the position management corresponding function including image processing such as accurate barycentric position calculation and implemented in the digital camera 400.

Note that instead of using the above-described measurement mode, an image obtained in an existing color mode or monochrome mode (a luminance signal calculated from RGB signals is used) may be used. In this case, however, the accuracy of the calculation result of barycentric position calculation or the like lowers. Alternatively, a monochrome camera without color filters may be used. However, color observation is impossible when observing a slide.

Next, in steps S209 to S212, ΔC correction is executed. First, in step S209, the controller 501 sends a control signal to the camera MPU 480 to do still image capturing using all pixels of the image sensor 401 in the measurement mode. A partially enlarged view of the thus obtained still image of the crosshatch X-axis 292 is shown in 19C of FIG. 19. The image of the crosshatch X-axis captured by the pixels of the image sensor 401 is obtained as a moire image that reflects the axial deviation between the image sensor and the crosshatch X-axis. That is, in the measurement mode, since information is obtained on a pixel basis, an accurate calculation result (centroidal line to be described later) can be obtained.

In step S210, the controller 501 measures the slant (axial deviation), that is, calculates the rotational deviation angle between the crosshatch X-axis 292 and the X-axis of the image sensor 401. As the calculation method, as shown in 19D of FIG. 19, the imaging field of the image sensor 401 is divided into strip-shaped partial regions in the X-axis direction by strip regions 810 having the same width, and the center of gravity is calculated for each strip region (partial region). The narrower the width of the strip region is, the higher the detection accuracy is. Hence, a width corresponding to one pixel may be set. That is, a strip region whose width is equal to or more than one pixel can be used. To prevent the influence of a pixel defect of the image sensor 401, a strip region having a width corresponding to a plurality of pixels may be set and shifted by the width of one pixel to subdivide the visual field. An angle difference a that is a rotational deviation is accurately obtained from the change amount of the Y-coordinate value of the barycentric position of each strip region. For example, a centroidal line 811 passing through a plurality of positions of barycentric position obtained from a plurality of strip regions is calculated by the least-squares method or the like, and the angle difference a is obtained from the centroidal line 811 and the X direction of the array of pixels of the image sensor 401.

In step S211, it is determined whether the slant amount (rotational deviation angle) measured in step S210 falls within a tolerance (equal to or less than a predetermined threshold). If the slant does not fall within the tolerance, in step S212, the controller 501 sends a control command to the ΔC MPU 380 to rotate the mount 342 (that is, the image sensor 401) of the ΔC adapter 340 in a predetermined direction by a predetermined angle. As described above concerning the ΔC adapter 340, the predetermined threshold is preferably 3 millidegrees, and more preferably 0.1 millidegree. In the ΔC adapter 340, the ΔC driving motor 348 is driven in accordance with the control command to rotate the mount 342 by a predetermined angle. The predetermined angle is an angle equal to or less than the predetermined threshold (preferably 3 millidegrees or less, and more preferably 0.1 millidegree or less). After that, the process returns to step S209 to capture a still image (step S209) and measure the slant (step S210). The controller 501 repeats the above-described processes (steps S209 to S212). Upon determining in step S211 that the slant amount falls within the tolerance, the process advances to step S213. In step S213, the controller 501 sends a control signal to the camera MPU 480 to return the digital camera 400 to the color live mode, and ends the ΔC correction.

Note that in step S212, the mount 342 of the ΔC adapter 340 is rotated by a predetermined amount. However, the present invention is not limited to this. For example, if the arrangement can control the rotation amount of the mount 342 by the ΔC driving motor 348, control may be done so as to rotate the mount 342 by an amount corresponding to the slant (angle difference a corresponding to the rotational deviation) calculated in step S210. The crosshatch X-axis 292 is used as a pattern arranged to be captured by the digital camera 400. However, the present invention is not limited to this, and for example, the crosshatch Y-axis 293 or the crosshatch 290 may be used. Part of the X area scale 211 or the Y area scale 212 may be arranged to be captured by the digital camera 400 and used. As adjustment (change) of the arrangement state of the image sensor 401 with respect to the microscope body 100, rotation adjustment (ΔC correction) is performed above. However, the present invention is not limited to this. For example, in addition to the function of ΔC correction by the ΔC adapter 340, a function of performing fine adjustment in the Z direction may be provided as the fourth adapter. For example, the adapter part 300 may be allowed to adjust the Z-direction position of the image sensor 401 and perform fine focus adjustment. In this case, for example, the ΔC adapter 340 can use a structure that supports three points by three actuators to be driven in the Z direction. The tilt of the imaging plane of the image sensor 401 with respect to the XY plane may be adjusted. This can be done by detecting a change in the focus of the grating pattern (a change in the blur of the grating pattern) in the captured image of the crosshatch 290 and thus determining the tilt of the imaging plane. The tilt of the imaging plane can be adjusted by adjusting the driving amounts of the above-described three actuators. The ΔC correction is implemented by the adapter part 300 above. However, the stage 200 may be provided with a rotation mechanism for ΔC correction.

When the ΔC correction is completed in the above-described way, the process returns to FIG. 16. In step S14, the controller 501 notifies the observer of a slide loading permission using the display 502, and waits for placement of a slide on the ΔΘ stage 600. When a slide is placed on the ΔΘ stage 600, the process advances to step S15. The controller 501 executes ΔΘ correction of the ΔΘ stage 600 to correct the rotational deviation of the placed slide. Note that the slide placement (the presence/absence of slide loading) can be detected automatically (not shown) or according to a manual instruction. As described above, ΔC correction is executed before ΔΘ correction, and the X-axis direction and the Y-axis direction of the stage 200 match those of the image sensor 401. By the ΔΘ correction, the X-axis direction and the Y-axis direction of the slide 700 are made to match those of the image sensor 401. As a result, the X-axis direction and the Y-axis direction of the stage 200 and those of the slide 700 match via the image sensor 401. The ΔΘ correction operation will be described below with reference to FIG. 20.

FIG. 20 is a flowchart for explaining the ΔΘ correction operation according to the embodiment. In step S301, the controller 501 sets the objective lens to a low magnification (for example, 10×) by a manual operation or by sending a control command to the microscope. In step S302, the controller 501 sends a control command to the stage MPU 280 to move the observation position onto the Y-axis mark 703 (14A to 14C of FIG. 14) on the slide placed on the ΔΘ stage 600. Note that the position (coordinates) of the Y-axis mark 703 on the slide 700 includes an error caused by the rotational deviation of the slide but has known coordinate values from the stage origin. The Y-axis mark 703 is spaced apart from other position reference marks at distances equal to or more than, for example, the field size (for example, φ1.5 mm) of the 10× objective lens so as not to be visually mixed with the other marks, as described above with reference to 14A to 14C of FIG. 14. Hence, as shown in 21A of FIG. 21, only the Y-axis mark 703 exists in the imaging field 801 of the image sensor 401, and the live image of only the Y-axis mark 703 is displayed on the display 502.

In step S303, the controller 501 calculates the position of barycentric position of the black image of the Y-axis mark 703 in the imaging field 801. Note that in this embodiment, the X-direction position of barycentric position of the black image is obtained. However, the present invention is not limited to this, and the X-direction position of barycentric position of the white image may be obtained. Alternatively, the average value of the X-direction position of barycentric position of the black image and that of the white image may be used. In step S304, the controller 501 sends a control command to the stage MPU 280 to move the stage 200 such that the position of barycentric position is located at the center of the visual field. In step S305, the controller 501 determines the angle of view based on the number of lines and/or the size of the width of the black or white image of the Y-axis line mark in the imaging field 801 assumed for, for example, a 40× objective lens. If the angle of view does not meet a condition, the process advances from step S305 to step S306. Using, for example, the display 502, the controller 501 prompts the observer (operator or user) to increase the magnification of the objective lens of the microscope. In a case of a motor-driven revolver, the high magnification setting of the objective lens may automatically be done by sending a control command from the controller 501 to the microscope.

By repeating steps S303 to S306 described above, the objective lens is switched from the low magnification (10×) to the high magnification by the manual operation of the user or the control command, and in step S304, the stage moves to the position of barycentric position calculated in step S303. In this embodiment, an angle of view as shown in 21B of FIG. 21 is finally obtained by the 40× objective lens. Note that the magnification of the objective lens may be changed stepwise from 10×→20×→40× or changed in a stroke from 10×→40×. Upon determining in step S305 that the angle of view for the 40× objective lens is obtained, the process advances to step S307.

In step S307, the controller 501 sends a control command to the camera MPU 480 to switch the digital camera 400 to a measurement mode, as in step S208. Next, in step S308, the controller 501 sends a control signal to the camera MPU 480 to do still image capturing using all pixels of the image sensor 401 in the measurement mode. A partially enlarged view of the thus obtained still image of the Y-axis mark 703 is shown on the right side of 21B of FIG. 21. The image of the Y-axis line captured by the pixels of the image sensor 401 is obtained as a moire image that reflects the axial deviation between the image sensor and the Y-axis line.

In step S309, the controller 501 measures the slant (axial deviation), that is, calculates the rotational deviation angle between the Y-axis of the image sensor 401 and the Y-axis mark 703 on the slide 700. As the calculation method, for example, as shown in 21C of FIG. 21, the imaging field of the image sensor 401 is divided in the Y-axis direction by strip regions having the same width, and the barycentric position is calculated for each strip region. The narrower the width of the strip region, the higher the detection accuracy is. Hence, a width corresponding to one pixel may be set. To prevent the influence of a pixel defect of the image sensor, a strip region having a width corresponding to a plurality of pixels may be set, and the region is shifted by the width of one pixel to subdivide the visual field. The rotational deviation angle is accurately obtained from the change amount of the X-coordinate value of the barycentric position of each strip region. For example, a centroidal line 822 passing through a plurality of positions of barycentric position obtained from a plurality of strip regions is calculated by the least-squares method or the like, and an angle β of the rotational deviation between the centroidal line 822 and the Y direction of the array of pixels of the image sensor 401 is obtained.

In step S310, the controller 501 determines whether the slant angle measured in step S309 falls within a tolerance (equal to or less than a predetermined threshold). If the slant angle does not fall within the tolerance, the process advances to step S311, and the controller 501 sends a control command to the stage MPU 280 to rotate the ΔΘ stage 600 in a predetermined direction by a predetermined amount. As described above concerning the ΔΘ stage 600, the predetermined threshold is preferably 3 millidegrees, and more preferably 0.1 millidegree. In the ΔΘ stage 600, the ΔΘ driving motor 611 is driven in accordance with the control command to rotate the ΔΘ stage 600 by a predetermined amount (predetermined angle). The predetermined angle is an angle equal to or less than the above-described predetermined threshold (preferably 3 millidegrees or less, and more preferably 0.1 millidegree or less). Then, the process returns to step S308, and the controller 501 performs still image capturing and slant measurement in the measurement mode (step S309). If the slant amount falls within the tolerance, the ΔΘ correction ends.

Note that in step S311, the ΔΘ stage 600 is rotated by a predetermined amount. However, the present invention is not limited to this. For example, if the arrangement can control the rotation amount of the ΔΘ stage 600 (slide) by the ΔΘ driving motor 611, control may be done so as to rotate the ΔΘ stage 600 by an amount corresponding to the slant amount (rotational deviation angle β) calculated in step S309.

Referring back to FIG. 16, when the ΔΘ correction is completed in the above-described way, in step S16, the controller 501 starts detecting the slide origin of the slide placed on the ΔΘ stage 600. The detected slide origin is used as a reference position to manage the observation position (coordinates) on the slide 700 using the position (coordinates) of the stage 200. That is, the difference between the coordinate values of the slide origin measured as the position of the stage 200 and the coordinate values of the stage at the observation position is calculated, thereby obtaining coordinate values depending on the slide origin (independent of the stage origin). The coordinate values are used as the coordinates of the observation position. In other words, the observation position (coordinates) on the slide 700 is managed by the difference between the coordinate values of the slide origin based on the stage origin and the coordinate values of the observation position based on the stage origin. The coordinates of the observation position on the slide thus become the position (coordinates) of the stage 200 based on the slide origin serving as the reference position. Note that at the time of execution of step S16, the objective lens is set to 40×, and the digital camera 400 is set in the measurement mode (in steps S305, S306, and S307). FIG. 22 is a flowchart of the slide origin detection operation according to the embodiment.

The controller 501 captures a still image of the Y-axis mark 703 after ΔΘ correction in step S401, and obtains a centroidal line by barycentric position calculation using strip regions in step S402. In step S403, the controller 501 sends a control command to the stage MPU 280 to move the stage in the X direction such that the calculated centroidal line matches the center line of the imaging field of the image sensor 401 in the Y-axis direction. In this way, a Y-direction center line 842 of the imaging field 801 of the image sensor 401 is made to match a Y-direction center line 841 of the Y-axis mark 703, as shown in 23A of FIG. 23.

In step S404, the controller 501 sends a control command to the stage MPU 280 to receive stage coordinate values at this time based on the XY stage origin (coordinates (0, 0)) obtained in step S101. The X-coordinate value out of the coordinate values is the X-coordinate value of the Y-direction center line of the accurate slide origin. The X-coordinate value also serves as the X-coordinate value of the Y-direction center line 842 of the imaging field 801 of the image sensor 401.

In step S405, the controller 501 sends a control command to the stage MPU 280 to move the image sensor observation position onto the origin mark 701 of the slide 700. The axial deviation of the slide Y-axis 712 is eliminated by ΔΘ correction. For this reason, when the stage is moved to the upper side in the Y direction by a predetermined amount, the origin mark 701 appears within the imaging field 801 of the image sensor 401, as shown in 23B of FIG. 23. However, the stage moving position includes an error corresponding to the detection accuracy of the XY initialization position and a displacement error in the Y-axis direction that remains after the ΔΘ correction of the rotational deviation of the slide (the total error is about 0.1 to 0.2 mm). For this reason, an X-direction centroidal line 851 of the origin mark has a slight deviation from an X-direction center line 852 of the imaging field 801 of the image sensor 401.

The controller 501 captures a still image of the origin mark 701 in the state shown in 23B of FIG. 23 in the measurement mode in step S406, and obtains the Y-direction position of barycentric position by barycentric position calculation using strip regions in step S407. In step S408, the controller 501 sends a control command to the stage MPU 280 to move the stage in the Y direction such that the obtained centroidal line 851 matches the X-direction center line 852 of the imaging field 801 of the image sensor 401. In this way, the X-direction centroidal line 851 of the origin mark 701 is made to match the X-direction center line 852 of the imaging field 801 of the image sensor 401, as shown in 23C of FIG. 23. Note that 23B and 23C of FIG. 23 show a case in which the origin mark shown in 14B of FIG. 14 is used, and 23D and 23E of FIG. 23 show a case in which the origin mark shown in 14C of FIG. 14 is used.

In step S409, the controller 501 sends a control command to the stage MPU 280 to receive stage coordinate values at this time based on the XY stage origin (coordinates (0, 0)) obtained in step S101. The Y-coordinate value out of the coordinate values is the Y-coordinate value of the X-direction center line of the accurate slide origin. The Y-coordinate value also serves as the Y-coordinate value of the X-direction center line of the observation field of the image sensor 401.

In step S410, the controller 501 changes the reference of position management of the observation position from the XY stage origin (coordinates (0, 0)) obtained in step S101 to the slide origin. In step S411, the controller 501 sends a control command to the camera MPU 480 to switch the digital camera 400 from the measurement mode to the color live mode. Note that the slide origin detection of step S16 is preferably executed every time the objective lens (magnification) is changed. This is because the optical axis may shift upon switching the objective lens. This will be described later.

Referring back to FIG. 16, in step S17, the controller 501 (in which the position management application is operating) transits to an observation mode. In step S18, the controller 501 notifies via the display 502 to switch the objective lens to a low magnification, or switches the objective lens to a low magnification by sending a control command to the microscope. In step S19, the controller 501 notifies the observer via the display 502 that preparation for observation position management is completed. The observation position (the center of the imaging field) at this time is located on the slide origin. Note that since the center of the visual field may slightly shift upon switching the objective lens, an arrangement using a slide origin according to an objective lens to be used is preferably provided. To implement this, for example, to detect the slide origin every time the objective lens is switched, the controller 501 starts executing processing shown in 32A of FIG. 32 from step S17. In step S3201 shown in 32A of FIG. 32, the controller 501 determines whether the objective lens has been switched. Switching of the objective lens can be detected by providing a sensor that detects that the objective lens has been switched by the revolver 127. Alternatively, switching of the objective lens may be detected by notifying the controller 501 via a predetermined user interface that the user has switched the objective lens. Upon detecting switching of the objective lens, the process advances to step S3202. The controller 501 detects the slide origin by the same processing as in step S16 and sets it as the reference position of coordinates. The processing is repeated from step S15 every time a slide is newly loaded.

Note that if the mechanical accuracy of the revolver 127 is high, and the slight shift of the field center mainly depends on the magnification of the objective lens, the processing of step S16 may be omitted by obtaining a slide origin in correspondence with each magnification of the objective lens and storing it. Note that in that case, the controller 501, for example, acquires information representing the magnification of the objective lens from the microscope body 100 via a signal line (not shown), and stores the coordinates of the slide origin obtained in step S3202 in the memory 512 in association with the magnification of the objective lens used at the time of detection. Upon detecting switching of the objective lens, if the coordinates of the slide origin corresponding to the magnification of the objective lens after switching are stored in the memory 512, the controller 501 uses the stored coordinates. If the slide origin corresponding to the magnification of the objective lens after switching is not stored, the controller 501 executes slide origin detection as described above.

When correction by the ΔC adapter 340, correction by the ΔΘ stage 600, and detection of the origin of the slide 700 have ended in the above-described way, the controller 501 operates the microscope system 10 in the observation mode. FIG. 24 is a flowchart for explaining processing of the controller 501 that controls position management of the observation position in the observation mode and still image capturing and recording using the digital camera 400.

First, in step S501, the controller 501 stores, in the memory, the position of the slide origin based on the stage origin, which is acquired in step S16 described above. The slide origin coordinates based on the stage origin will be referred to as (x0, y0) hereinafter. In step S502, the controller 501 acquires the conversion coefficient (first coefficient) between the coordinate values of the stage 200 and the actual distance using, for example, the intervals of the center lines of two marks with a known interval or lines or spaces which form one mark and have a known interval, the boundaries (edges) between lines and spaces, the widths of the lines or spaces, and the like. In this embodiment, the crosshatch X-axis 292, the crosshatch Y-axis 293, the crosshatch 290, the Y-axis mark 703 of the slide, and the like can be used. The acquired conversion coefficient (first coefficient) is stored in the memory 512.

The first coefficient is acquired, for example, in the following way. First, the controller 501 moves the stage 200 such that a predetermined position (for example, the observation position) of the image sensor 401 is located at the center of each of two marks or two lines (patterns) in one mark with a known interval out of the position reference marks of the XY crosshatch 213 or the slide 700. Based on the difference between the coordinates of the positions and the actual distance of the interval between the center lines of the two marks or lines, the controller 501 calculates the first coefficient used to do conversion between the coordinate values and the actual distance. For example, in the small crosshatch located at the upper right corner of the crosshatch 290 of the XY crosshatch 213, the observation position is sequentially set at the center of each of the left Y-axis-direction mark and the right Y-axis-direction mark in the line width direction. The first coefficient is obtained based on the change amount of the X-coordinate value and the actual distance (for example, 0.5 mm) between the marks at this time. Alternatively, for example, using the two 10 μm lines (7D of FIG. 7B) at the center of the crosshatch Y-axis 293 of the XY crosshatch 213, the observation position is sequentially set at the center of each line. The first coefficient is obtained based on the change amount of the X-coordinate value and the actual distance (for example, 20 μm) between the lines at this time. Note that in this embodiment, the first coefficient is acquired for the X-coordinate. However, the first coefficient may be acquired for the Y-coordinate. In this embodiment, the first coefficient acquired for the X-coordinate is applied to the Y-coordinate. However, the first coefficient for the X-coordinate and that for the Y-coordinate may individually be measured and held, and the individual first coefficients may be used for the X- and Y-coordinates. The two marks/patterns used to acquire the conversion coefficient need not be included in the same visual field. For example, the rightmost Y-axis-direction mark and the leftmost Y-axis-direction mark of the crosshatch 290 may be used.

In step S503, the controller 501 executes still image capturing such that the two marks with the known interval are included in one image. The controller 501 acquires the conversion coefficient (second coefficient) between the pixel distance of the image sensor 401 and the actual distance using the obtained image and stores it in the memory.

The second coefficient is acquired, for example, in the following way. First, still image capturing is performed such that two lines in one mark with a known interval out of the position reference marks of the XY crosshatch 213 or the slide 700 are included in the imaging field. The controller 501 analyzes the still image, counts the number of pixels between the two lines, and calculates the second coefficient used to do conversion between the pixel distance and the actual distance based on the count value and the actual distance of the interval between the two lines. For example, image capturing is performed such that the two outer lines of the crosshatch Y-axis 293 are included in the screen. The second coefficient is obtained from the number of pixels corresponding to the interval between the lines and the known actual distance. Note that two lines in one mark are used above. However, two marks with a known interval may be used.

In step S504, coordinate values (x, y) based on the stage origin of the stage 200 obtained from the stage MPU 280 are converted into coordinate values (x0-x, y-y0) based on the slide origin, and position management is performed by the coordinate values based on the slide origin. Here, (x0, y0) are the coordinates of the slide origin based on the stage origin. After that, when the user instructs the controller 501 to do still image capturing, the process advances from step S505 to step S506, and the controller 501 instructs the digital camera 400 to do still image capturing. Upon receiving the still image capturing instruction from the controller 501, the digital camera 400 in the observation mode immediately captures a still image and transmits the image data to the controller 501. In steps S507 and S508, the controller 501 generates an image file including the image data received from the digital camera 400 and stores it.

In step S507, additional information to be added to the image file is generated. The additional information includes the first coefficient, the second coefficient, and the observation position (the coordinates of the stage 200 based on the slide origin) described above. Note that a microscope ID used to identify the microscope in use, the objective lens magnification at that time, a slide ID used to identify the observation target slide, and the like may also be included as additional information. Some pieces of the additional information (for example, the microscope ID and the objective lens magnification) are notified from the microscope body 100 to the controller 501 via a signal line (not shown). Note that acquisition of the slide ID is implemented using, for example, a barcode. In this case, a specific number is added as a barcode to a label attached to the label area 721. Alternatively, a barcode is directly printed on the slide glass in the label area 721 and read by a barcode reader (not shown) or the image sensor 401.

In step S508, using the image data received in step S506, the controller 501 generates an image file in which the additional information generated in step S507 is inserted in the file header, and records it. FIG. 25 shows an example of the data structure of the image file. The header of the image file stores the above-described additional information of image data 2508, that is, an observation position 2502, a first coefficient 2503, a second coefficient 2504, a microscope ID 2505, an objective lens magnification 2506, and a slide ID 2507 as well as a file name 2501. The additional information and the image data are thus recorded in association. Note that the additional information need not always be stored in the header of the image file and may be stored in the footer. The additional information may be recorded as another file, and link information for reference may be added to the header or footer of the image data. Note that as the observation position 2502, coordinate values based on the position indicated by the origin mark 701, that is, (x0-x, y-y0) are recorded. If the origin mark 701 is dirty and unusable, the spare origin mark 702 is used. In this case as well, the coordinate values are preferably converted into values based on an origin position indicated by the origin mark 701 and recorded. Note that since the positional relationship between the origin mark 701 and the spare origin mark 702 is strictly defined, the reference position by the origin mark 701 can be specified using the spare origin mark 702. When the spare origin mark 702 is used, a position indicated by the spare origin mark 702 (a position different from the position indicated by the origin mark 701) may be used as a reference, as a matter of course. In this case, however, which origin mark is used needs to be recorded as additional information.

Note that in this embodiment, the skew detecting sensor 273 is provided to further improve the accuracy of position management of the stage 200. Oblique travel detection and oblique travel correction by the skew detecting sensor 273 will be described later with reference to FIGS. 30A, 30B, and 31.

Synchronization between the stage 200 and still image file display by the controller 501 will be described next. In this embodiment, since the observation position of a subject on the slide 700 can accurately be managed, the observation position of a still image captured using the slide 700 at the time of image capturing can easily be reproduced on the microscope side. In addition, movement of the stage 200 can be instructed from the display 502 on which a still image is displayed, and a captured still image can selectively be displayed in synchronism with the movement of the stage 200.

FIG. 26 is a flowchart for explaining synchronization between still image display and movement control of the stage 200 by the controller 501. FIG. 27 is a view for explaining synchronization between the display screen and the position of the stage 200.

In step S601, the controller 501 displays the image data of a selected image file on the display 502. At this time, the controller 501 can grasp the relationship between the size of one pixel of the image data and the size of a display pixel of the display 502 (how many pixels on the display correspond to one pixel of the image sensor) from the display size of the image data on the display 502.

In step S602, the controller 501 moves the stage 200 such that the observation position of the microscope matches the observation position (coordinates) included in the additional information. Since position management of the stage is based on the origin of the slide 700, the observation position for the slide 700 and the observation position of the image displayed on the display 502 can be made to accurately match. Note that the slide 700 is, for example, the slide used to capture the displayed image. For example, the controller 501 converts the observation position (xorg, yorg) acquired from the image file into an actual distance using the first coefficient acquired from the image file, and instructs the stage 200 to move based on the actual distance from the slide origin. Use of the actual distance makes it possible to cope with a case in which the microscope (stage 200) upon capturing the still image and the currently used microscope (stage) are different. Upon receiving the observation position based on the actual distance, the stage 200 converts the actual distance into coordinate values using the first coefficient of its own and moves.

As shown in FIG. 27, the coordinates (xorg, yorg) of the observation position (based on the slide origin) recorded as additional information are read out from the header of the image file of a displayed image 1100 and converted into an actual distance (step S701). Actual distances Lx and Ly from the slide origin to the observation position are thus obtained. The coordinates (Lx, Ly) represented by the actual distances are converted into stage coordinate values using the first coefficient of the currently used stage (step S702), thereby obtaining the coordinates (x0-x, y-y0) of the observation position (based on the slide origin) corresponding to the currently used stage. Next, the observation position (x, y) based on the stage origin is obtained from the slide origin coordinates (x0, y0) based on the stage origin of the currently used stage. The controller 501 instructs to move the stage 200 such that the imaging center of the image sensor 401 is located at the thus obtained coordinates (x, y) of the observation position based on the stage origin (step S703). This can make the observation position of the displayed image match the observation position of the slide 700 on the microscope. That is, the observation position at the time of still image capturing is correctly reproduced.

Next, referring to FIG. 26, the controller 501 determines whether an observation position moving instruction is generated on the screen of the display 502 (step S603) or whether movement of the stage 200 has occurred (step S606). If an observation position moving instruction is generated on the screen of the display 502, the process advances from step S603 to step S604. Note that the observation position moving instruction on the screen is made by detecting the start point and the end point of a drag operation by a mouse. In step S604, for example, in FIG. 27, when a start point 1001 and an end point 1002 of drag by the mouse are detected, a vector 1003 having the moving direction and moving amount of the screen is obtained as a moving instruction. This means moving the observation position (xorg, yorg) (based on the slide origin) of the displayed image 1100 by an amount corresponding to the vector 1003.

Upon detecting the screen moving instruction on the display 502, the controller 501 convert the moving amounts in the X and Y directions into the moving amounts of the XY stage. For example, referring to FIG. 27, the display pixel distance on the display 502 is acquired from the vector 1003. The display pixel distance is represented by an X-direction moving amount $\Delta x disp$ and a Y-direction moving amount $\Delta y disp$, which are converted into pixel distances ($\Delta x pix$, $\Delta y pix$) on the image sensor 401 (step S711). Next, the controller 501 converts the pixel distances into actual distances ($\Delta Lx$, $\Delta Ly$) using the second coefficient (step S712). The controller 501 converts the actual distances into moving amounts ($\Delta x$, $\Delta y$) of the stage using the first coefficient (obtained in step S502) of the currently used stage 200 (step S713). When the stage 200 is moved from the current position (x, y) by the thus obtained moving amounts ($\Delta x$, $\Delta y$) (step S605), the stage 200 moves as indicated by a vector 1004. As a result, the new observation position (the observation position moved by the vector 1003) on the display 502 synchronizes with the observation position (the observation position moved by the vector 1004) by the stage 200.

On the other hand, if the movement of the stage 200 is instructed, the process advances from step S606 to step S607 to move display on the display 502 in accordance with the moving amount of the stage. This is implemented by executing the processing of step S604 described above in a reverse direction. That is, referring to FIG. 27, if the stage 200 is moved as indicated by the vector 1004, the controller 501 converts the moving amounts ($\Delta x$, $\Delta y$) into the actual distances ($\Delta Lx$, $\Delta Ly$) using the first coefficient acquired in step S502 (step S713). Then, the controller 501 converts the actual distances into the pixel distances ($\Delta xpix$, $\Delta ypix$) using the second coefficient recorded in the additional information of the currently displayed image file. The pixel distances are converted into the display pixel distances ($\Delta xdisp$, $\Delta ydisp$) on the display 502 (step S711). Control is performed to move the image by the vector 1003.

Next, in step S608, the display contents are updated in accordance with the vector 1003 obtained in step S604 or S607. In this case, the currently displayed image 1100 is updated by an image 1101. In other words, the display range of the image 1100 is changed to a range overlapping the display range of the image 1101. For this reason, since a portion where the image 1100 and the image 1101 do not overlap is a short portion without image data in the displayed image file, the image is acquired from another image file and composed. The image file to be used is selected from image files with common objective lens magnification, slide ID, and microscope ID based on the observation position.

Note that if an image file that can be composed does not exist, a new image is needed for image display. Hence, the controller 501 generates a new image file by performing still image capturing after the movement of the stage 200, and displays it or composes it with the existing overlap portion so as to compensate for the above-described short portion (margin portion) (steps S609, S610, and S611). Note that both in a case in which a new image file is displayed and in a case in which an image is composed to compensate for the short portion, a composite image of the images 1100 and 1101 is acquired. However, the method of composing the images 1100 and 1101 is not particularly limited. For example, part of the image 1101 may be composed with the periphery of the image 1100, part of the image 1100 may be composed with the periphery of the image 1101, or the composition may be done at a position to divide the image overlap region to ½. With this composite processing, a seamless observation image of the subject on the slide can be obtained. When an image is sequentially composed with the short portion generated by the movement of image (or XY stage), the composed image grows during movement of the observation position.

As described above, according to this embodiment, since the observation position can be managed using coordinates based on the reference position on the slide, the observation position can easily be reproduced. As for the position accuracy, the movement of the stage can be controlled at an accuracy of 0.1 µm by accurately detecting the position using the XY two-dimensional scale plate 210. This makes it possible to specify or reproduce the correct observation position in pathological diagnosis. That is, reproduction of the observation position of an ROI, which conventionally depends on a memory, can be done correctly and quickly. In addition, since the $\Delta\Theta$ stage 600 is employed, even after the slide is temporarily unloaded from the stage, the influence of the placement state (for example, rotational deviation) of the slide can be reduced, and the observation position can correctly be reproduced.

As described above, in observation position management, since the position coordinates of a display image and the position coordinates on the stage accurately synchronize, the observer can always accurately know, through display, the coordinate values of the observation position based on the slide origin. The course of the observation position can be recorded by predetermined application software. An arbitrary observation position can accurately be reproduced by designating coordinate values. When a recorded evidence image is reproduced, the observation position on the slide corresponding to the displayed image can correctly be re-observed by the microscope. This function is executed when the slide ID recorded in the additional information of the displayed image file matches the ID read from the label of the slide currently placed on the stage.

Accordingly, processing that is supposed to be valuable as pathological diagnosis can be implemented in morphological diagnosis, for example, it is possible to superimpose the images of a plurality of slides generated from a plurality of tissue slices adjacent in the thickness direction and observe a change in the thickness direction of the tissue. As additional processing necessary in this case, for example, the plurality of images at the same position coordinates of the plurality of slides are superimposed in the vertical direction, and a feed operation in the vertical direction (thickness direction) is performed to switch the display image as needed. Alternatively, the images of the plurality of slides may be displayed side by side, and the same position may be indicated by a predetermined mark, or the observation portion may be moved synchronously in the plurality of images. Otherwise, when more continuous tissue slice images are used, 3D display can be implemented using an existing 3D algorithm. These processes are executed by software on the controller 501.

In functional diagnosis, the controller 501 can display a plurality of images in different staining states on the display 502 in a superimposed manner by similar software processing. For example, it is possible to observe a slide that has undergone morphological staining, after that, apply functional staining to the slide and observe it, and compose and display, at a predetermined accuracy, microscopic images captured in the morphological staining and the functional staining. Alternatively, it is possible to display morphological images of a plurality of continuous tissue slices and (a plurality of) functional images by functional staining in a superimposed manner and compare and observe a morphological atypism and a function change. These processes are supposed to be valuable as pathological diagnosis but are conventionally unimplementable.

In addition, the array of the elements of the image sensor, the X and Y directions of the stage, and the X and Y directions of the slide are made to correctly match. It is therefore possible to eliminate the rotational deviations of a plurality of still images and easily compose the plurality of captured images.

Coordinates can be managed via an actual distance. Hence, even if the stage 200 with a different relationship between the coordinates and the actual distance is used, the observation position can correctly be specified. Note that the actual distance may be used for the coordinate values of the observation position (based on the slide origin) recorded as additional information, as a matter of course. In this case, the above-described first coefficient (the conversion coefficient between the coordinate values of the stage 200 and the actual distance) may be omitted from the additional information. However, if the first coefficient is included in the additional information, measurement processing and the like for obtaining the first coefficient can conveniently be omitted. In addition, information representing whether the description is based on the actual distance or is based on the distance (coordinate value) on the stage may additionally be recorded together with the coordinate values.

A form in which the digital camera 400 is mounted has been described above. However, the image sensor 401 may be incorporated in the microscope base stand 121. In this case, rotational deviation correction by the ΔC adapter 340 can be omitted.

Note that in the above-described operation procedure, the digital camera 400 may have a setting to set the color live mode when powered on or a function of implementing the live mode by image processing unique to the measurement mode. The digital camera 400 may have a function of performing still image capturing from any live mode and then automatically returning to the live mode.

Note that in the above-mentioned operation procedure, allotment of various kinds of image processing in the measurement mode of the digital camera and various kinds of processing such as strip width setting, barycentric position calculation, and angle-of-view determination in the CPU has specifically been described. However, some or all of the processes may be implemented by another apparatus.

In the above-described embodiment, only a slide having a normal size (1 inch×3 inches) has been handled. However, this also applies to a slide with a larger size (2 inches×3 inches), as a matter of course.

In the above-described embodiment, adjustment in the Z direction, that is, focusing has not been described by intention. However, in angle-of-view determination (steps S206 and S305), still image capturing (steps S209, S308, S401, and S406), and the like using a high-magnification objective lens, focusing is needed in some cases. As described above concerning 14A to 14C of FIG. 14, if the marks on the slide 700 are covered with a cover glass, focusing is necessary. Such focusing is implemented by a Z adjustment mechanism. In this embodiment, focusing can be performed by, for example, moving the Z base 130 of the microscope by a manual instruction or a control command.

In the embodiment, a case in which observation is done using the slide 700 having an origin mark has been described. When a general slide without an origin mark is used, position management as described above (position management based on a slide reference position) cannot be performed. In this case, to do position management as accurately as possible, the microscope system according to the embodiment may more correctly determine the stage origin when initializing the stage 200 and manage the position based on the stage origin. That is, if the slide reference position cannot be specified, position management of the stage is performed based on the crosshatch origin 291 that can serve as a more accurate stage origin position. In this case, the overall operation of the microscope system is shown by the flowchart of FIG. 29.

When the initialization processing in steps S11 and S12 of FIG. 16 is completed, and ΔC correction (step S13) is ended, the process advances to step S291. In step S291, the controller 501 aligns the observation position (the center of the image sensor 401) and the stage origin using the crosshatch origin 291. Alignment using the crosshatch origin 291 can be implemented by the same method (the method using barycentric position detection of a mark) as in origin detection of the slide 700 (FIG. 22) described concerning step S16. Coordinate management of the observation position based on the crosshatch origin is thus implemented. According to this method, the accuracy greatly improves as compared to coordinate management based on the stage origin containing mechanical errors by the X and Y initial position marks and the X and Y initial position sensors.

After that, when a slide is loaded, the process advances from step S14 to step S292. The controller 501 determines whether the slide placed on the stage 200 has an origin mark. This determination is done by moving the stage to a position where the origin mark of the placed slide should exist and determining whether the origin mark 701 exists in an image captured by the digital camera 400. If the origin mark exists, the controller 501 executes the processes of steps S15 and S16 described above and performs position management based on the slide origin from step S17. On the other hand, if the origin mark does not exist, the process advances to step S17 to perform position management based on the stage origin by the crosshatch origin 291 acquired in step S291. Note that the header of the image file shown in FIG. 25 may include the detection result of the presence/absence of the slide origin or information that discriminates whether the slide origin is used for position management or the stage origin is used. When such information is recorded, for example, in a case in which the information represents that the slide origin is used, but the origin cannot be detected from the slide, it can be determined that the origin mark is too dirty to be detected.

With the processing described with reference to FIG. 29, the stage origin is accurately aligned even if the slide has no origin mark. It is therefore possible to perform position management using the accurate position management capability by the stage 200 and the adapter part 300 (AC adapter 340). For example, if the stage 200 on which a slide without an origin mark remains is powered off and then powered on again, alignment of the stage origin is accurately executed in step S291. Hence, more accurate position management can be continued.

Note that as described with reference to FIG. 16, when the objective lens is switched, the slide origin and the stage origin by the crosshatch origin 291 are preferably detected again. Hence, from step S17 of FIG. 29, to re-execute origin detection in a case in which switching of the objective lens is detected, execution of processing shown in 32B of FIG. 32 is started. That is, in step S3211, the controller 501 determines whether the objective lens is switched. Upon detecting switching of the objective lens, the process advances to step S3212, and the controller 501 determines whether the slide is a slide whose slide origin can be detected. This processing can be implemented by, for example, holding the determination result of step S292 in the memory and referring to it. If the slide origin can be detected, the process advances to step S3213. The controller 501 detects the slide origin by the same processing as in step S16 and sets it as the reference position of coordinates. On the other hand, if the slide is a slide whose slide origin cannot be detected, the process advances to step S3214 to align the stage origin by the crosshatch origin 291 with the observation position as in step S291. Note that the processing from step S292 is repeated every time a slide is newly loaded.

Note that as described above with reference to 32A of FIG. 32, in this processing as well, the magnification of the objective lens and the coordinates of the slide origin or stage origin may be stored in the memory 512 in association. That is, the coordinates of the slide origin detected in step S3213 or the stage origin detected in step S3214 may be stored in association with the magnification of the objective lens used at the time of detection and reused when the magnification of the objective lens is switched. When storing the stage origin in association with the magnification of the objective lens used at the time of detection, the step of detecting the stage origin for each objective lens (a corresponding portion in 32B of FIG. 32) may be performed in step S291 of FIG. 29. This makes it possible to omit stage origin detection in step S3214 shown in 32B of FIG. 32 and use the stored stage origin.

The above description has been made without including a processing operation concerning the skew detecting sensor. In this embodiment, the skew detecting sensor 273 is provided to further improve the accuracy of position management of the stage 200. The role and oblique travel correction processing of the skew detecting sensor will be described below.

The position management plane stage 220 on which the slide 700 is placed may generate a small axial fluctuation on the micrometer order when driving the stage 200 in the X- and Y-axis directions. This results from a small oblique travel or meandering (complex oblique travel) caused by a small distortion of the stage mechanism and the machining accuracy of the X- and Y-axis cross roller guides. Such a small axial fluctuation on the micrometer order may consequently appear as a small rotational deviation as shown in 30A of FIG. 30A.

In 30A of FIG. 30A, reference numeral 2102 denotes a position of the position management plane stage 220 before movement; and 2103, a position of the position management plane stage 220 with a rotational deviation after movement. In FIG. 30A, 30B shows the state of the position 2103 in more detail. In FIG. 30A, 30B shows a position 2104 of the position management plane stage 220 including a slight rotational deviation with respect to the stage base 260 on which the X-axis sensor 271 and the skew detecting sensor 273 are disposed. In FIG. 30B, 30C shows the relationship between the X-axis sensor 271 in 30B of FIG. 30A, the center of the observation field 170, and an X-direction axis 1105 passing through the observation field 170 at the position 2104 of the position management plane stage 220.

As shown in 30C of FIG. 30B, the axis 1105 shifts in the vertical direction with respect to a line 1106 that passes through the center of the observation field 170 and the detection center of the X-axis sensor 271. In this example, the axis 1105 is assumed to shift in the vertical direction by 2 μm at the detection center of the X-axis sensor 271. Let t be the vertical shift amount, and d be the small rotational deviation angle generated by the shift. A change e in the X-coordinate by the X-axis sensor 271 according to the rotational deviation is 0.025 nm. This change is undetectable because it is much smaller than the resolution (10 nm) of the X sensor. In this regard, an example of the formula of e is given by $$d=A\ SIN(t/L1), e=L1*(1-COS\ d)$$

where L1 is the distance between the center of the observation field 170 and the detection center of the X-axis sensor 271. In this example, L1=80 mm. That is, to obtain an accurate coordinate of the center of the observation field 170, the X-axis sensor 271 is disposed on the axis that passes through the center of the observation field 170. The X-axis sensor 271 is never affected by the small rotational deviation, and therefore, cannot detect the small rotational deviation.

On the other hand, the skew detecting sensor 273 is spaced apart from the axis passing through the center of the observation field 170 and disposed vertically above the X-axis sensor 271, and therefore, can detect the rotational deviation. In FIG. 30B, 30D is a view for explaining a change amount in the skew detecting sensor 273. In 30D, f represents the amount of a change in the X-coordinate in the skew detecting sensor 273 with respect to the rotational deviation d. Based on a distance S (in the example of 30D, 40 mm) between the X-axis sensor 271 and the skew detecting sensor 273, f is calculated by $$f=(S^2+L1^2)^{1/2}(COS\ D-COS(D+d))$$

where D=A TAN(S/L1), and d=A SIN(t/L1)

According to this formula, f is obtained as 1 μm with respect to the shift of 2 μm (t) in the vertical direction. This change amount is sufficient relative to the sensor resolution of 10 nm. According to the skew detecting sensor 273, the small rotational deviation angle d of the position management plane stage 220 can be detected.

When the position management plane stage 220 has a small rotational deviation, the placed slide 700 also has the small rotational deviation, and the captured image at the position 2103 includes the rotational deviation. In FIG. 31, 31A shows the display images of the captured images of the slide 700 at the positions 2102 and 2103 shown in 30A of FIG. 30A. In 31A of FIG. 31, reference numeral 2107 denotes a display image of the captured image at the position 2102; and 2108, a display image of the captured image at the position 2103. The display image 2108 has a rotational deviation and causes a little mismatch when composed with the display image 2107 based on the position coordinates. Accordingly, a small rotational deviation occurs when synchronizing the display screen with the position of the stage 200. In this embodiment, the target position management accuracy is 0.1 μm, and oblique travel correction needs to be performed so the rotational deviation does not cause a vertical shift more than 0.1 μm in a predetermined observation range (for example, the observation target region 205). This rotational deviation needs to be corrected as needed in accordance with the movement of the stage using a predetermined threshold as a determination criterion, unlike the rotational deviation (ΔC) of the digital camera 400 and the rotational deviation (ΔΘ) of the slide itself when placing the slide, which can be eliminated by performing correction only once for a predetermined target.

For example, when the vertical shift amount t=0.1 μm, f is calculated as 50 nm according to the above-described formula. Hence, in this embodiment, to implement the position management accuracy of 0.1 μm, f=50 nm is used as the threshold to determine whether to perform oblique travel correction. This example of the threshold is applicable in a case in which the distance L1 between the center of the observation field 170 and the detection center of the X-axis sensor 271 is 80 mm. On the other hand, the distance from the origin mark 701 to the far end of the slide 700 is 53 mm (see 14A of FIG. 14), which is smaller than 80 mm. Hence, the coordinates (x0-x, y-y0) of the center of the observation field 170 based on the slide origin have a position management accuracy of 0.1 μm or less.

For example, when initializing the XY stage, the skew detecting sensor 273 resets the coordinates to zero. After that, the controller always monitors the difference value between the X-coordinate value detected by the X-axis sensor 271 and the X-coordinate value detected by the skew detecting sensor 273 as the change amount (f). Note that the change amount (f) is zero at the time of initialization. If a difference value is generated later in detection of the slide origin or detection of the crosshatch origin 291, the controller newly sets the difference value as a reference value, and always monitors the X-coordinate change amount (f) of the skew detecting sensor 273 from the newly set reference value. If the change amount f is equal to or less than the threshold (for example, 50 nm), the controller determines that no oblique travel exists, and performs the above-described processes shown in FIGS. 24 to 27 and 29. If the change amount f exceeds the threshold, the controller determines that an oblique travel exists. The controller executes oblique travel processing and then performs the above-described processes shown in FIGS. 24 to 27 and 29.

In the oblique travel processing, first, the rotational deviation angle d is obtained by a formula in a reverse direction represented by $$d = A\COS(\COS D - f/L2) - D,$$

where D=A TAN(S/L1), and

L2 is the distance between the center of the observation field 170 and the detection center of the skew detecting sensor 273. The display image 2108 is rotated by the rotational deviation angle d around the center (corresponding to the center of the observation field 170) of the display image as a rotation axis. That is, as shown in 31B of FIG. 31, the display image 2108 containing a rotational deviation shown in 31A of FIG. 31 is rotated by d to obtain a display image 2109. The rotation direction is reverse to the rotational deviation of the position 2103 of the position management plane stage 220 shown in 30A of FIG. 30A. With the above-described oblique travel processing, the small rotational deviation caused by a small distortion of the stage mechanism, a small axial fluctuation of the X- and Y-axis cross roller guides, or the like is corrected, and a necessary position management accuracy is ensured.

Note that as another example of the threshold, shift amounts generated by rotation of the center of the observation field 170 around the origin mark 701 may be calculated from the rotational deviation angle d obtained from the change amount f, and whether the shift amounts in the X and Y directions are equal to or less than 0.1 µm may be determined. As another example of oblique travel correction, when the oblique travel amount exceeds the threshold, the position may be moved to the latest position where the oblique travel amount is equal to or less than the threshold, an image may be captured at the position, and the moving amount may be corrected to do position synchronization. If the machining accuracy improves, and the frequency of oblique travel correction becomes low, oblique travel detection may be used as stage fault detection without performing oblique travel correction.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-250312, filed Dec. 10, 2014 which is hereby incorporated by reference herein in its entirety.

The invention claimed is:

1. A microscope system comprising:
    a microscope body;
    a stage base fixed to the microscope body;
    an XY stage mounted on the stage base and including a slide placement stage configured to allow a slide to be placed as an observation target and move in an X-axis direction and a Y-axis direction perpendicular to each other with respect to the stage base;
    an XY two-dimensional scale plate fixed to the slide placement stage;
    a first mark provided on the XY two-dimensional scale plate and configured to provide axis information in the X-axis direction throughout a movable range of the slide placement stage in the Y-axis direction;
    a second mark provided on the XY two-dimensional scale plate and configured to provide axis information in the Y-axis direction throughout a movable range of the slide placement stage in the X-axis direction, the first mark and the second mark being used to recognize X-coordinates and Y-coordinates of the slide placement stage;
    a plurality of first sensors, each of which is fixed to the stage base at unique position in X-direction and configured to read the axis information from the first mark;
    a plurality of second sensors, each of which is fixed to the stage base at unique position in Y-direction and configured to read the axis information from the second mark, and a plurality of skew detecting sensors, each of which is arranged at a first unique predetermined interval with respect to the first sensor in the Y-axis direction, arranged at a second unique predetermined interval with respect to the second sensor in the X-axis direction and configured to read any one of the axis information of the first mark and the axis information of the second mark.

2. The system according to claim 1, wherein a third mark that provides the axis information of the X-axis direction and/or the Y-axis direction of the slide placement stage is arranged on the XY two-dimensional scale plate at a position where the third mark is observable by the microscope body.

3. The system according to claim 1, wherein a fourth mark configured to define an origin of the slide placement stage is arranged on the XY two-dimensional scale plate at a position where the fourth mark is observable by the microscope body.

4. The system according to claim 1, wherein the XY two-dimensional scale plate is integrally formed.

5. The system according to claim 4, wherein the XY two-dimensional scale plate is made of synthetic quartz.

6. The system according to claim 1, wherein the marks arranged on the XY two-dimensional scale plate are formed by nanoimprint.

7. The system according to claim 6, wherein a position difference in a Z-axis direction perpendicular to the X-axis direction and the Y-axis direction between a surface of the XY two-dimensional scale plate on which the marks are arranged and an upper surface of the slide placed on the slide placement stage remains within a range of 0.5 mm.

8. The system according to claim 1, wherein the first mark includes a plurality of lines extending in the Y-axis direction and arranged in the X-axis direction, and the second mark includes a plurality of lines extending in the X-axis direction and arranged in the Y-axis direction.

9. The system according to claim 1, wherein the first sensor and the second sensor are arranged on an X-axis and a Y-axis, respectively, which pass through a center of an observation field.

10. The system according to claim 9, wherein the first sensor comprises a plurality of first sensors arranged on the X-axis at a predetermined interval, and the first mark has a size in the X-axis direction that allows two of the plurality of first sensors to simultaneously read the axis information.

11. The system according to claim 9, wherein the second sensor comprises a plurality of second sensors arranged on the Y-axis at a predetermined interval, and the second mark has a size in the Y-axis direction that allows two of the plurality of second sensors to simultaneously read the axis information.

12. The system according to claim 1, wherein the stage base is fixed to a Z base capable of moving in a Z direction perpendicular to the X-axis direction and the Y-axis direction of the microscope body.

13. The system according to claim 1, wherein a rotating stage configured to place the slide and rotate around an axis in a Z direction perpendicular to the X-axis direction and the Y-axis direction in accordance with an external signal is provided on an upper surface of the slide placement stage.

14. The system according to claim 1, further comprising a mounting part configured to mount, on the microscope body, an image sensor configured to capture an observation image.

15. The system according to claim 14, wherein the mounting part further comprises a rotation unit configured to rotate the mounted image sensor around an axis in a Z direction perpendicular to the X-axis direction and the Y-axis direction in accordance with an external signal.

16. The system according to claim 14, further comprising the image sensor mounted on the mounting part.

17. The system according to claim 1, further comprising a display control unit configured to cause a display part to display, in a superimposed manner, a plurality of images of the observation target acquired by the microscope system, which are images of a plurality of slides obtained using a plurality of adjacent tissue slices as the observation target.

18. The system according to claim 1, further comprising a display control unit configured to cause a display part to display, in a superimposed manner, a plurality of images of the observation target acquired by the microscope system, which are a plurality of images in different staining states.

19. A microscope system comprising:
a microscope body;
an XY stage mounted on the microscope body and including a slide placement stage that is movable relative to a stage base in an X-axis direction and a Y-axis direction perpendicular to each other and is configured to allow a slide to be placed as an observation target;
a scale arranged along one of the X-axis direction and the Y-axis direction to provide axis information of the one of the X-axis direction and the Y-axis direction; and
a first sensor and second sensor configured to detect the scale,
wherein the first sensor and the second sensor are placed at a predetermined interval along the scale in the one of the X-axis direction and the Y-axis direction, and the predetermined interval is shorter than a length of the scale in the one of the X-axis direction and the Y-axis direction.

20. The system according to claim 19, wherein a mark configured to define an origin of the slide placement stage is arranged on the slide placement stage at a position where the mark is observable by the microscope body.

* * * * *